US008929375B2

(12) United States Patent
Iwao et al.

(10) Patent No.: US 8,929,375 B2
(45) Date of Patent: Jan. 6, 2015

(54) NODE APPARATUS, STORAGE MEDIUM AND FRAME TRANSMITTING METHOD

(75) Inventors: Tadashige Iwao, Kawasaki (JP); Yuji Takahashi, Kawasaki (JP); Syunsuke Koga, Fukuoka (JP); Yuri Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 13/337,788

(22) Filed: Dec. 27, 2011

(65) Prior Publication Data

US 2012/0106552 A1 May 3, 2012

Related U.S. Application Data

(63) Continuation of application No. PCT/JP2009/003537, filed on Jul. 27, 2009.

(51) Int. Cl.

| | |
|---|---|
| ***G01R 31/08*** | (2006.01) |
| ***G06F 11/00*** | (2006.01) |
| ***G08C 15/00*** | (2006.01) |
| ***H04J 1/16*** | (2006.01) |
| ***H04J 3/14*** | (2006.01) |
| ***H04L 1/00*** | (2006.01) |
| ***H04L 12/26*** | (2006.01) |
| ***H04L 12/721*** | (2013.01) |
| ***H04W 40/02*** | (2009.01) |

(52) U.S. Cl.

CPC ............... *H04W 40/02* (2013.01); *H04L 45/36* (2013.01)

USPC ........... 370/392; 370/216; 370/217; 370/218; 370/219; 370/220; 370/221; 370/222; 370/223; 370/224; 370/225; 370/226; 370/227; 370/228; 370/248

(58) Field of Classification Search

None

See application file for complete search history.

(56) References Cited

U.S. PATENT DOCUMENTS

| | | | | |
|---|---|---|---|---|
| 6,885,937 | B1 * | 4/2005 | Suranyi | 701/533 |
| 7,082,531 | B1 * | 7/2006 | Chen et al. | 713/153 |

(Continued)

FOREIGN PATENT DOCUMENTS

| | | |
|---|---|---|
| CN | 1638353 | 7/2005 |
| CN | 1683353 | 10/2005 |

(Continued)

OTHER PUBLICATIONS

H. Iwata et al., "Proposal of Probabilistic Routing Algorithm Adapting to MANET and Estimation Using VoIP," IPSJ SIG Notes, vol. 2008, No. 18, pp. 223-230, Dec. 18, 2008.

(Continued)

*Primary Examiner* — Hassan Phillips
*Assistant Examiner* — Lonnie Sweet
(74) *Attorney, Agent, or Firm* — Staas & Halsey LLP

(57) ABSTRACT

When stored identifying information of a transmission target frame and identifying information of a received frame are equal, a node apparatus updates transmission feasibility information stored in association with the final destination of the received frame. The transmission feasibility information indicates feasibility of transmission to each of a plurality of adjacent node apparatuses being a transmission destination, and is updated so that feasibility of transmission to the transmission destination associated with the identifying information of the received frame indicates that "the transmission is infeasible". The node apparatus transmits the received frame, when there is no adjacent apparatus to which transmission is feasible, and when the stored identifying information of the transmission target frame is equal to the identifying information of the received frame, to the adjacent node apparatus recognized as the origin in association with the identifying information of the received frame.

8 Claims, 36 Drawing Sheets

(56) References Cited

U.S. PATENT DOCUMENTS

| | | | | |
|---|---|---|---|---|
| 8,018,953 | B1 * | 9/2011 | Zhao | 370/400 |
| 2001/0055306 | A1 | 12/2001 | Nakatsugawa et al. | |
| 2005/0237948 | A1 | 10/2005 | Wan et al. | |
| 2006/0013141 | A1 | 1/2006 | Mutoh et al. | |
| 2007/0245034 | A1 | 10/2007 | Retana et al. | |
| 2008/0225697 | A1 * | 9/2008 | Bryant et al. | 370/217 |
| 2008/0310433 | A1 | 12/2008 | Retana et al. | |
| 2009/0122748 | A1 * | 5/2009 | Gourhant et al. | 370/328 |
| 2009/0198957 | A1 * | 8/2009 | Arimilli et al. | 712/29 |
| 2009/0274044 | A1 * | 11/2009 | Goose et al. | 370/225 |
| 2010/0039934 | A1 * | 2/2010 | McGuire et al. | 370/225 |

FOREIGN PATENT DOCUMENTS

| | | |
|---|---|---|
| JP | 2001-298488 | 10/2001 |
| JP | 2002-271399 | 9/2002 |
| JP | 2003-273964 | 9/2003 |
| JP | 2006-020175 | 1/2006 |
| JP | 2006-33275 | 2/2006 |
| JP | 2006-526937 | 11/2006 |
| JP | 2006-340165 | 12/2006 |
| JP | 4173842 | 8/2008 |
| JP | 2008-306314 | 12/2008 |
| WO | 2004/0114690 | 12/2004 |
| WO | 2004/114690 | 12/2004 |

OTHER PUBLICATIONS

Chinese Office Action mailed Oct. 22, 2013 in corresponding Chinese Application No. 200980159067.7.

T. Iwao et al., "Multipurpose Practical Sensor Network: S-wire", Fujitsu, vol. 57, No. 3, pp. 285-290, May 2006.

H. Iwata et al., "Proposal of Probabilistic Routing Algorithm Adapting to MANET and Estimation Using VoIP," IPSJ SIG Notes, vol. 2008, No. 18, pp. 223-230, Feb. 27, 2008.

Yun H. et al., "Intelligent ants for adaptive network routing", Communication Networks and Services Research, 2004. Proceedings, Second Annual Conference on Freeericton, IEEE, May 19, 2004, pages 255-261.

Extended European Search Report mailed Oct. 6, 2014 in corresponding European Application No. 09847760.7-1962.

* cited by examiner

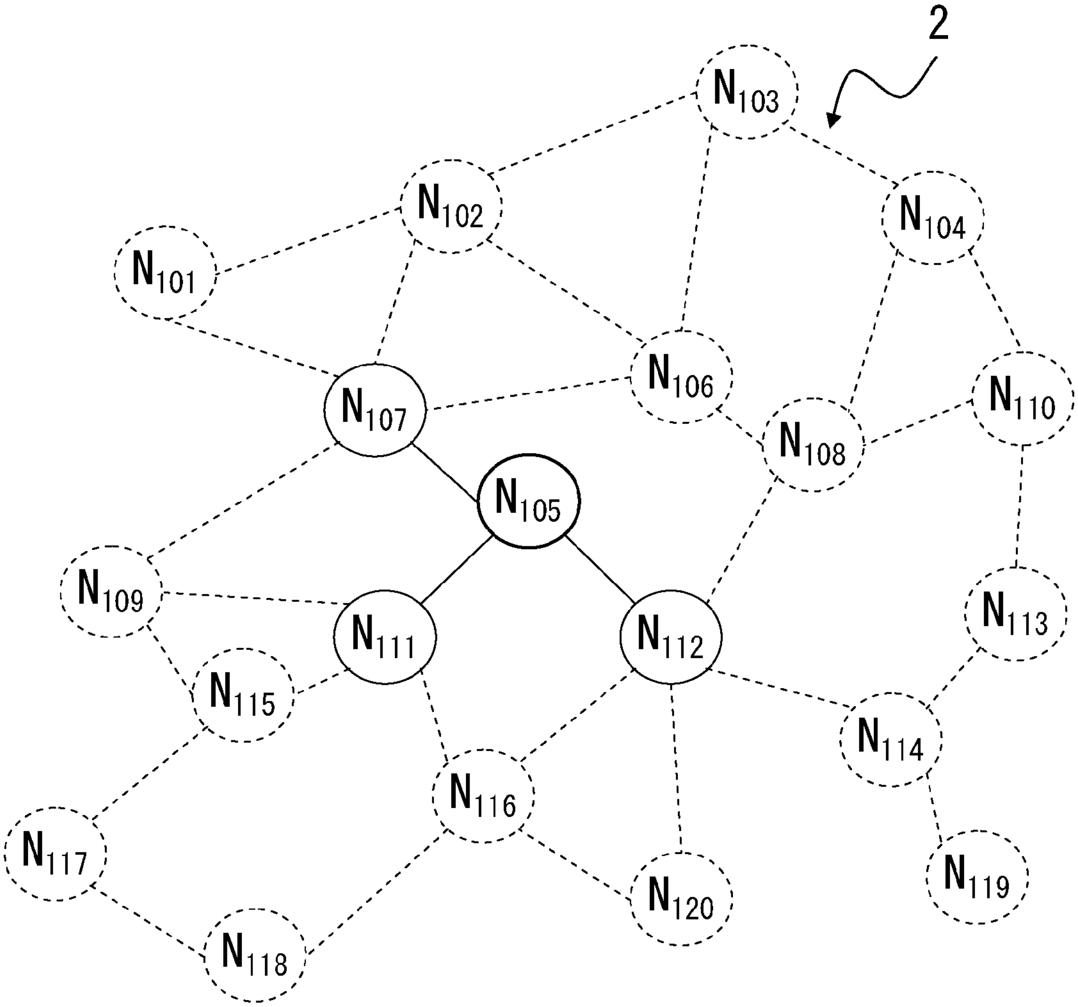
F I G. 2

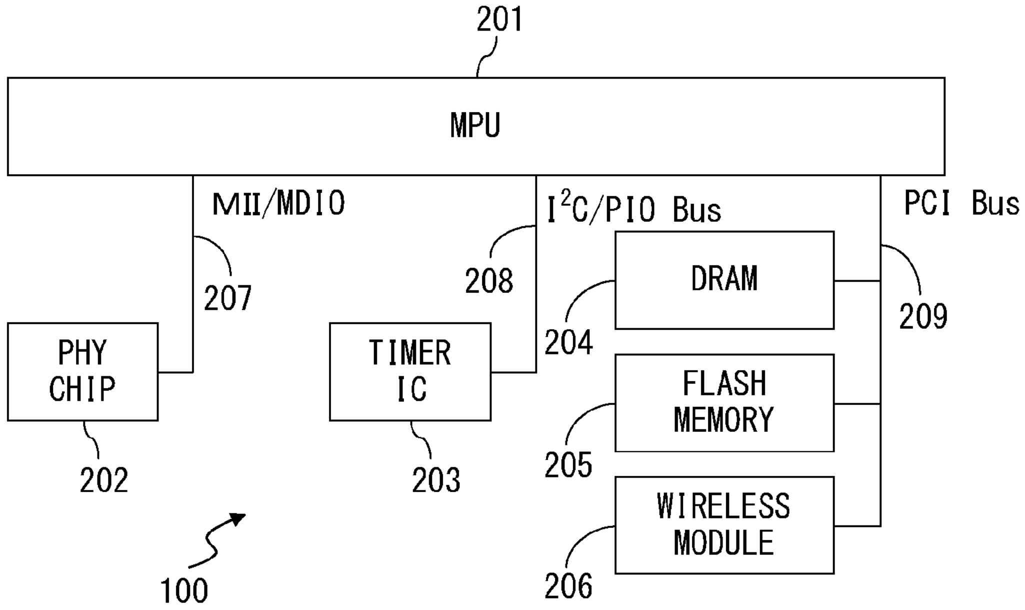
F I G. 4

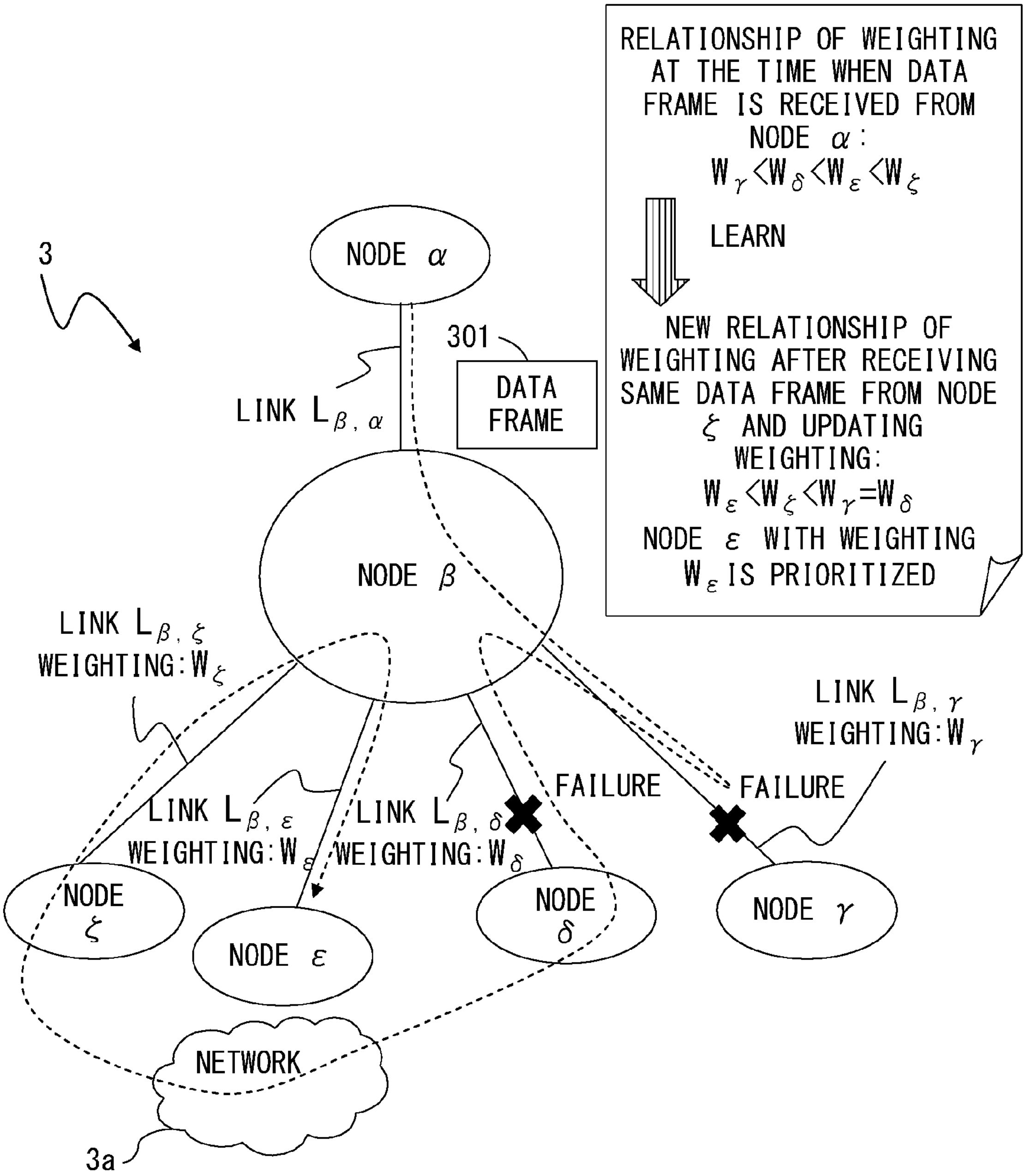
F I G. 5

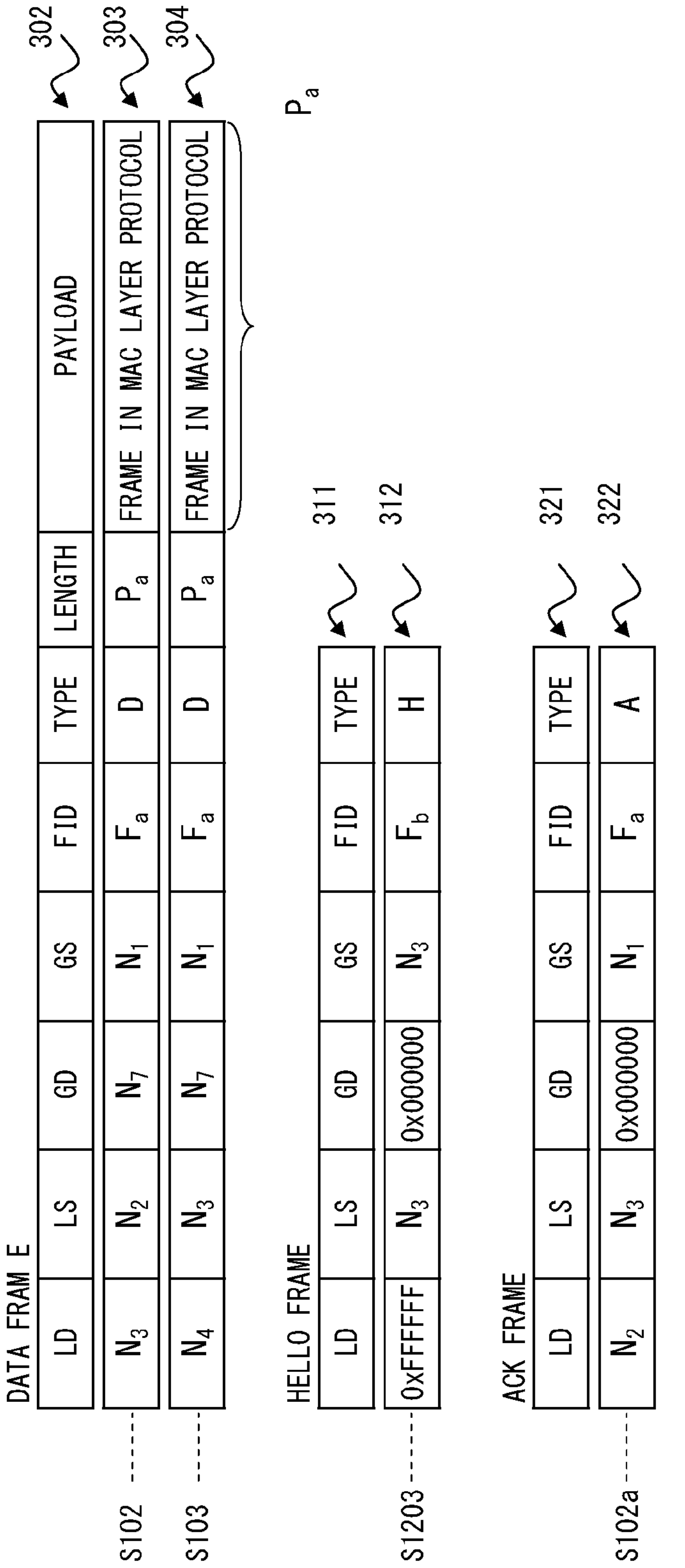
F I G. 7

109-$N_3$

| TIMEOUT TIME | DATA FRAME | | | | | | | |
|---|---|---|---|---|---|---|---|---|
| | LD | LS | GD | GS | FID | TYPE | LENGTH | PAYLOAD |
| $TI_{3,j}$ | $N_3$ | $N_2$ | $N_7$ | $N_1$ | $F_a$ | D | $P_a$ | ... |
| ⋮ | ⋮ | ⋮ | ⋮ | ⋮ | ⋮ | ⋮ | ⋮ | ⋮ |

FIG. 8

$103\text{-}N_2$

| NODE ID | LAST UPDATE TIME |
|---|---|
| $N_1$ | $TA_{2,1}$ |
| $N_3$ | $TA_{2,3}$ |
| $N_6$ | $TA_{2,6}$ |

$103\text{-}N_3$

| NODE ID | LAST UPDATE TIME |
|---|---|
| $N_2$ | $TA_{3,2}$ |
| $N_4$ | $TA_{3,4}$ |
| $N_5$ | $TA_{3,5}$ |

FIG. 9

$104\text{-}N_3$ $104\text{-}1\text{-}N_3$ $104\text{-}2\text{-}N_3$

| GD | LAST UPDATE TIME | LD | WEIGHTING |
|---|---|---|---|
| $N_7$ | $TW_{3,7,2}$ | $N_2$ | $W_{3,7,2}$ |
| | $TW_{3,7,4}$ | $N_4$ | $W_{3,7,4}$ |
| | $TW_{3,7,5}$ | $N_5$ | $W_{3,7,5}$ |
| $N_4$ | $TW_{3,4,2}$ | $N_2$ | $W_{3,4,2}$ |
| | $TW_{3,4,4}$ | $N_4$ | $W_{3,4,4}$ |
| | $TW_{3,4,5}$ | $N_5$ | $W_{3,4,5}$ |
| ⋮ | ⋮ | ⋮ | ⋮ |

FIG. 10

$104\text{-}1\text{-}N_3$ $104\text{-}N_3$

| GD | LAST UPDATE TIME | LD | WEIGHTING |
|---|---|---|---|
| $N_7$ | $T_a$ | $N_2$ | 0.5 |
| | $T_a$ | $N_4$ | 0.5 |
| | $T_a$ | $N_5$ | 0.5 |
| ⋮ | ⋮ | ⋮ | ⋮ |

S103+S103a $104\text{-}1\text{-}N_3$ $104\text{-}N_3$

| GD | LAST UPDATE TIME | LD | WEIGHTING |
|---|---|---|---|
| $N_7$ | $T_a$ | $N_2$ | 0.5 |
| | $T_b$ | $N_4$ | 0.4 |
| | $T_a$ | $N_5$ | 0.5 |
| ⋮ | ⋮ | ⋮ | ⋮ |

S106

$104\text{-}1\text{-}N_3$ $104\text{-}N_3$

| GD | LAST UPDATE TIME | LD | WEIGHTING |
|---|---|---|---|
| $N_7$ | $T_a$ | $N_2$ | 0.5 |
| | $T_c$ | $N_4$ | 1.0 |
| | $T_a$ | $N_5$ | 0.5 |
| ⋮ | ⋮ | ⋮ | ⋮ |

S107+S107a $104\text{-}1\text{-}N_3$ $104\text{-}N_3$

| GD | LAST UPDATE TIME | LD | WEIGHTING |
|---|---|---|---|
| $N_7$ | $T_a$ | $N_2$ | 0.5 |
| | $T_c$ | $N_4$ | 1.0 |
| | $T_d$ | $N_5$ | 0.4 |
| ⋮ | ⋮ | ⋮ | ⋮ |

S109

$104\text{-}1\text{-}N_3$ $104\text{-}N_3$

| GD | LAST UPDATE TIME | LD | WEIGHTING |
|---|---|---|---|
| $N_7$ | $T_a$ | $N_2$ | 0.5 |
| | $T_c$ | $N_4$ | 1.0 |
| | $T_e$ | $N_5$ | 1.0 |
| ⋮ | ⋮ | ⋮ | ⋮ |

| FID | GS | LD | OLS | LAST UPDATE TIME |
|---|---|---|---|---|
| ⋮ | ⋮ | ⋮ | ⋮ | ⋮ |
| $F_a$ | $N_1$ | $N_2$ | $N_1$ | $TF_{101}$ |

$E_1$ -------- S101

105-$N_2$

| FID | GS | LD | OLS | LAST UPDATE TIME |
|---|---|---|---|---|
| ⋮ | ⋮ | ⋮ | ⋮ | ⋮ |
| $F_a$ | $N_1$ | $N_3$ | $N_1$ | $TF_{102}$ |

$E_2$ -------- S102

105-$N_3$

| FID | GS | LD | OLS | LAST UPDATE TIME |
|---|---|---|---|---|
| ⋮ | ⋮ | ⋮ | ⋮ | ⋮ |
| $F_a$ | $N_1$ | $N_4$ | $N_2$ | $TF_{103}$ |

$E_3$ -------- S103

105-$N_4$

| FID | GS | LD | OLS | LAST UPDATE TIME |
|---|---|---|---|---|
| ⋮ | ⋮ | ⋮ | ⋮ | ⋮ |
| $F_a$ | $N_1$ | $N_7$ | $N_3$ | $TF_{104}$ |

$E_4$ -------- S104

105-$N_4$

| FID | GS | LD | OLS | LAST UPDATE TIME |
|---|---|---|---|---|
| ⋮ | ⋮ | ⋮ | ⋮ | ⋮ |
| $F_a$ | $N_1$ | $N_5$ | $N_3$ | $TF_{105}$ |

$E_4$ -------- S105

105-$N_5$

| FID | GS | LD | OLS | LAST UPDATE TIME |
|---|---|---|---|---|
| ⋮ | ⋮ | ⋮ | ⋮ | ⋮ |
| $F_a$ | $N_1$ | $N_3$ | $N_4$ | $TF_{106}$ |

| FID | GS | LD | OLS | LAST UPDATE TIME | |
|---|---|---|---|---|---|
| ⋮ | ⋮ | ⋮ | ⋮ | ⋮ | 105-$N_3$ |
| $F_a$ | $N_1$ | $N_5$ | $N_2$ | $TF_{107}$ | $E_3$  ------- S107 |
| ⋮ | ⋮ | ⋮ | ⋮ | ⋮ | |

| FID | GS | LD | OLS | LAST UPDATE TIME | |
|---|---|---|---|---|---|
| ⋮ | ⋮ | ⋮ | ⋮ | ⋮ | 105-$N_5$ |
| $F_a$ | $N_1$ | $N_4$ | $N_4$ | $TF_{108}$ | $E_5$  ------- S108 |
| ⋮ | ⋮ | ⋮ | ⋮ | ⋮ | |

| FID | GS | LD | OLS | LAST UPDATE TIME | |
|---|---|---|---|---|---|
| ⋮ | ⋮ | ⋮ | ⋮ | ⋮ | 105-$N_4$ |
| $F_a$ | $N_1$ | $N_3$ | $N_3$ | $TF_{109}$ | $E_4$  ------- S109 |
| ⋮ | ⋮ | ⋮ | ⋮ | ⋮ | |

| FID | GS | LD | OLS | LAST UPDATE TIME | |
|---|---|---|---|---|---|
| ⋮ | ⋮ | ⋮ | ⋮ | ⋮ | 105-$N_3$ |
| $F_a$ | $N_1$ | $N_2$ | $N_2$ | $TF_{110}$ | $E_3$  ------- S110 |
| ⋮ | ⋮ | ⋮ | ⋮ | ⋮ | |

| FID | GS | LD | OLS | LAST UPDATE TIME | |
|---|---|---|---|---|---|
| ⋮ | ⋮ | ⋮ | ⋮ | ⋮ | 105-$N_2$ |
| $F_a$ | $N_1$ | $N_6$ | $N_1$ | $TF_{111}$ | $E_2$  ------- S111 |
| ⋮ | ⋮ | ⋮ | ⋮ | ⋮ | |

| FID | GS | LD | OLS | LAST UPDATE TIME | |
|---|---|---|---|---|---|
| ⋮ | ⋮ | ⋮ | ⋮ | ⋮ | 105-$N_6$ |
| $F_a$ | $N_1$ | $N_7$ | $N_2$ | $TF_{112}$ | $E_6$  ------- S112 |

FIG. 13

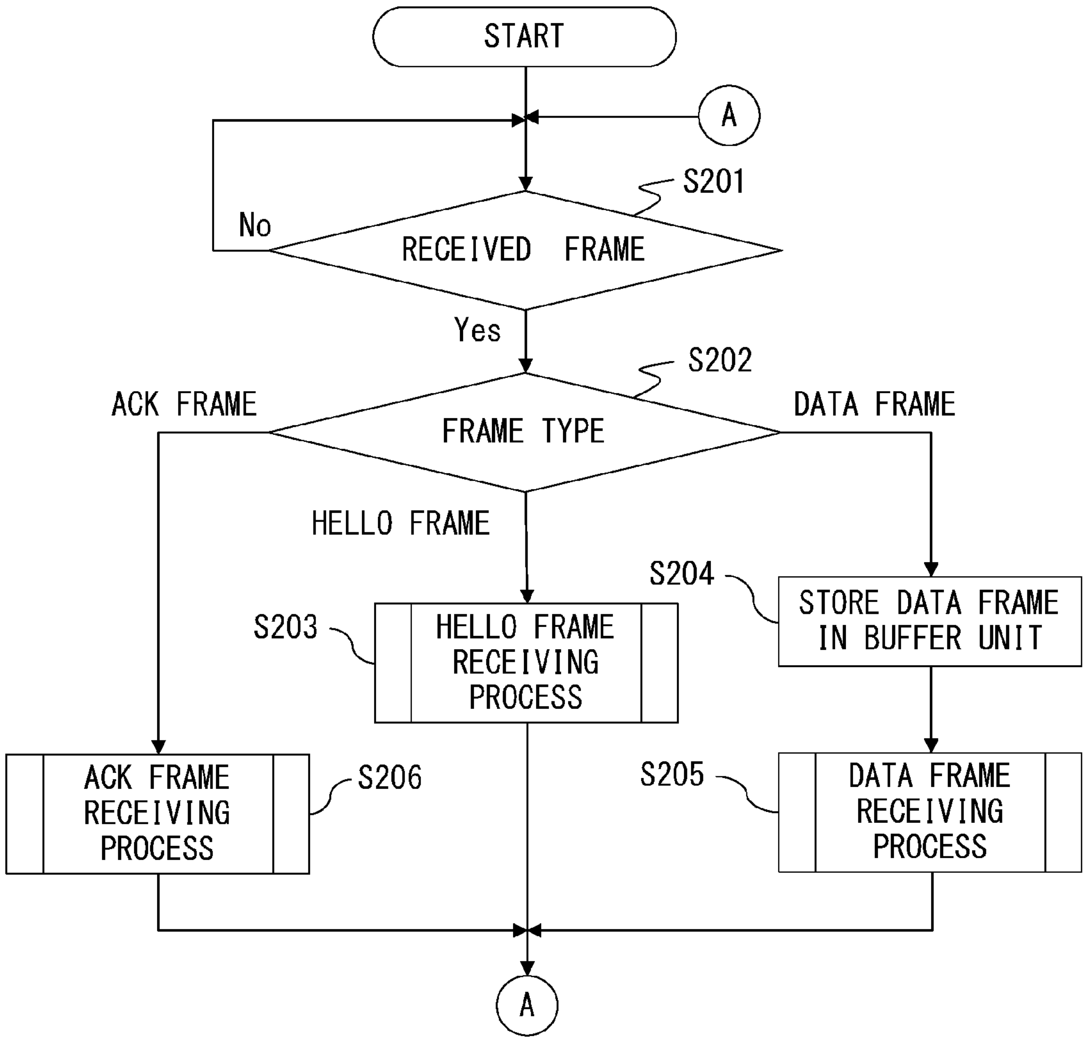
F I G. 1 4

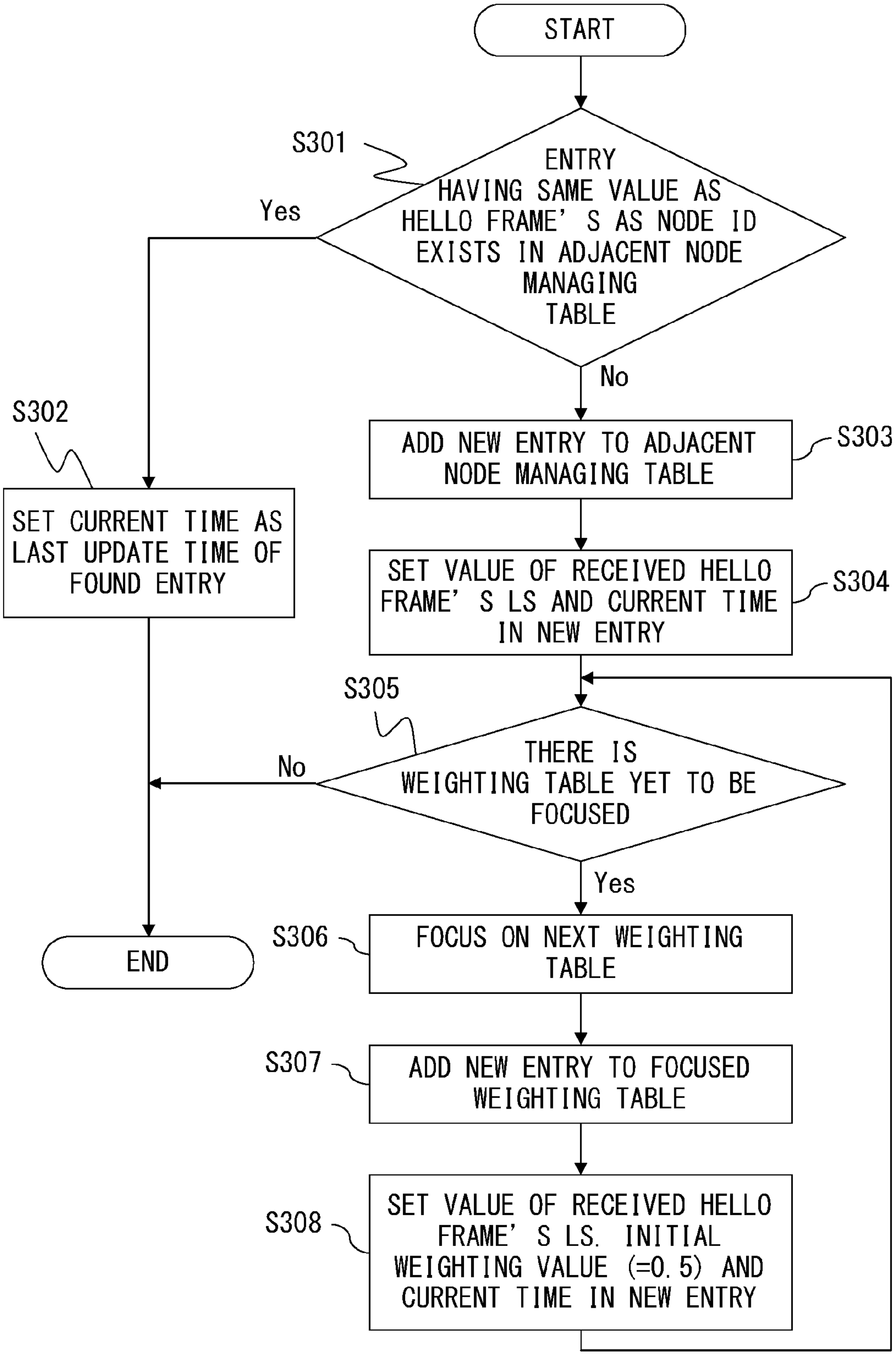
F I G. 1 5

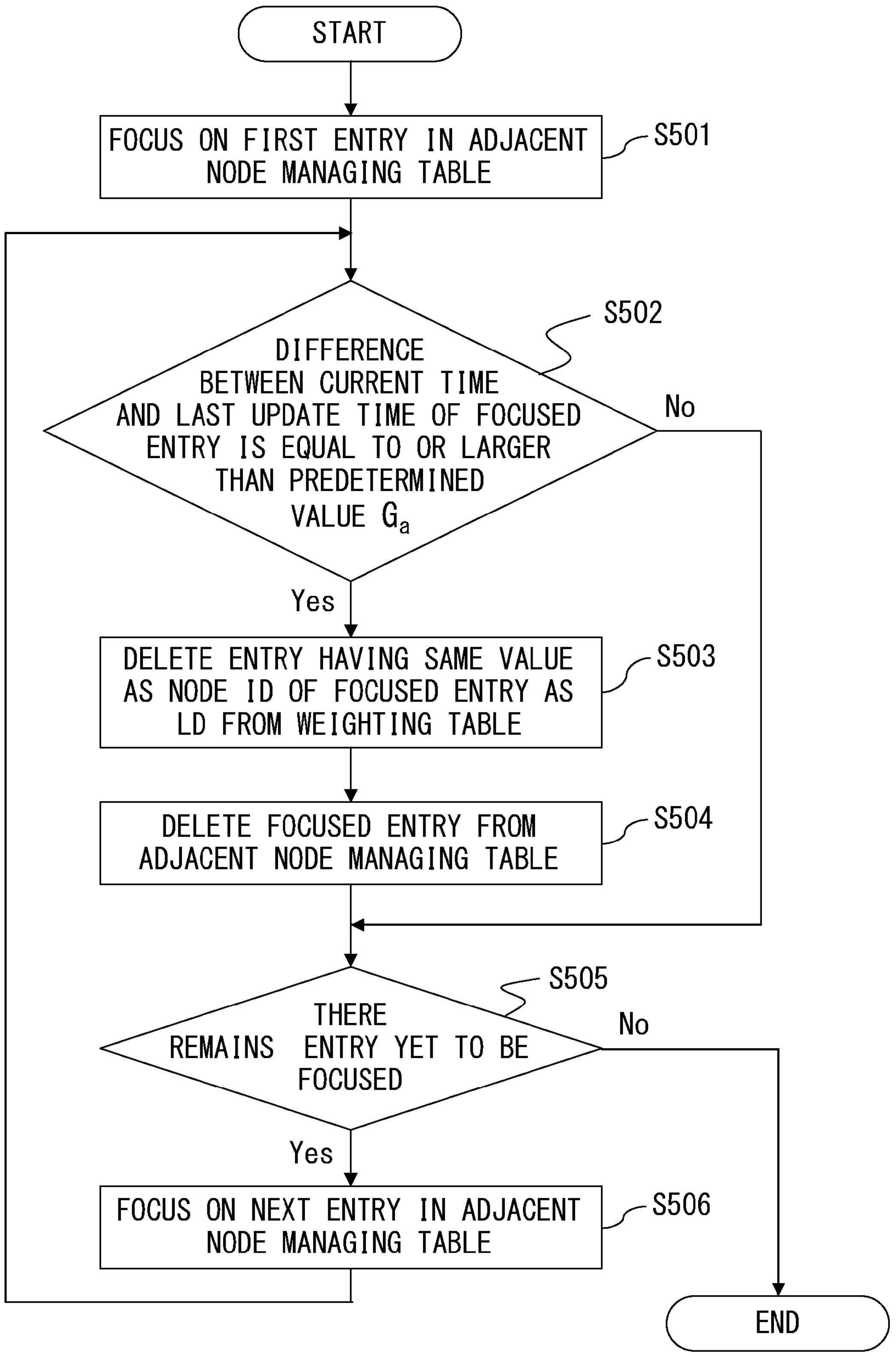
F I G. 17

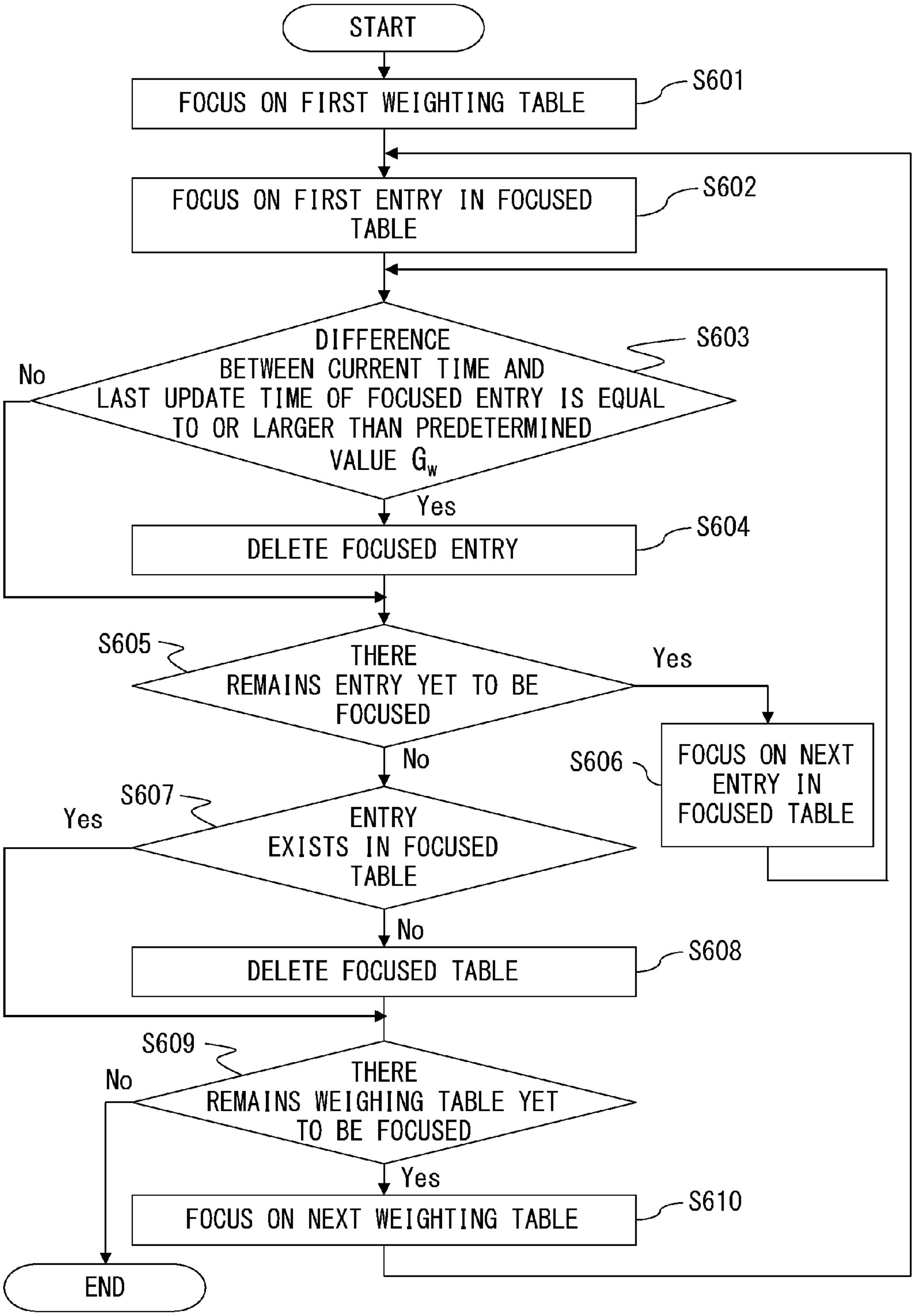
F I G. 1 8

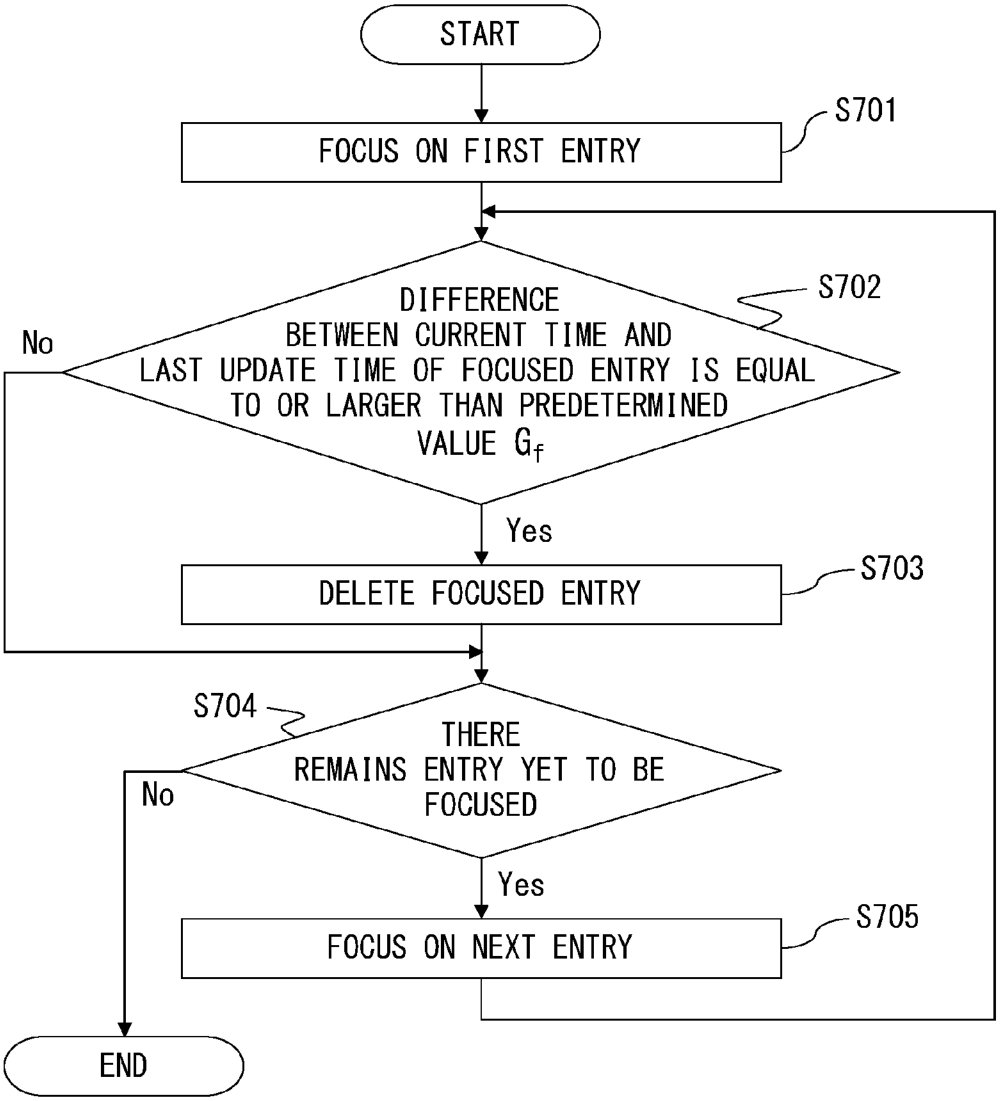
F I G. 1 9

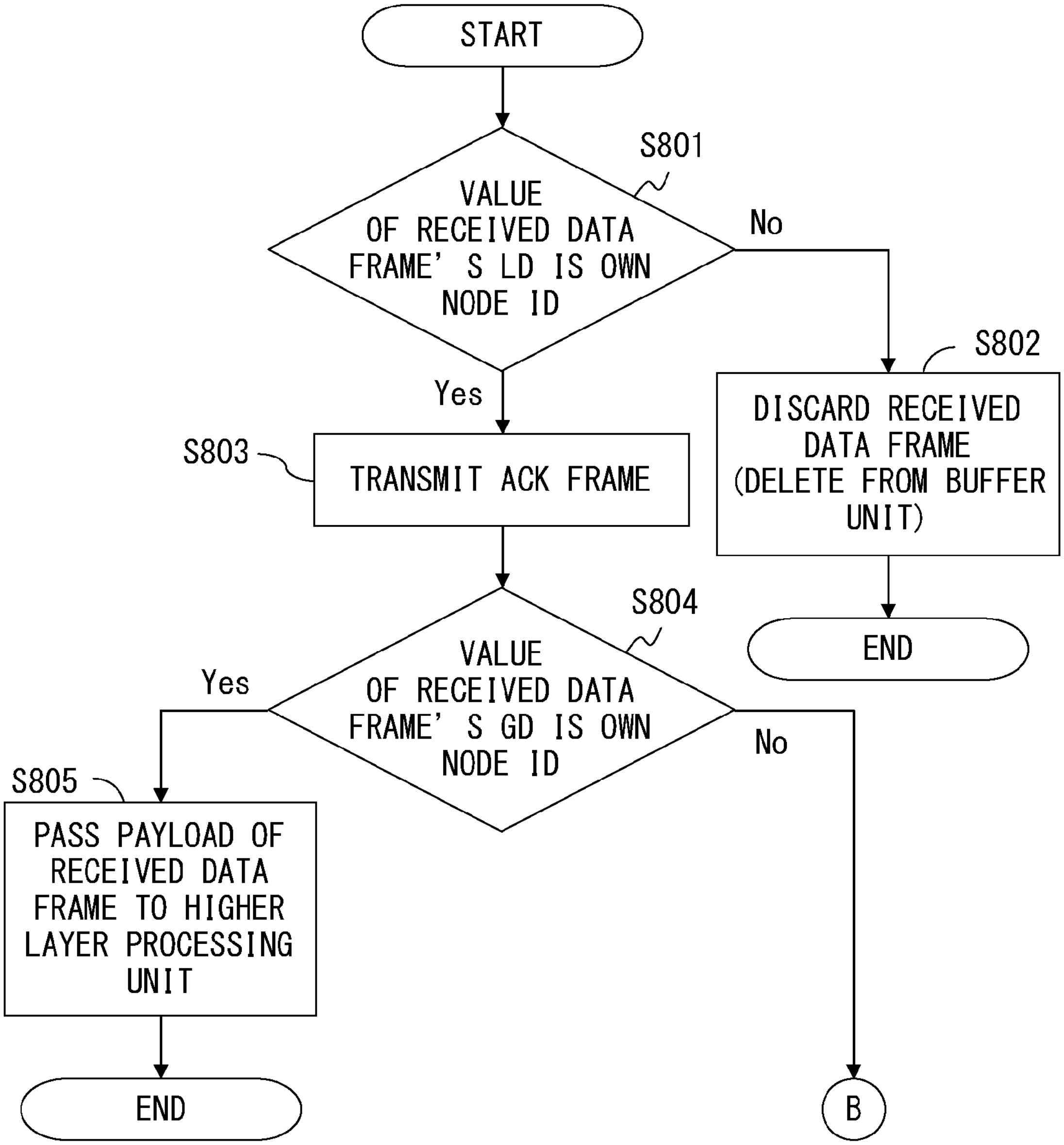
F I G. 2 0

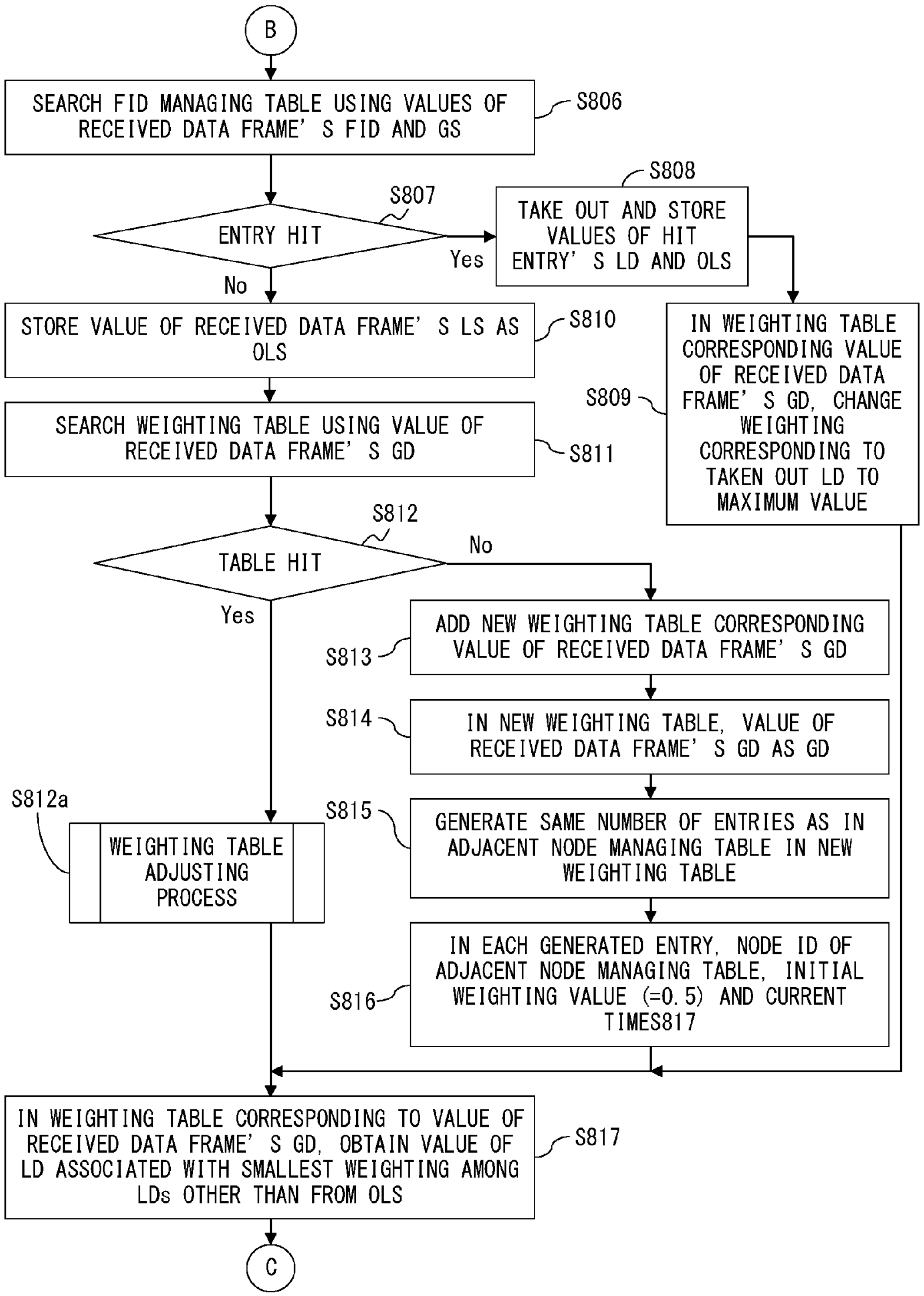
F I G. 2 1

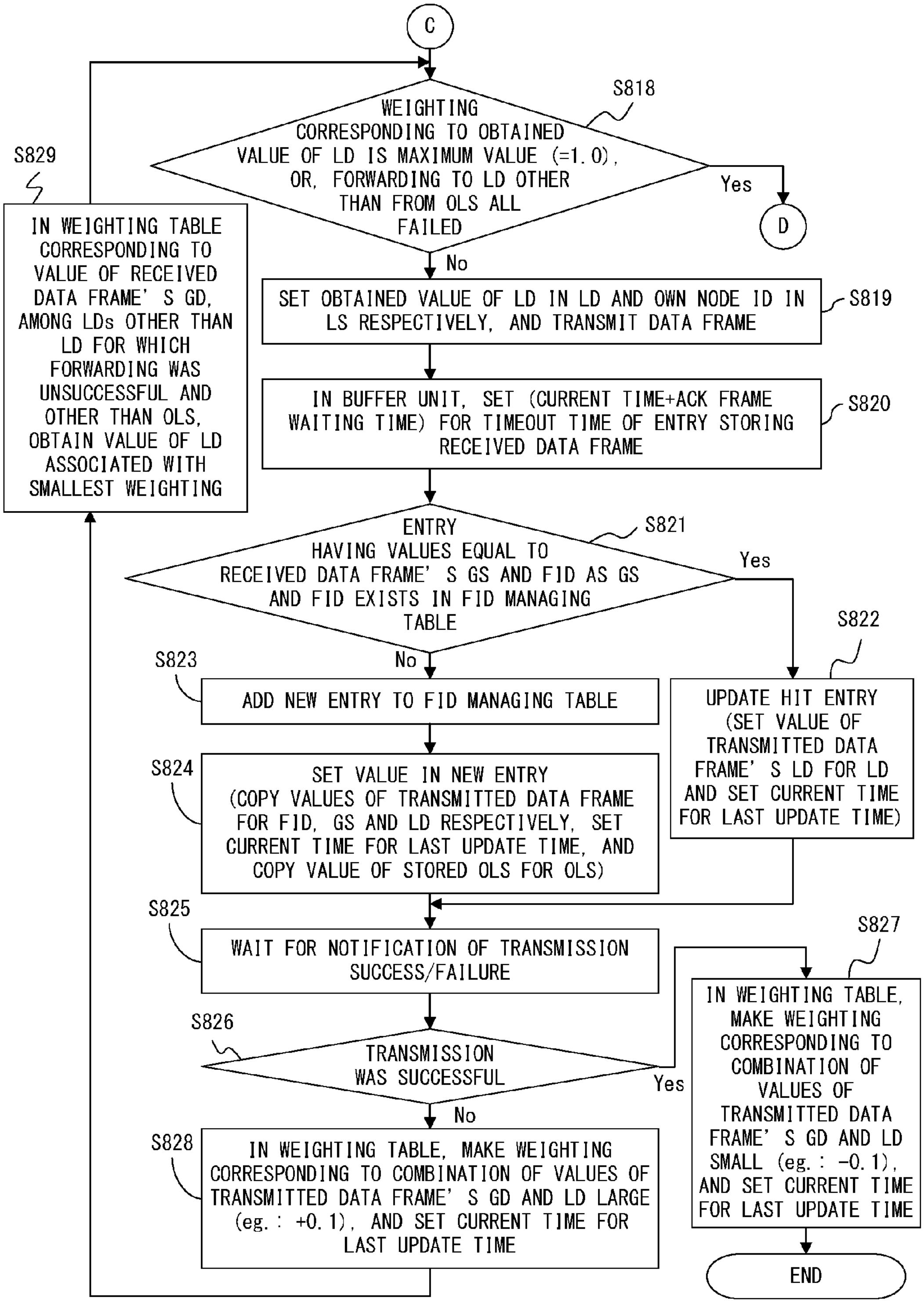
F I G. 2 2

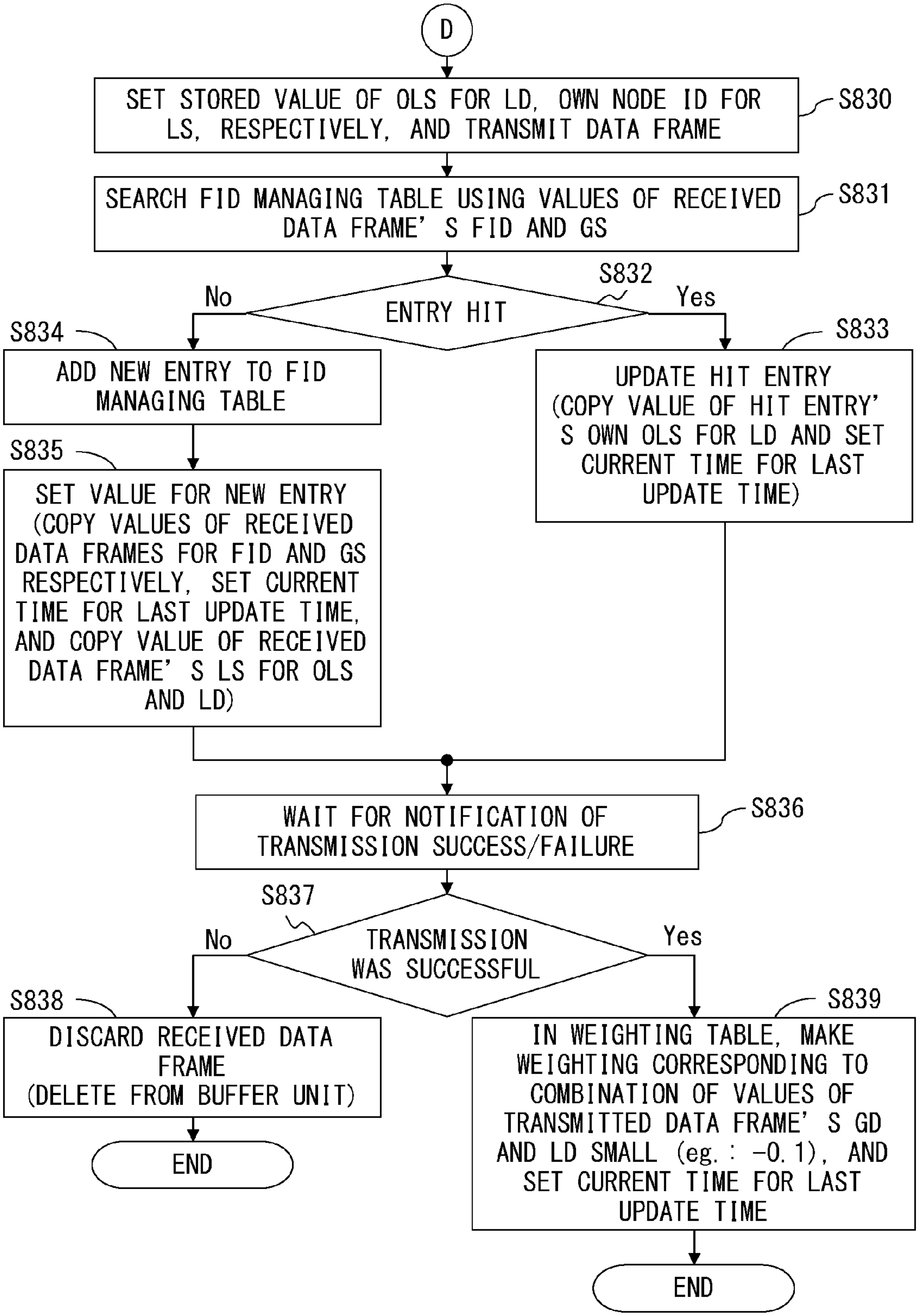
F I G. 23

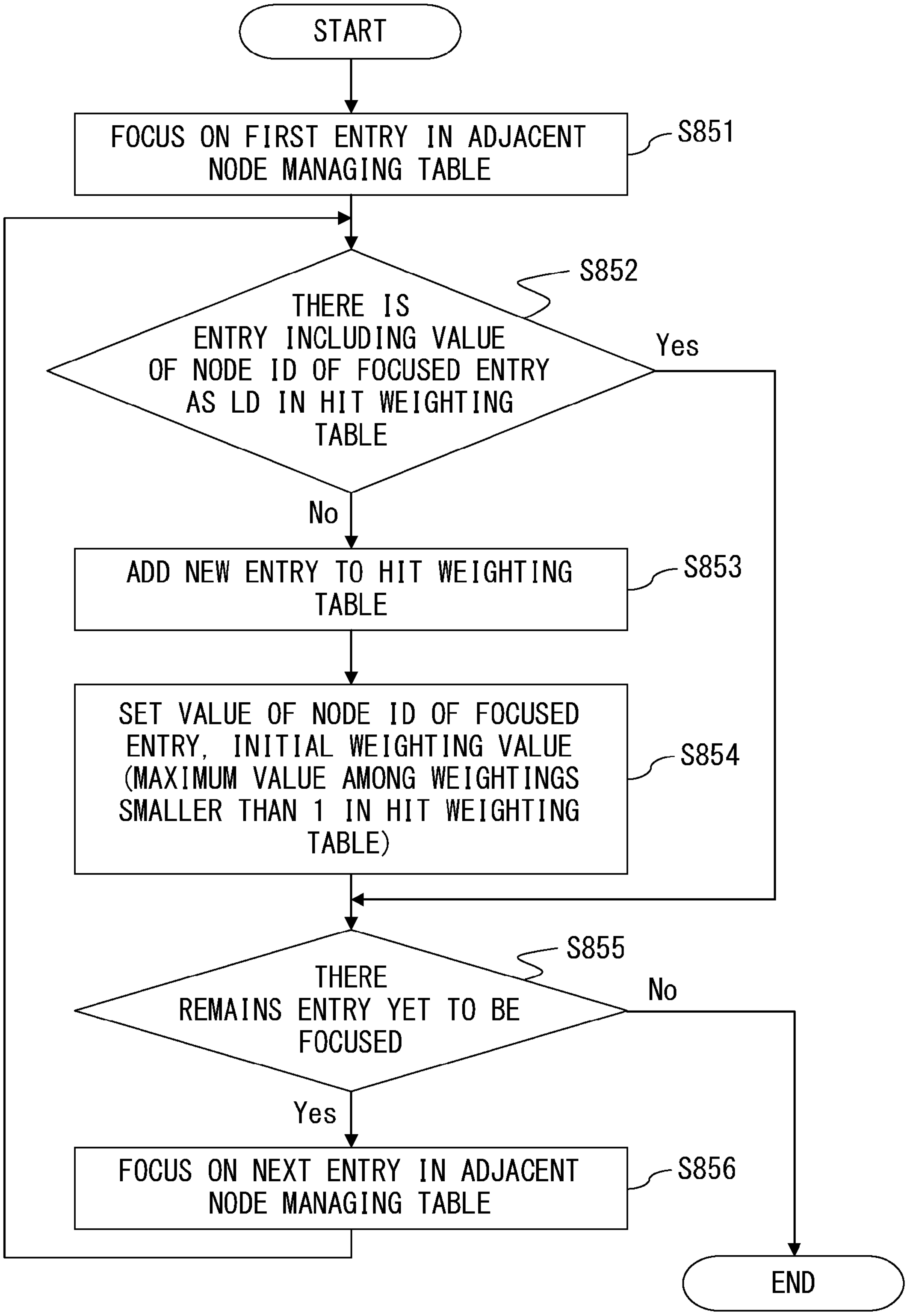
F I G. 2 4

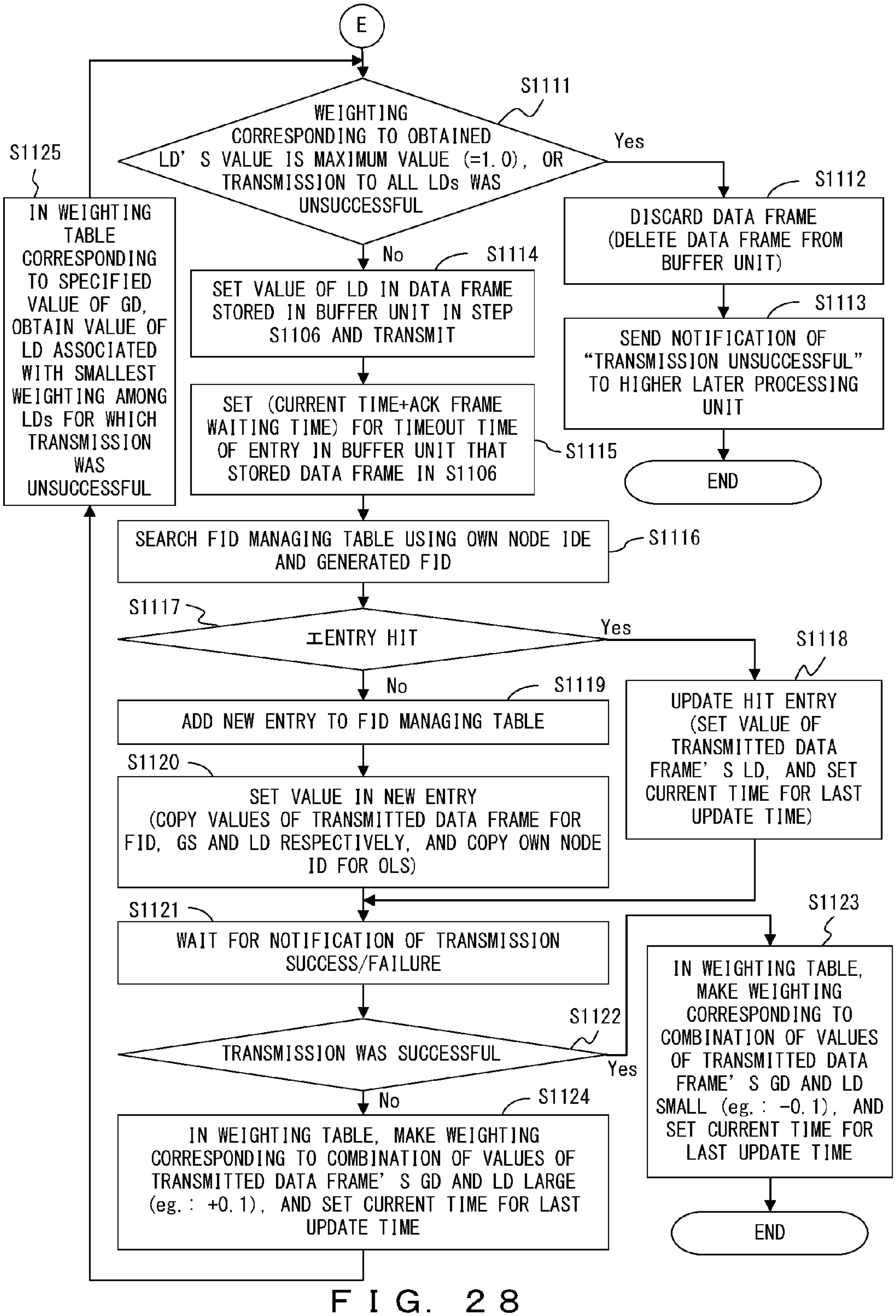
F I G. 28

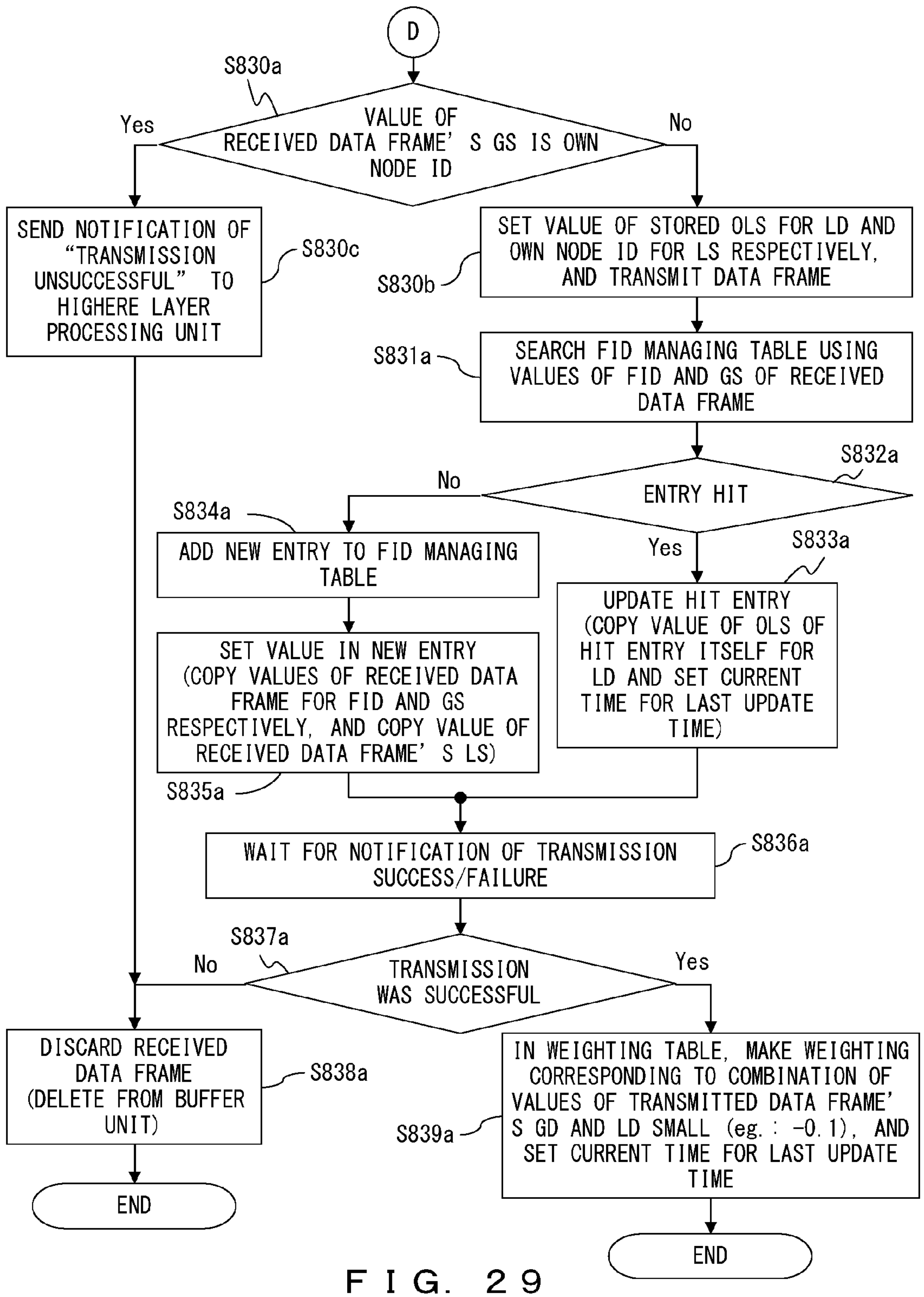
F I G. 2 9

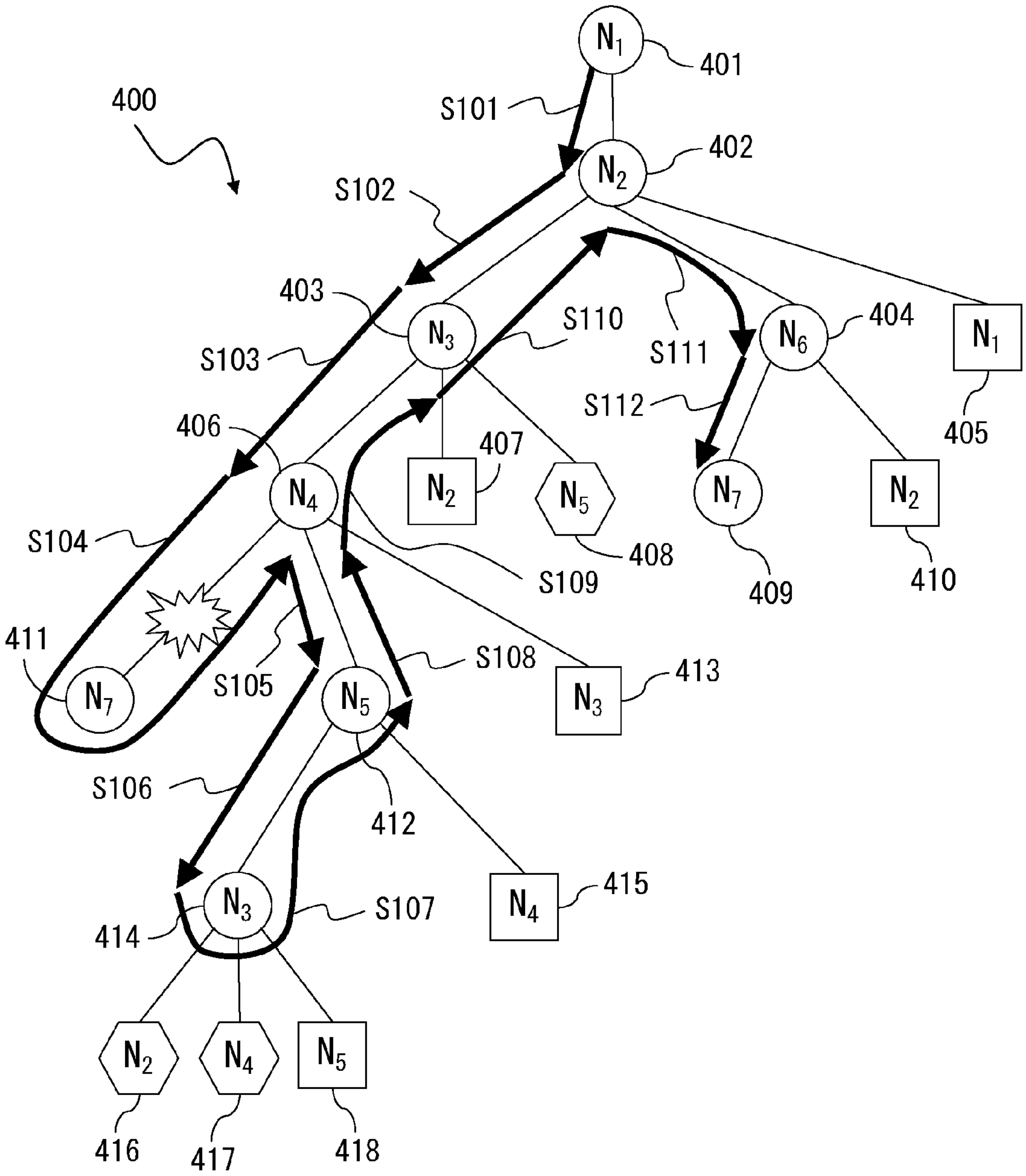
F I G. 3 0

103a-$N_2$

| NODE ID | PORT ID | LAST UPDATE TIME |
|---|---|---|
| $N_1$ | $Q_{2,1}$ | $TA_{2,1}$ |
| $N_3$ | $Q_{2,3}$ | $TA_{2,3}$ |
| $N_6$ | $Q_{2,6}$ | $TA_{2,6}$ |

F I G. 3 3

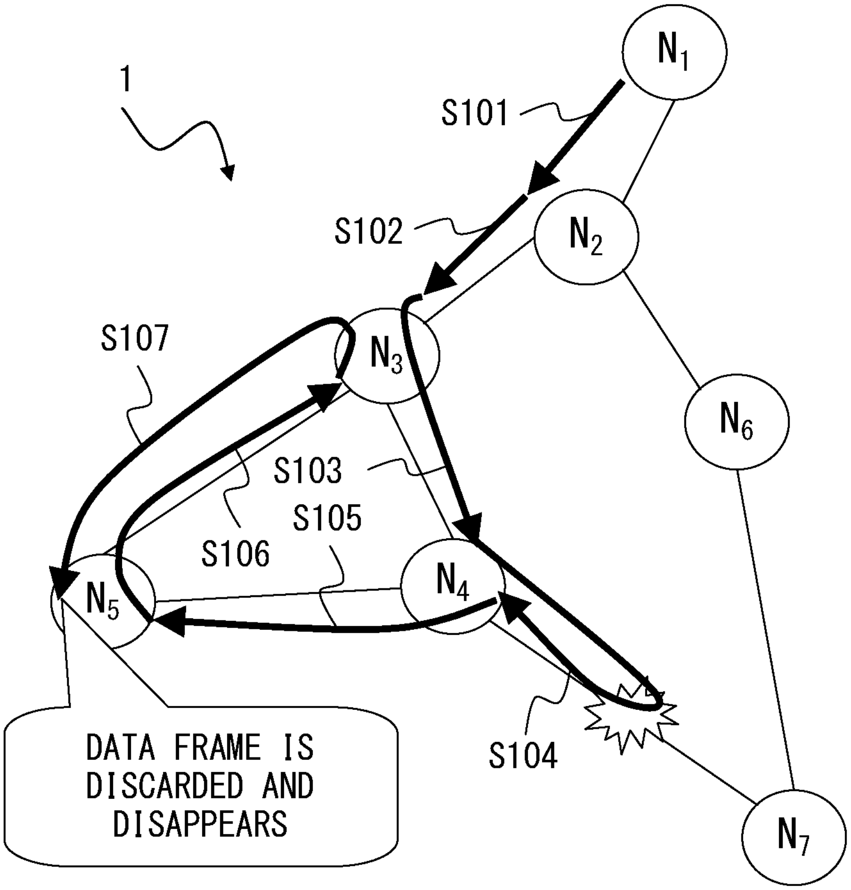
F I G. 3 4

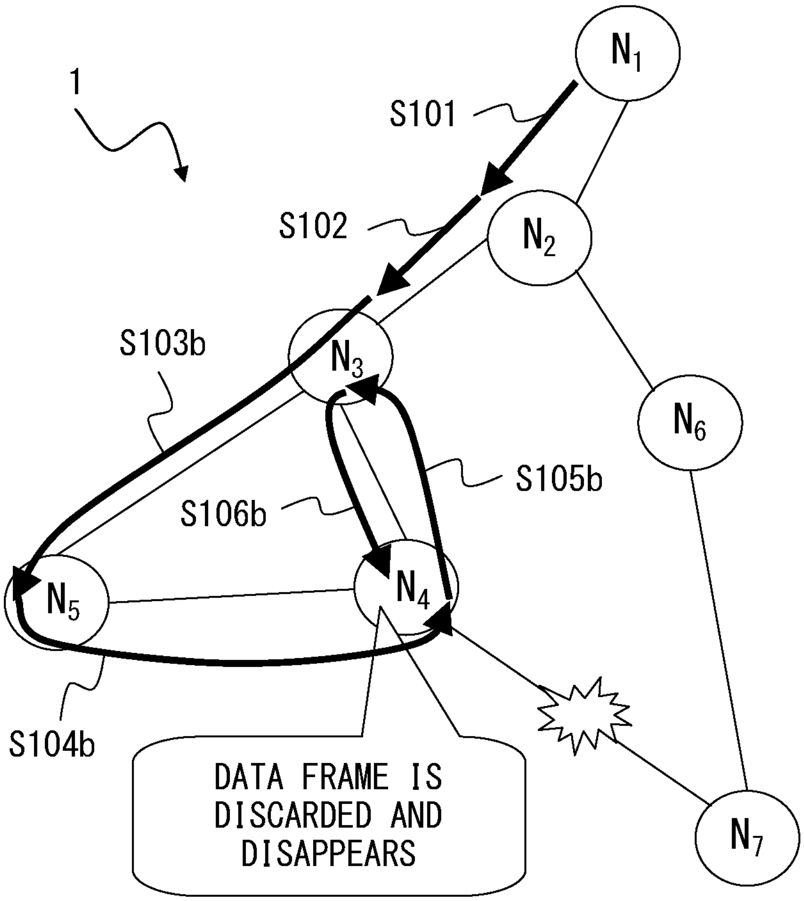
F I G. 3 5

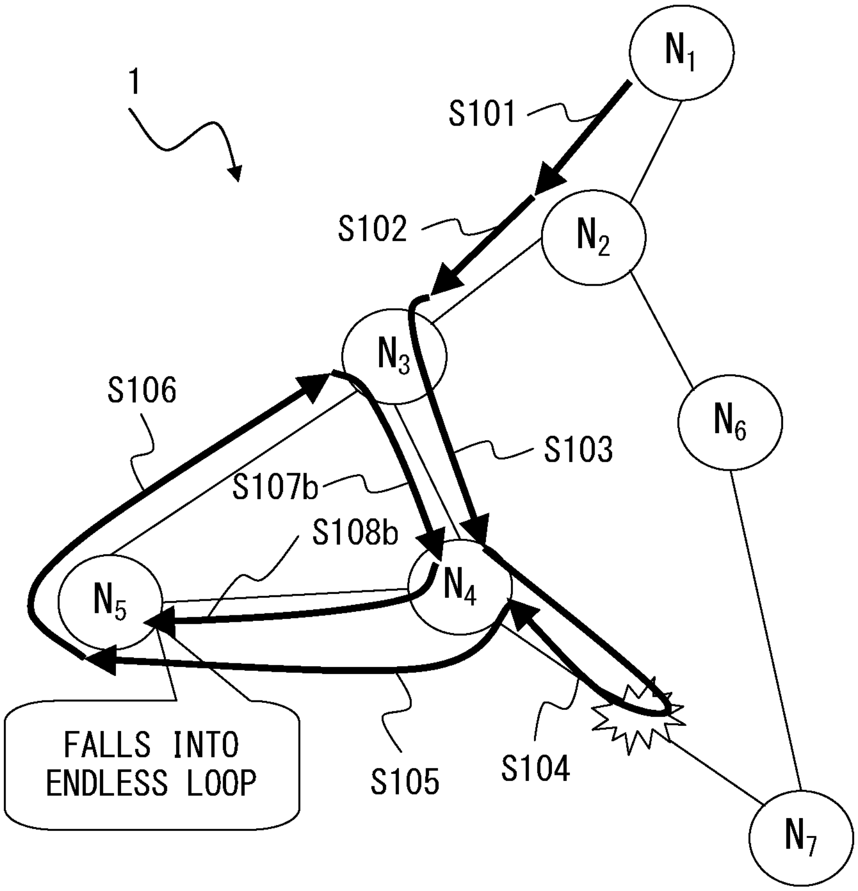
F I G. 3 6

NODE APPARATUS, STORAGE MEDIUM AND FRAME TRANSMITTING METHOD

CROSS-REFERENCE TO RELATED APPLICATION

This application is a continuation application based on International Application No. PCT/JP2009/003537, filed on Jul. 27, 2009, the entire contents of which are incorporated herein by reference.

FIELD

The present invention relates to a node apparatus in which path selection is available, in a network including a plurality of nodes.

BACKGROUND

A significantly large amount of study has been conducted for network apparatuses. The most popular one is a network apparatus using IP (Internet Protocol) network. In addition, MPLS (Multi Protocol Label Switching) aiming at accommodating a plurality of protocols and networks is a technique related to a network apparatus that has a mechanism to automatically generate a path. Meanwhile, typical examples of ad-hoc algorithm include AODV (Ad-hoc On-Demand Vector) and OLSR (Optimized Link State Routing).

In an IP network apparatus, routing for a packet is performed according to the IP address. The IP address has a tree structure. Therefore, through procedures as described below, a packet can be transmitted to a terminal being the final target. That is, sequentially from the higher octet of the destination IP address of the packet, search for a network apparatus managing the IP network corresponding to the IP address that matches with the destination IP address by prefix search, and transmission of the packet to the detected network apparatus are repeated.

Routing is determined according to the IP address scheme. A routing table defines which network apparatus manages which IP network. While the routing table is often set manually, it may be updated automatically by RIP (Routing Information Protocol). RIP is a system in which network apparatuses broadcast the IP networks they manage to their surroundings, for the network apparatuses to check with each other the IP networks they manage.

In MPLS, the network is separated into an internal network being a network between network apparatuses called LSR (Label Switch Router), and an external network. A frame from the external network is taken into the internal network by an apparatus called an edge node (that is, a network apparatus that straddle both the external network and the internal network).

At this time, a label is inserted to the head of the external frame. Each LSR has a label forwarding table. The label forwarding table holds the label of the input frame and the label and destination of the output frame. LSR takes out the label of an input frame, finds the corresponding label from the label forwarding table, changes to the label of the output frame, and sends out to the corresponding destination.

The process described above is performed by LDP (Label Distribution Protocol) in the label forwarding table. LDP is a protocol in which generation of a routing table by RIP and the like is performed first, a label is added to it, and notification between adjacent nodes is performed.

AODV is a method in which, using broadcast for path search, other communication node apparatuses repeat broadcasting to find the path to the target node apparatus. The communication apparatus transmits a frame called "Route Request (RREQ)" to its surroundings to find the target path. The frame clearly states the communication node ID of the search target.

Communication node apparatus in the surrounding generate, when themselves are not being searched, a new RREQ frame and repeat broadcasting to their surroundings. At this time, each communication node apparatus records from which adjacent node apparatus the message of the transmission source was received. When the RREQ message reaches the target communication node apparatus, the target communication node apparatus generates "Route Reply (RREP)" frame, and transmits the RREP frame so that it follows the path through which the RREQ frame was transmitted. As described above, a bidirectional communication path is created.

In OLSR (Optimized Link State Routing), a system is adopted in which communication node apparatuses exchange frames with each other regularly, to understand the entire network and to detect the path to the target communication node. Communication node apparatuses send out HELLO frames periodically, to send notification of existence to each other. When the existence of the communication node apparatus to be the communication partner is identified, a path for flooding to distribute a frame to the entire network efficiently is generated. This is called MPR (Multi Point Relay).

According to MPR, frames may be broadcasted to the entire network efficiently from each communication node apparatus. Next, node apparatuses distribute TC (Topology Control) frames being a path generation message to each other using the MPR, all the node apparatuses may know the network topology.

In order to send a frame to a target communication node apparatus, the communication node apparatus to be the transmission source refers to the network topology that itself knows, and hands over the node to the adjacent communication node apparatus to which it should be sent. The adjacent node apparatus performs the process similarly, and the frame is delivered to the target node apparatus eventually.

Regarding the ad-hoc wireless communication network, for example, the following technique has also been disclosed. That is, each node broadcasts information as notification of the existence of own node as a HELLO message, and information including the route metric to own node. Then, another node that received the HELLO message adds, to the received route metric, the route metric for the route between the node that has broadcast the HELLO message and own node, and uses the route metric after the addition. The route metric here is a value indicating the cost for the transmission source and the destination calculated by factors such as the number of hops, link quality, and so on.

The technologies described in the following documents are well known.

Document 1:
Japanese National Publication of International Patent Application No. 2006-526937
Document 2:
Japanese Laid-open Patent Publication No. 2003-273964
Document 3:
Japanese Laid-open Patent Publication No. 2002-271399
Document 4:
Japanese Laid-open Patent Publication No. 2006-340165
Document 5:
Japanese Laid-open Patent Publication No. 2001-298488
Document 6:
Japanese Laid-open Patent Publication No. 2006-33275

Document 7:
Japan Patent No. 4173842
Document 8:
Tadashige IWAO, Kenji YAMADA, Koji NOMURA, Takeshi HOSOKAWA. "Multipurpose Practical Sensor Network: S-wire". *FUJITSU* magazine, May 2006 (VOL. 57, NO. 3), pp. 285-290.

As described above, while a large amount of studies have been conducted for network techniques, there has been a following problem for various network systems that assume that each node apparatus within the network recognizes the network topology. That is, since the network environment may change dynamically, even if anode apparatus attempts to transmit data in a data transmission phase based on the network topology recognized in advance in the path generation phase, the transmission is not necessarily successful.

SUMMARY

In an aspect, a node apparatus is provided. The node apparatus includes a receiver, a first storage, a second storage, an updating unit, a transmitter and a backtracking unit.

The receiver receives a frame from arbitrary one of a plurality of adjacent node apparatuses.

The first storage stores in association with each other: frame identifying information that identifies a transmission target frame; adjacent destination node identifying information that identifies an adjacent destination node apparatus being a destination of the transmission target frame from among the plurality of adjacent node apparatuses; and original node identifying information that identifies an adjacent node apparatus that has first transmitted the transmission target frame.

The second storage stores transmission feasibility information that indicates feasibility of transmission to each of the plurality of adjacent node apparatuses in association with a final destination of a frame.

The updating unit updates the transmission feasibility information that is stored in the second storage in association with a received-frame destination that is a final destination specified in a received frame received by the receiver, when received-frame identifying information that identifies the received frame is stored in the first storage as the frame identifying information, so that the feasibility of transmission to a first adjacent node apparatus identified by the adjacent destination node identifying information stored in the first storage in association with the received-frame identifying information indicates that the transmission is infeasible.

The transmitter selects a second adjacent node apparatus to which transmission is feasible from among the plurality of adjacent node apparatuses according to the transmission feasibility information stored in the second storage in association with the received-frame destination, and transmits the received frame to the second adjacent node apparatus.

The backtracking unit transmits the received frame to a third adjacent node apparatus that is memorized by the original node identifying information stored in the first storage in association with the received-frame identifying information when the transmission feasibility information in the second storage indicates that there is no adjacent node apparatus to which transmission is feasible among the plurality of adjacent node apparatuses and when the received-frame identifying information is stored in the first storage as the frame identifying information.

The object and advantages of the invention will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram illustrating the second example of the network configuration.

FIG. 4 is a diagram illustrating the hardware configuration of the node apparatus in the first embodiment.

FIG. 5 is a diagram describing learning of weighting focusing on a node apparatus.

FIG. 7 is a diagram illustrating an example of a frame.

FIG. 8 is a diagram illustrating an example of data stored in the buffer unit 109 in FIG. 3.

FIG. 9 is a diagram illustrating an example of the adjacent node managing table 103 in FIG. 3.

FIG. 10 is a diagram illustrating an example of the weighting table 104 in FIG. 3.

FIG. 11 is a diagram describing the change of the weighting table 104-1-N3 in FIG. 10.

FIG. 12 is a diagram (part 1) illustrating an example of the FID managing table 105 in FIG. 3.

FIG. 13 is a diagram (part 2) illustrating an example of the FID managing table 105 in FIG. 3.

FIG. 14 is a flowchart of a frame reception process.

FIG. 15 is a flowchart of a HELLO frame reception process in step S203 in FIG. 14.

FIG. 17 is a flowchart of an aging process of the adjacent node managing table 103.

FIG. 18 is a flowchart of an aging process of the weighting table 104.

FIG. 19 is a flowchart of an aging process of the FID managing table.

FIG. 20 is a flowchart (part 1) of a data frame reception process in step S205 in FIG. 14.

FIG. 21 is a flowchart (part 2) of a data frame reception process in step S205 in FIG. 14.

FIG. 22 is a flowchart (part 3) of a data frame reception process in step S205 in FIG. 14.

FIG. 23 is a flowchart (part 4) of a data frame reception process in step S205 in FIG. 14.

FIG. 24 is a flowchart of a weighting table adjustment process in step S**812*a* in FIG. 21**.

FIG. 28 is a flowchart (part 2) of a transmission process in a case in which the node apparatus 100 becomes GS and transmits the data frame.

FIG. 29 is a flowchart of a process that the node apparatus 100 that may become GS performs instead of the process in FIG. 23.

FIG. 30 is a diagram illustrating path selection in FIG. 6 in the format of a search tree representing a search space for searching the path.

FIG. 33 is a diagram illustrating an example of the adjacent node managing table 103*a* in the second embodiment.

FIG. 34 is a diagram (part 1) describing the first comparison example with loop judgment and without the backtracking operation.

FIG. 35 is a diagram (part 2) describing the first comparison example with loop judgment and without the backtracking operation.

FIG. 36 is a diagram describing the second comparison example where a pseudo backtracking operation is performed but loop judgment is not performed.

DESCRIPTION OF EMBODIMENTS

Preferred embodiments of the present invention will be explained with reference to accompanying drawings.

Hereinafter, some embodiments are described in detail with reference to the drawings. Specifically, examples of the network configuration are described first with reference to FIG. 1 and FIG. 2, and the first embodiment is described with reference to FIGS. 3-31. After that, the second embodiment is described with reference to FIGS. 32-33, and other embodiments are also described. Finally, the common advantages of the embodiments are described by comparison with two comparison examples illustrated in FIGS. 34-36.

Figure 1:
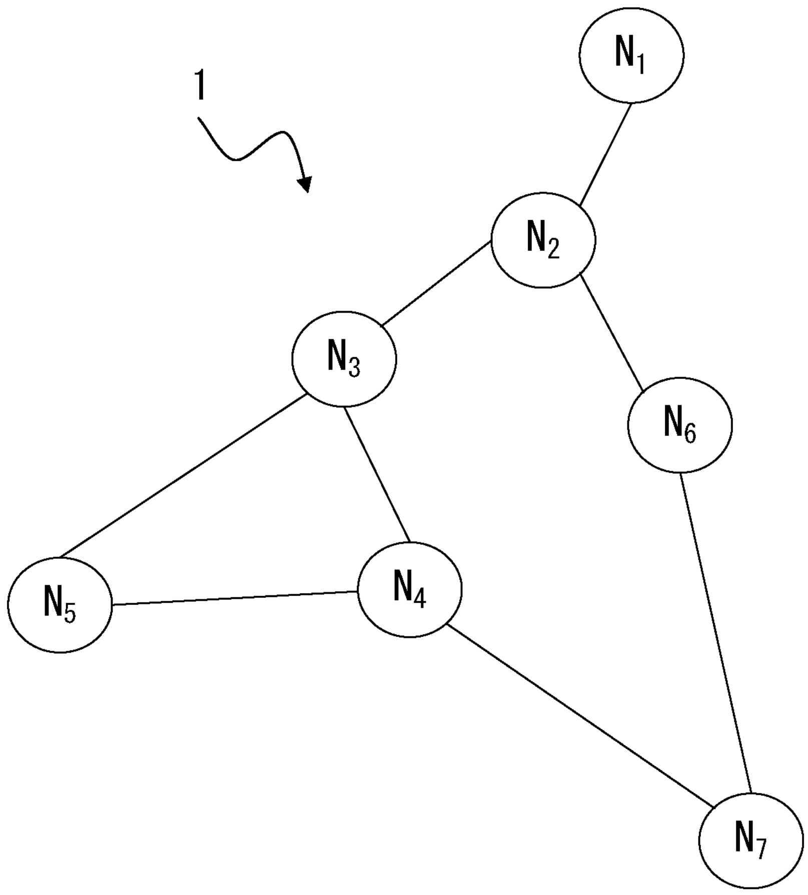
FIG. 1 is a diagram illustrating the first example of the network configuration.

FIG. 1 is a diagram illustrating the first example of the network configuration. A network 1 in FIG. 1 is an example of an ad-hoc network to which the following embodiments may be applied, and includes a plurality of node apparatuses. Meanwhile, hereinafter, a "node apparatus" may simply be referred to as a "node" in descriptions from the viewpoint of network topology.

To each node apparatus within the network 1, unique identifying information within the network 1 (hereinafter, referred to as "node ID (identification)" is assigned in advance. Hereinafter, it is assumed that a reference symbol "$N_i$" indicates the node ID, and for example, a node apparatus to which $N_i$ is assigned as the node ID is referred to as "node apparatus $N_i$". Meanwhile, hereinafter, $N_i$ being the node ID assigned to itself for the node apparatus $N_i$ may be referred to as the "own node ID" (in FIG. 1, $1 \le i \le 7$).

In addition, a link is indicated by a solid line in FIG. 1. Specifically, the topology of the network 1 is as follows. That is, a link respectively exits between the node apparatuses $N_1$ and $N_2$, between the node apparatuses $N_2$ and $N_3$, between the node apparatuses $N_2$ and $N_6$, between the node apparatuses $N_3$ and $N_4$, between the node apparatuses $N_3$ and $N_5$, between the node apparatuses $N_4$ and $N_5$, between the node apparatuses $N_4$ and $N_7$, and between the node apparatuses $N_6$ and $N_7$.

Meanwhile, hereinafter, a "link" may be either a wireless link or a wired link. When node apparatuses $N_i$ and $N_j$ may communicate information directly and wirelessly without relaying by another node apparatus $N_k$, "a wireless link exists between the node apparatuses $N_i$ and $N_j$ (in FIG. 1, $1 \le i, j, k \le 7$ Meanwhile, when node apparatuses $N_i$ and $N_j$ are directly connected by a cable and the node apparatuses $N_i$ and $N_j$ may communicate information through the cable, "a wired link exists between the node apparatuses $N_i$ and $N_j$."

Meanwhile, when a wireless or wired link exists between node apparatuses $N_i$ and $N_j$, "the node apparatuses $N_i$ and $N_i$ are adjacent to each other". In other words, the node apparatuses $N_j$ is an adjacent node apparatus for the node apparatuses $N_i$, and the node apparatuses $N_i$ is an adjacent node apparatus for the node apparatuses $N_j$.

Meanwhile, to the network 1 in FIG. 1, a new node apparatus may be added, or any of the node apparatuses $N_1$-$N_7$ may be removed and disappear from the network 1. In addition, the link may not be static, and may change dynamically.

For example, a wireless link may be newly established or a wireless link that was established previously may disappear between the node apparatuses $N_i$ and $N_j$ by the influence of weather, a shielding matter and so on. If the node apparatus is mobile, the presence/absence of a link may change due to variation in the distance between the node apparatuses. In addition, a wired link may be newly established or a wired link that was established previously may disappear due to connection change of the cable, and a wired link may disappear due to a failure such as breakage of the cable.

According to the embodiments described below, even in an environment where nodes and links change dynamically as described above, transmission of data is performed while an available and appropriate path is found dynamically according to the status of the network 1 at the time when the data is transmitted. Moreover, path selection according to the dynamic change of the topology is realized in an autonomously-distributed manner without the need that the node apparatuses $N_1$-$N_7$ recognize the topology of the entire network 1 that changes dynamically.

By the way, while details are to be described with FIG. 7, hereinafter, PDU (Protocol Data Unit) transmitted/received between node apparatuses is referred to as a "frame". Data transmission/reception within the network 1 is used using frames, and the node apparatus being the transmission source of a frame is referred to as "GS (global source)" below, and the node apparatus being the destination of a frame is referred to as "GD" (Global Destination) below.

For example, when the node apparatus $N_1$ is the GS and the node apparatus $N_7$ is the GD, since the node apparatus $N_1$ and $N_7$ are not adjacent in the network 1, the frame is relayed by another node apparatus, and as a result, the frame reaches the node apparatus $N_7$. For example, the frame may be transmitted from the node apparatus $N_1$ to the node apparatus $N_2$, transmitted from the node apparatus $N_2$ to the node apparatus $N_6$, and may be transmitted from the node apparatus $N_6$ to the node apparatus $N_7$. Hereinafter, the path is represented by a tuple such as $\langle N_1, N_2, N_6, N_7 \rangle$.

In the example of the path $\langle N_1, N_2, N_6, N_7 \rangle$, when a frame is transmitted from the node apparatus $N_1$ to the node apparatus $N_2$, while the final destination of the frame is the node apparatus $N_7$ being the GD, the direct destination of the frame is the node apparatus $N_2$ that is adjacent to the node apparatus $N_1$. Hereinafter, in the transmission of a frame between two adjacent node apparatus as described above, the node apparatus being the transmission source of the frame is referred to as "LS (Local Source)", and the node apparatus being the destination of the frame is referred to as "LD (Local Destination)". For example, the LS and LD in a case in which a frame is relayed from the node apparatus $N_1$ to the node apparatus $N_7$ via the node apparatuses $N_2$ and N6 as described above are as follows.

When the frame is transmitted first from the node apparatus $N_1$ that is also the GS to the node apparatus $N_2$ that is adjacent to the node apparatus N1, the LS is the node apparatus $N_1$, and the LD is the node apparatus $N_2$. Next, when the frame is transmitted from the node apparatus $N_2$ to the node apparatus $N_6$ that is adjacent to the node apparatus $N_2$, the LS is the node apparatus $N_2$ and the LD is the node apparatus $N_6$. Then, when the frame is transmitted from the node apparatus $N_6$ to the node apparatus $N_7$ that is adjacent to the node apparatus $N_6$ and is also the GD, the LS is the node apparatus $N_6$, and the LD is the node apparatus $N_7$.

Meanwhile, one or a plurality of node apparatus in the network 1 may be connected to a network device that is not illustrated in a drawing belonging to another network (hereinafter, referred to as an "external network").

For example, the node apparatus $N_7$ may be connected to a gateway apparatus of the external network including a data managing server by a wired link or a wireless link. Then, data transmitted in the network 1 with the node apparatus $N_7$ being specified as the GD may be transmitted from the node apparatus $N_7$ to the data managing server via the gateway apparatus and may be managed in the data managing server.

Next, another example of the network is described with reference to FIG. 2. FIG. 2 is a diagram illustrating the second example of the network configuration. A network 2 in FIG. 2 is also an example of an ad-hoc network to which the following embodiments may be applied, including a plurality of node apparatuses. In addition, in the same manner as the network 1 in FIG. 1, the network 2 may also be connected to an external network that is not illustrated in the drawing.

The network 2 includes node apparatuses $N_{101}$-$N_{120}$. FIG. 2 is a diagram of representation with a focus on a node apparatus $N_{105}$ in the node apparatuses $N_{101}$-$N_{120}$. That is, the node apparatus $N_{105}$ represented with the solid-line circle only needs to recognize the existence and the node IDs of the directly-communicable, adjacent three node apparatuses $N_{107}$, $N_{111}$, and $N_{112}$, and does not need to recognize the topology of the entire network 2.

In FIG. 2, the parts that the node apparatus $N_{105}$ recognizes are represented with a solid line, and the parts that the node apparatus $N_{105}$ does not need to recognize are represented with a broken line. That is, in FIG. 2, only the following are that exist within the range of the number of hop 1 from the node apparatus $N_{105}$ are represented with a solid line.

The node apparatus $N_{105}$ itself

The three node apparatuses $N_{107}$, $N_{111}$ and $N_{112}$ adjacent to the node apparatus $N_{105}$ The three links that respectively connect to the node apparatus $N_{105}$ to the three adjacent node apparatuses $N_{107}$, $N_{111}$ and $N_{112}$.

According to the embodiments described below, like the node apparatus $N_{105}$, each node apparatus in the network only needs to recognize adjacent node apparatuses. Therefore, even if the scale of the network expands, it does not end up in a situation where "each node apparatus performs communication of control information to recognize the network topology, increasing the load on the network and impairing the performance for the communication system as a whole".

Hereinafter, embodiments that may be applied to a network having any topology such as the network 1 in FIG. 1 and the network 2 in FIG. 2 are described specifically. First, the first embodiment is described with reference to FIGS. 3-31, and for other embodiments, differences over the first embodiments are mainly described.

Regarding the first embodiment, first, the configuration of the node apparatus is described with reference to FIG. 3 and FIG. 4, and the outline of the operation of the node apparatus is described with reference to FIG. 5. Then, the outline of "how the dynamic path selection is realized in the network 1 in FIG. 1 as a whole with each node apparatus behaving in an autonomously-distributed manner as in FIG. 5" is described with reference to FIG. 6.

After that, an example of a frame is described with reference to FIG. 7, examples of various information that each node apparatus stores are described with reference to FIG. 8-FIG. 13, and details of the processes performed by each node apparatus are described with reference to FIG. 14-FIG. 29. Then, in light of details of FIG. 7-FIG. 29, the behavior of the network 1 as a whole is described again with reference to FIG. 30 and FIG. 31.

Figure 3:
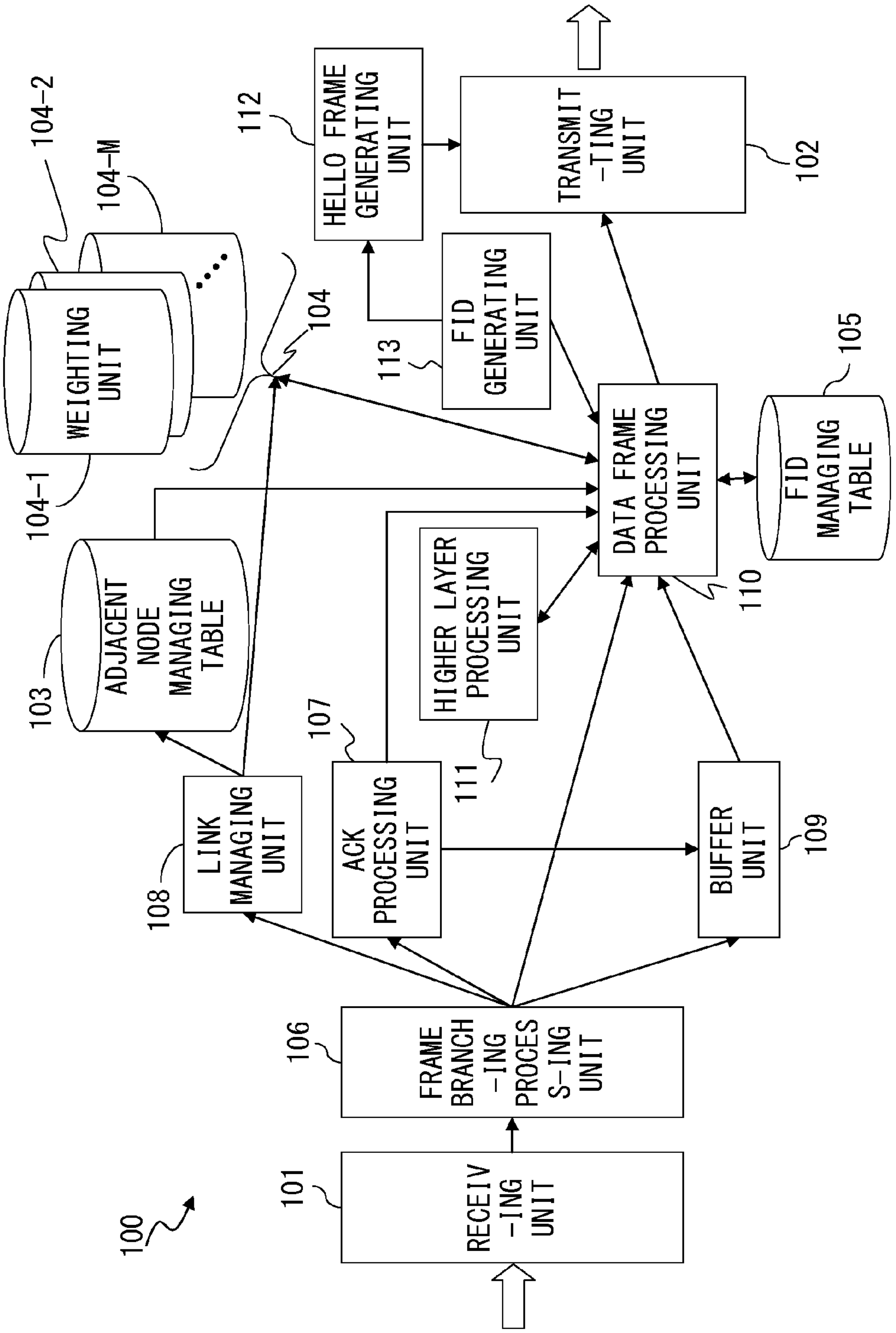
FIG. 3 is a function block diagram illustrating the configuration of a node apparatus in the first embodiment.

Then, FIG. 3 is a function block diagram illustrating the configuration of a node apparatus in the first embodiment. Each node apparatus in FIG. 1 and FIG. 2 is, specifically, a node apparatus 100 illustrated in FIG. 3 for example.

The node apparatus 100 has a receiving unit 101 to receive a frame and a transmitting unit 102 to transmit a frame. In addition, the node apparatus 100 has an adjacent node managing table 103, a weighting table 104, and an FID (Frame Identification) managing table 105 to store various information used for transmission of a frame.

Furthermore the node apparatus 100 has a frame branching processing unit 106 to judge the type of a frame that the receiving unit 101 receives. While details of the form are to be described later with FIG. 7, at least three types of frames "data frame", "HELLO frame" and "ACK (ACKnowledgment) frame" are used.

The node apparatus 100 has an ACK processing unit to perform processing regarding the ACK frame, and a link managing unit 108 to perform processing in response to reception of a HELLO frame. In addition, the node apparatus 100 has a buffer unit 109 and a data frame processing unit 110 for performing processing in response to reception of a data frame. Furthermore the node apparatus 100 has a higher layer processing unit 111, a HELLO frame generating unit 112 and an FID generating unit 113.

Each unit of the node apparatus 100 operates as follows.

The receiving unit 101 receives a frame, and outputs the received frame to the frame branching processing unit 106. Then, the frame branching processing unit 106 judges the type of the frame.

When a HELLO frame is received, the frame branching processing unit 106 outputs the received HELLO frame to the link managing unit 108. The link managing unit 108 manages the adjacent node managing table 103, and is further involved in the management of the weighting table 104 as well.

Here, the HELLO frame is a type of the control frame for communicating control information, which is, specifically, a frame for the node apparatus 100 to send notification of existence of itself to other node apparatuses. Therefore, as details are described later with FIG. 15, the link managing unit 108 recognizes existence of an adjacent node apparatus with the reception of a HELLO frame as a trigger, and reflects the recognition result to the adjacent node managing table 103. That is, the adjacent node managing table 103 is a table for the node apparatus 100 to memorize other node apparatuses that are adjacent to the node apparatus 100.

Meanwhile, since the status of the network may change dynamically, in some cases, another node apparatus that has been recognized the link managing unit 108 as an adjacent node apparatus may become unrecognizable as an adjacent node apparatus. Therefore, as details are described later with FIG. 17, the link managing unit 108 also performs an aging process to delete an entry related to the node apparatus that has become unrecognizable as an adjacent node apparatus from the adjacent node managing table 103.

In addition, in the first embodiment, the link managing unit 108 performs addition, deletion or update of the weighting table 104 in accordance with change in adjacent node apparatuses.

Here, the weighting table 104 is a table for managing information for deciding to which adjacent node apparatus a frame is to be transmitted, for each GD. FIG. 3 illustrates weighting tables 104-1 through 104-M provided corresponding to each of M units of GDs. The “weighting table 104” herein is a generic term for the weighting tables 104-1 through 104-M. In addition, at the time when the operation of the node apparatus 100 starts, the weighting table 104 does not exist, where M=0.

Specifically, the weighting table 104 manages, for each GD, “which adjacent node apparatus the node apparatus 100 itself may select, in order to make the frame reach the GD eventually”. In other words, the weighting table 104 holds, regarding one or more node apparatuses that are adjacent to the node apparatus 100, the degree of priority in selecting them as the LD, as weighting.

From another perspective, a given adjacent node apparatus being “selectable as the LD” means that the feasibility of transmission of a frame to the adjacent node apparatus is “feasible”. Meanwhile, a given adjacent node apparatus being “not selectable as the LD” means that the feasibility of transmission of a frame to the adjacent node apparatus is “unfeasible”, and the degree of priority of the adjacent node apparatus is a predetermined lowest priority corresponding to the “unfeasibility”.

Therefore, when adjacent nodes apparatuses of the node apparatus 100 change in accordance with change in the status of the network, the link managing unit 108 adds, updates or deletes the weighting table 104 in accordance with the change in the adjacent node apparatuses, as details are described later with FIG. 15 and FIG. 18.

Meanwhile, when an ACK frame is received, the frame branching processing unit 106 outputs the received ACK frame to the ACK processing unit 107. Here, the ACK frame is a type of a control frame, which is a frame for sending, from the node apparatus being the LD of a data frame that the node apparatus 100 has transmitted to the node apparatus 100, notification of reception of the data frame.

Therefore, reception of an ACK frame means success of transmission of a data frame, and time out without reception of any ACK frame after a predetermined period of time passed means failure in transmission of a data frame. The ACK processing unit 107 performing time out monitoring of the ACK frame reception illustrated in FIG. 25 to be described later.

The buffer unit 109 stores the data frame in case of transmission failure and retransmission of the data frame. Therefore, as details are described later with FIG. 25, upon recognizing transmission success of a data frame with reception of an ACK frame as a trigger, the ACK processing unit 107 deletes the data frame that has become unwanted from the buffer unit 109. In addition, the ACK processing unit 107 sends notification of the success/failure of transmission of the data frame to the data frame processing unit 110.

Meanwhile, when a data frame is received, the frame branching unit 106 stores the received data frame in the buffer unit 109, and requests the data frame processing unit 110 to perform processes in FIG. 20-FIG. 23 described later.

Here, the data frame is a frame that includes data that the node apparatus being the GS attempts to deliver to the node apparatus being the GD as payload. In other words, the PDU of a protocol defined in a higher later than the layer in which the frame is defined in the first embodiment is included in the data frame as payload. The higher layer processing unit 111 processes PDU of the higher layer included in the data frame as payload, when the node apparatus 100 is the GS or the GD.

The outline of the operation of the data frame processing unit 110 that has received request for the data frame processing from the frame branching processing unit 106 is as follows.

The data frame processing unit 110 request the transmitting unit 102 to transmit an ACK frame in response to a data frame that the receiving unit 101. In addition, the data frame processing unit 110 determines whether or not the value of the GD of the received data frame is equal to the own node ID of the node apparatus 100. Then, when the value of the GD of the received data frame is different from the own node ID of the node apparatus 100, the data frame processing unit 110 determines which of (A1) and (A2) below the current reception corresponds to, by referring to the FID managing table 105.

(A1) A data frame that was previously transmitted with the node apparatus 100 being the LS has returned to the node apparatus 100 while being relayed within the network and has been received by the receiving unit 101.

(A2) A new frame other than (A1) above has been received by the receiving unit 101.

Upon determining that the current reception corresponds to (A2), the data frame processing unit 110 refers to the weighting table 104, selects an adjacent node apparatus to specify as the LD for forwarding the received data frame, and requests the transmitting unit 102 to forward the data frame.

On the other hand, upon determining that the current reception corresponds to (A1), the data frame processing unit 110 recognizes that the adjacent node apparatus selected previously as the LD was not an appropriate LD, and reflects the result of recognition to the weighting table 104. Then, the data frame processing unit 110 refers to the weighting table 104 to determine whether or not there still remains an adjacent node apparatus that is selectable as the LD.

In addition, the data frame processing unit 110 receives notification of transmission success or transmission failure of a data frame from the ACK processing unit 107, recognizes whether or not the adjacent node apparatus selected as the LD of the data frame is appropriate, and reflects the result of recognition to the weighting table 104.

Meanwhile, a given node apparatus $N_i$ being “selectable as the LD” intuitively means “it is worth selecting the adjacent node $N_i$ as the LD and seeing whether or not the frame successfully reaches the GD”. Specifically, a node apparatus $N_i$ being “selectable as the LD” means that it is “neither (B1) nor (B2) below”. Meanwhile, more detail meaning of the term “selectable” is apparent from description regarding FIG. 5 and description (F1)-(F2) and (G1)-(G4) regarding FIG. 22 below.

(B1) As a result of the node apparatus 100 selecting the adjacent node apparatus $N_i$ as the LD previously, a certain failure has occurred such as a loop, and it has already become clear that “the node apparatus $N_i$ is inappropriate as the LD”.

(B2) The LS (hereinafter, referred to as “Original Local Source” and “OLS” for short) at the time when the receiving unit 101 first received the data frame that the receiving unit 101 received this time was the node apparatus $N_i$.

If there remains another adjacent node apparatus selectable as the LD, the data frame processing unit 110 selects the selectable adjacent node apparatus and specifies it as the LD, and requests the transmitting unit 102 to forward the data frame. On the contrary, if there remains no adjacent node apparatus selectable as the LD, the data frame processing unit 110 operates as (C1) or (C2) below.

(C1) If the GS of the data frame received this time is other than the node apparatus 100, the data frame processing unit 110 selects the OLS as the LD to return the data frame to the OLS and requests the transmitting unit 102 to forward the data frame. The operation is an operation to make an adjacent node apparatus being the OLS recognize that "it is appropriate to select the node apparatus 100 as the LD", which corresponds to backtracking in path search as described later.

(C2) If the GS of the data frame received this time is the node apparatus 100 itself, it is the higher layer processing unit 111 that originally generated the data frame. Therefore, the data frame processing unit 110 sends notification of transmission failure of the data frame to the higher layer processing unit 111, and discards the data frame stored in the buffer unit 109.

Meanwhile, in order to realize the operation of the data frame processing unit 110 described above, it is necessary for the data frame processing unit 110 to distinguish (A1) from (A2) described above. Therefore, in the first embodiment, frame identifying information with which a data frame may be uniquely identified is included in each data frame, and the FID managing table 105 stores the frame identifying information.

The frame identifying information in the first embodiment is, for example, a combination of the node ID and of the node apparatus being the GS of the data frame and FID. The FID is identifying information to uniquely identify each of a plurality of frames that a given node apparatus transmits while being the GS, which may be a sequence number of a predetermined number of bits, or a timestamp.

That is, since individual node apparatus generates FID independently, a plurality of different node apparatuses may generate the same FID by chance. However, the frame identifying information is a combination of the node ID of the node apparatus being the GS of the data frame and the FID. Then, the node ID is information to uniquely identify the node apparatus within the network, as described above. Therefore, even if a plurality of different node apparatuses generate the same FID by chance, frames that different node apparatuses transmitted while respectively being the GS have different frame identifying information, and are distinguishable.

Meanwhile, the frame identifying information is not to be rewritten by a node apparatus that relays the data frame even if the data frame is forwarded in the network via one or more node apparatuses, and therefore does not change. By recording the frame identifying information of the data frame for which the transmitting unit 102 is requested for transmission in the FID managing table 105, the data frame processing unit 110 may recognize, when the data frame has returned to the node apparatus 110 afterwards, that it corresponds to (A1) described above.

Meanwhile, the node apparatus 110 also performs other processes for which reception of a frame is not a trigger. Specifically, the HELLO frame generation unit 112 generates a HELLO frame on a regular basis using the FID that the FID generation unit 113 generates, and outputs to the transmitting unit 102. Then, the transmitting unit 102 transmits the HELLO frame, making it possible for the node apparatus 110 to send notification of existence of the node apparatus 110 itself to its surroundings on a regular basis.

In addition, the higher layer processing unit 111 may output, at any timing, data to be transmitted while being included in a data frame as payload, to the data frame processing unit 110. Then, the data frame processing unit 110 generates a data frame in accordance with the request from the higher layer processing unit 111, and instructs the transmitting unit 102 to transmit the data frame. The node apparatus 100 itself may thus become the GS.

FIG. 4 is a diagram illustrating the hardware configuration of the node apparatus in the first embodiment. The node apparatus 100 in FIG. 3 may be realized by various hardwares illustrated in FIG. 4 for example.

In the example in FIG. 4, the node apparatus 100 has an MPU (MicroProcessing Unit) 201, a PHY (PHYsical layer) chip 202, and a timer IC (Integrated Circuit) 203. In addition, the node apparatus 100 has a DRAM (Dynamic Random access Memory) 204, a flash memory 205 and a wireless module 206.

The communication interface that connects the MPU 201 and the PHY chip 202 is an MII/MDIO (Media Independent Interface or Management Data Input/Output) 207. The MII and MDIO are both an interface between the physical layer and the MAC sublayer (Media Access Control sublayer). In addition, the MPU 201 and the timer IC 203 are connected via an $I^2C$/PIO (Inter-Integrated Circuit or Parallel Input/Output) bus 208. Then, the DRAM 204 and the flash memory 205 and the wireless module 206 are connected to the MPU 201 via a PCI (Peripheral Component Interconnect) bus 209.

The MPU 201 loads a program such as firmware stored in the flash memory 205 being a type of nonvolatile storage apparatus onto the DRAM 204, and performs various processes while using the DRAM 204 as a working memory. The MPU 201 may operate as the frame branching processing unit 106, the ACK processing unit 107, the link managing unit 108, the data frame processing unit 110, the higher layer processing unit 111, the HELLO frame processing unit 112, and the FID generation unit 113.

Meanwhile, the program such as firmware may be provided while being stored in a computer-readable storage medium, and may be installed in the node apparatus 100. Alternatively, the program may be downloaded from a network via the PHY chip 202 or the wireless module 206, and may be installed in the node apparatus 100.

Meanwhile, according to the embodiment, another type of storage apparatus other than the DRAM 204 or the flash memory 205 may be used. For example, the node apparatus 100 may have a storage apparatus such as CAM (Content Addressable Memory), SRAM (Static Random Access Memory), SDRAM (Synchronous Dynamic Random Access Memory).

The adjacent node apparatus managing table 103, the weighting table 104, the FID managing table 105, and the buffer unit 109 are realized by the DRAM 204, the flash memory 205 or another storage apparatus that is not illustrated in the drawing. In addition, the flash memory 205 stores not only the program but also information that is unique to the node apparatus 100, such as the node ID of the node apparatus 100.

The PHY chip 202 is a circuit that performs processing in the physical layer in wired connection. Since the first embodiment is applied to a wireless network, the node apparatus 100 does not have to have the PHY chip 202. However, the node apparatus 100 may have the PHY chip 202 for connection of the node apparatus 100 with an external network.

For example, the node apparatus 100 may have a wired LAN port that complies with the Ethernet (registered trademark) standard, and may be connected to a gateway apparatus and the like of an external network through a cable connected to the wired LAN port.

In that case, the MPU 201 may generate an Ethernet frame and may outputs it to the PHY chip 202 through the MII/MDIO 207. Then, the PHY chip 202 converts the output from the MPU 201 (that is, a logic signal representing the Ethernet frame) into a signal in accordance with the type of the cable (that is, an electric signal or an optical signal), and outputs to the cable. Thus, the node apparatus 100 may transmit data to an external network using the PHY chip 202.

In addition, the PHY chip 202 may convert an electric signal or an optical signal input from an external network through the cable and LAN port into a logic signal, and may output it to the MPU 201 through the MII/MDIO 207. Thus, the node apparatus 100 may receive data from an external network using the PHY chip 202.

The wireless module 206 is hardware that performs the processing of the physical layer in wireless connection. The wireless module 206 includes, for example, an antenna, and ADC (Analog-to-Digital Converter), a DAC (Digital-to-Analog Converter), a modulator, a demodulator, an encoder, a decoder and the like.

In the first embodiment, the receiving unit 101 and the transmitting unit 102 in FIG. 3 are realized by the wireless module 206 in FIG. 4. That is, in the first embodiment, the link in the network is a wireless link. Of course, as in the second and third embodiments described later, an embodiment where a wired link exists is also possible.

The timer IC 203 performs the count up operation until a set period of time has passed, and when the set period of time has passed, the timer IC 203 outputs an interrupt signal. For example, the timer IC may output an interrupt signal to execute the aging process of the adjacent node managing table 103, the weighting table 104, the FID managing table 105 respectively at a predetermined interval.

Meanwhile, according to the embodiment, the hardware configuration of the node apparatus may be different from FIG. 4, and other hardware other than the standard/type illustrated in FIG. 4 may be used for the node apparatus.

For example, the frame branching processing unit 106, the ACK processing unit 107, the link managing unit 108, the data frame processing unit 110, the higher layer processing unit 111, the HELLO frame generating unit 112, or the FID generating unit 113 may be realized by a hardware circuit. Specifically, each of these parts in FIG. 3 may be realized by a reconfigurable circuit such as FPGA (Field Programmable Gate Array) and ASIC (Application Specific Integrated Circuit), and the like. Off course, each part in FIG. 3 may be realized by both the MPU 201 and the hardware circuit.

Meanwhile, in description below, in order to make the description clear, a reference numeral in which the node ID is attached after the reference numeral of each part in FIG. 3 and FIG. 4 may be used. For example, the adjacent node managing table 103 in FIG. 3 that the node apparatus $N_1$ has may be referred to by a reference numeral "103-$N_1$".

Next, the outline of the operation of the individual node apparatuses is described with reference to FIG. 5, and path selection realized in the network as a whole as a result of the operation of the individual node apparatuses is described with reference to FIG. 6.

FIG. 5 is a diagram describing the learning of weighting while focusing on one node apparatus. FIG. 5 extracts and illustrates six node apparatuses in the network 3 as "node α" through "node ζ". As illustrated in FIG. 5, the nodes α, γ, δ, ϵ, and ζ are adjacent to the node β, and in FIG. 5, the following five links are presented with a solid line.

Link $L_{\beta,\alpha}$ between the nodes β and α

Link $L_{\beta,\gamma}$ between the nodes β and γ

Link $L_{\beta,\delta}$ between the nodes β and δ

Link $L_{\beta,\epsilon}$ between the nodes α and ϵ

Link $L_{\beta,\zeta}$ between the nodes β and ζ

Meanwhile, a network 3*a* presented schematically in the form of a cloud is the part of the network 3. The network 3*a* includes, specifically, a link that directly connects the nodes δ and ζ, or a path that connects the nodes δ and ζ indirectly via one or more nodes that are not illustrated in the drawing and two or more links that are not illustrated in the drawing.

Hereinafter, in FIG. 5, a focus is put on the node β, to described the learning of weighting in the node β is described.

At a certain time, the node β receives a data frame 301 having a certain node (hereinafter, referred to as "node η" for convenience) as the GD from the node α through the link $L_{\beta,\alpha}$. The node β has the weighting tables 104 in FIG. 3, and among them, the weighting table corresponding to the node η is referred to with a reference numeral "104-*h*" in the description of FIG. 5 for convenience.

While details are to be described later with FIG. 10 and FIG. 11, each of the weighting tables 104 managed for each GD stores correspondence of adjacent nodes and weightings. Since the nodes α, γ, δ, ϵ, and ζ are adjacent to the node β, in the weighting table 104-*h*, the node α and weighting $W_\alpha$, the node γ and weighting $W_\gamma$, the node δ and weighting $W_\zeta$, the node ϵ and weighting $W_\epsilon$, the node ζ and weighting $W_\zeta$ are associated.

For convenience of description, it is assumed that the relationship between the weightings at the time when the node β receives the data frame 301 from the node α is as in expression (1).

$$W_\gamma < W_\delta < W_\epsilon < W_\zeta \quad (1)$$

Hereinafter, in the first embodiment, it is assumed for convenience of description that weighting takes a value equal to or larger than 0 and equal to or smaller than 1, and the smaller the value of weighting, the higher the degree of priority of the node corresponding to the weighting.

Therefore, based on the expression (1), the node β recognizes that the degree of priority of the node γ associated with the lightest weighting is the highest among the adjacent nodes α, γ, δ, ϵ, and ζ. Therefore, the node β selects the node γ first from the adjacent nodes α, γ, δ, ϵ, and ζ as the LD for transmitting the data frame 301, and transmits the data frame to the node γ.

Here, if the transmission from the node β to the node γ fails, the node β learns that "it is inappropriate to select the node γ when transmitting the data frame having the node η as the GD". Then, as a result of the learning, the node β reduces the degree of priority of the node γ. That is, the node β increases the value of the weighting $W_\gamma$.

There are several types of transmission failure, and specifically, the node β learns that "it is inappropriate to select the node γ when transmitting the data frame having the node η as the GD" as in (D1) or (D2) below.

(D1) in the Case of a Link Failure

If a failure is occurring accidentally in the link $L_{\beta,\gamma}$ or in the node γ at the time when the node β forwards the data frame 301 to the node γ, the node β recognizes that the transmission to the node γ failed.

When the link $L_{\beta,\gamma}$ is a wireless link, if no ACK frame is returned from the node γ in response to the data frame 301 is returned, the node β experiences timeout, and determines that "transmission of the data frame 301 to the node γfailed". Then, the node β learns that "it is inappropriate to select the node γ when transmitting the data frame having the node η as the GD", and increases the value of the weighting $W_\gamma$ associated with the node γ selected as the LD.

Meanwhile, since the quality environment of a wireless link easily changes, the link failure may be solved again. For this reason, in the first embodiment, the weighting $W_\gamma$ is not set to the maximum value at once, but is increased by a predetermined value only. By doing so, the LD becoming inappropriate with occurrence of a link failure for only once may be avoided.

(D2) in the Case in which the Data Frame 301 Returns from the Node γ to the Node β

The node β once succeeds in the transmission of the data frame to the node γ. For example, the node β recognizes that the transmission of the data frame 301 to the node γ was successful, by receiving an ACK frame in response to the data frame 301. Therefore, the node β once reduces the value of the weighing $W_γ$ associated with the node γ selected as the LD.

However, after that, if no path through which the data frame 301 may be forwarded from the node γ to the node η is found in the network 3, the node γ sends the data frame 301 back to the node β by a backtracking operation described later. For example, when the node γ is adjacent only to the node β, the node γ is unable to find a path through which the data frame 301 may be forwarded from the node γ to the node η. In addition, even in a case in which the node γ is adjacent to several nodes other than the node β, the node η may not be reachable from the node γ, depending on the topology of the network 3.

When the node γ performs the backtracking operation, the node β receives the data frame 301 that the node β itself transmitted to the node γ previously, which enables it to recognize that "transmission to the node γ failed". As a result of the recognition, the node β leans that "it is inappropriate to select the node γ as the LD when transmitting the data frame with the node η being the GD", and increases the value of the weighting $W_γ$ associated with the node γ selected as the LD.

In the first embodiment, when the node β recognizes the transmission failure by receiving the data frame 301 that the node β itself previously transmitted as in (D2), specifically, the node β sets the maximum value for the value of the weighting $W_γ$.

Hereinafter, for convenience of description, it is assumed that the node β recognizes the transmission failure as in (D2) in the example in FIG. 5, and set the value of the weighting $W_γ$ to the maximum value. As a result, expression (2) is established.

$$W_δ < W_ε < W_ζ < W_γ \qquad (2)$$

Next, the node β selects, as the LD, an adjacent node other than the node γ that has proved to be inappropriate, to deliver the data frame 301 to the node η being the GD that is not illustrated in the drawing, and tries to retransmit the data frame 301. Specifically, based on the expression (2), the node β selects the node δ associated currently with the lightest weighting $W_δ$ as the LD, and transmits the data frame 301 to the node δ.

In the example in FIG. 5, the node β receives an ACK frame in response to the data frame 301 from the node δ, and the node β recognizes the success of transmission. Upon recognizing the success of the transmission, the node β reduces the value of the weighting $W_δ$ associated with the node δ selected as the LD. As a result, the expression (2) is established as well.

Next, it is assumed that the data frame 301 reaches the node ζ from the node δ via the network 3a. Then, it is assumed that the node ζ selected the node β as the LD.

Then, the node β receives, from the node δ, the data frame 301 that the node β sent to the node δ, which enables it to recognize that "transmission to the node δ failed due to existence of a loop". As a result of the recognition, the node β learns that "it is inappropriate to select the node δ as the LD when transmitting the data frame with the node η as the GD", and increases the value of the weighting $W_δ$.

Here, in the case in which the node β receives the data frame 301 returned due to looping from the node ζ, it is similar to the case in (D2) above in that "the node β recognizes the transmission failure by receiving the data frame 301 that the node β itself previously transmitted. Therefore, the node β leans that "it is inappropriate to select the node δ as the LD when transmitting the data frame with the node η being the GD", and sets the value of the weighting $W_δ$ associated with the node δ as the LD to the maximum value. As a result, expression (3) is established.

$$W_ε < W_ζ < W_γ = W_δ \qquad (3)$$

FIG. 5 illustrates the expression (3) as new relationship of weightings resulting from updating the weightings upon receiving the same data frame 301 from the node ζ.

Next, the node β selects, as the LD, an adjacent node other than the nodes γ and δ that have proved to be inappropriate, to deliver the data frame 301 to the node η being the GD that is not illustrated in the drawing, and tries to retransmit the data frame 301. Specifically, based on the expression (3), the node β selects the node ε associated currently with the lightest weighting $W_ε$ as the LD, and transmits the data frame 301 to the node ε.

In the example in FIG. 5, the node β receives an ACK frame in response to the data frame 301 from the node ε, and the node β recognizes the success of transmission. Upon recognizing the success of the transmission, the node β reduces the value of the weighting $W_ε$ associated with the node ε selected as the LD. As a result, the expression (3) is established as well.

Here, temporarily, it is assumed that the data frame 301 is never returned to the node β from the node ε by backtracking. In addition, it is also assumed that the data frame 301 is never received by the node β after being subjected to looping in the network 3 and transmitted from one of adjacent nodes of the node β to the node β.

Then, from the expression (3), the node β selects the node ε associated with the lightest weight $W_ε$ with priority, when it receives another data frame having the node η as the GD in the same manner as the data frame 301 from one of the adjacent nodes α, γ, δ, ζ.

Figure 6:
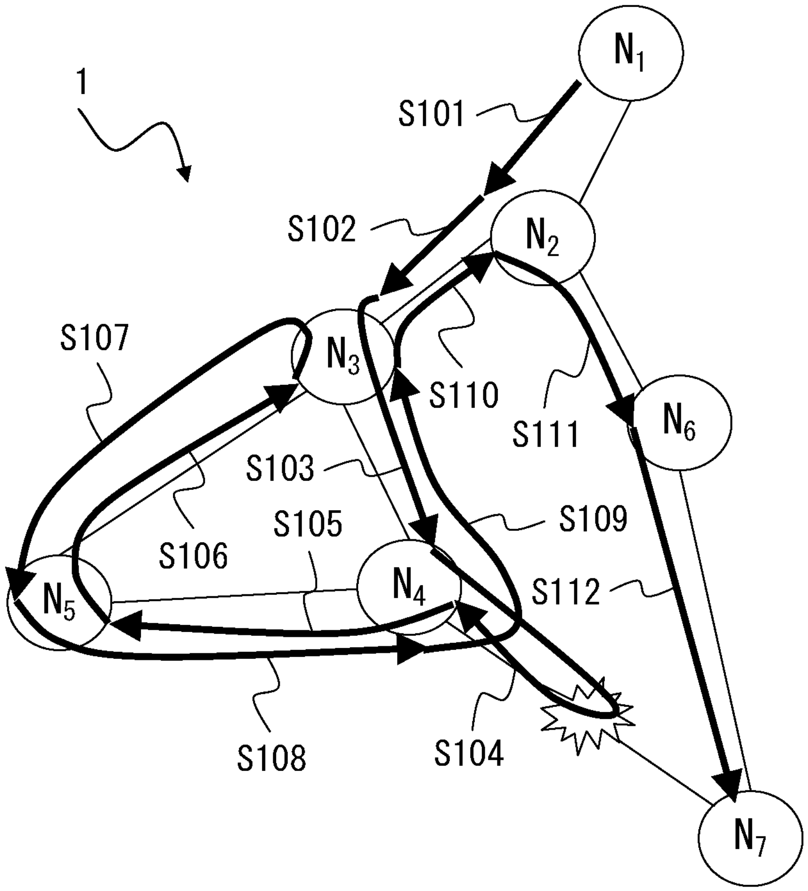
FIG. 6 is a diagram describing the way in which a path is selected dynamically and in an autonomously-distributed manner in the network 1 in FIG. 1.

FIG. 6 is a diagram describing the way in which a path is selected dynamically and in an autonomously-distributed manner. Specifically, FIG. 6 illustrates the way of path selection in the network 1 in a case in which the node apparatus $N_1$ becomes the GS and transmits a data frame with the node apparatus $N_7$ specified as the GD.

FIG. 6 illustrates the network 1 in FIG. 1 and a failure that has occurred between the node apparatuses $N_4$ and $N_7$. In addition, 12 lines of thick arrows in FIG. 6 represent the way in which the data frame is forwarded from the GS (that is, the node apparatus $N_1$) to the GD (that is, the node apparatus $N_7$) in the network 1 while the path is selected dynamically.

Meanwhile, hereinafter, among weighting tables 104-$N_i$ of the node apparatus $N_i$, the one corresponding to the node apparatus $N_7$ is referred to with a reference numeral "104-$h_i$-$N_i$" for convenience. ($1 \le i \le 6$).

In addition, in the description of FIG. 6, it is assumed that transmission of a data frame is successful and an ACK frame is returned unless stated particularly, and description is simplified by omitting returning of the ACK frame. The flow of the series of processes including the returning of the ACK frame is to be described later with FIG. 31.

In step S101, the node apparatus $N_1$ being the GS selects the node apparatus $N_2$ being the only one adjacent to the node apparatus $N_1$, and transmits the data frame to the node apparatus $N_2$.

Other than the node apparatus $N_1$ being the LS of the data frame transmitted in step S101, the node apparatuses $N_3$ and $N_6$ are adjacent to the node apparatus $N_2$. Then, it is assumed that, of the two adjacent node apparatuses $N_3$ and $N_6$, the node apparatus $N_3$ is associated with a lighter weighting in the weighting table 104-$h_2$-$N_2$.

Then, in step S102, the node apparatus $N_2$ selects the node apparatus $N_3$ for the LD for forwarding the data frame received in step S101, and transmits the data frame to the node apparatus $N_3$.

Other than the node apparatus $N_2$ being the LS of the data frame transmitted in step S102, the node apparatuses $N_4$ and $N_5$ are adjacent to the node apparatus $N_3$. Then, it is assumed that, of the two adjacent node apparatuses $N_4$ and $N_5$, the node apparatus $N_4$ is associated with a lighter weighting in the weighting table 104-$h_3$-$N_3$.

Then, in step S103, the node apparatus $N_3$ selects the node apparatus $N_4$ for the LD for forwarding the data frame received in step S102, and transmits the data frame to the node apparatus $N_4$.

Other than the node apparatus $N_3$ being the LS of the data frame transmitted in step S103, the node apparatuses $N_5$ and $N_7$ are adjacent to the node apparatus $N_4$. Then, it is assumed that, of the two adjacent node apparatuses $N_5$ and $N_7$, the node apparatus $N_7$ is associated with a lighter weighting in the weighting table 104-4$_4$-$N_4$.

Then, in step S104, the node apparatus $N_4$ selects the node apparatus $N_7$ that is also a GD for the LD for forwarding the data frame received in step S103, and transmits the data frame to the node apparatus $N_4$.

However, as illustrated in FIG. 6, a failure is occurring in the link between the node apparatuses $N_4$ and $N_7$ at the time when the node apparatus $N_4$ transmitted the data frame to the node apparatus $N_7$, so the transmission fails. That is, since no ACK frame is returned from the node apparatus $N_7$ after waiting for a predetermined period of time, the node apparatus $N_4$ recognizes transmission failure due to timeout.

Meanwhile, the node apparatus $N_4$ in step S104 corresponding to the node β that failed as in (D1) above in transmission of a data frame to the node γ in FIG. 5. Therefore, the node apparatus $N_4$ updates the weighting table 104-$h_4$-$N_4$ in accordance with the transmission failure (specifically, increases the value of the weighting associated with the node apparatus $N_7$ being the LD in the transmission in step S104).

Then, in step S105, the node apparatus $N_4$ selects another adjacent node apparatus $N_5$ that has not been tried yet as the LD for forwarding the data frame received in step S103, and transmits the data frame to the node apparatus $N_5$.

Other than the node apparatus $N_4$ being the LS of the data frame transmitted in step S104, only the node apparatus $N_3$ is adjacent to the node apparatus $N_5$.

Then, in step S106, the node apparatus $N_5$ selects the node apparatus $N_3$ as the LD for forwarding the data frame received in step S105, and transmits the data frame to the node apparatus $N_3$.

Then, in step S106, the node apparatus $N_3$ recognizes that "the same data frame that the node apparatus $N_3$ itself transmitted in step S103 has been received". That is, the node apparatus $N_3$ in step S106 corresponds to the node β that received the looped data frame from the node ζ. Therefore, the node apparatus $N_3$ updates the weighting table 104-$h_3$-$N_3$ in the same manner as in FIG. 5 (specifically, sets the value of the weighting associated with the node apparatus $N_4$ being the LD of the transmission in step S103 to the maximum value).

Then, in step S107, the node apparatus $N_3$ searches, among the adjacent node apparatuses other than the OLS (that is, the node apparatus $N_2$ being the LD at the time when the node apparatus $N_3$ first received the data frame in step S102), for one that has not been tried as the LD. Here, the adjacent node apparatuses other than the OLS are the node apparatus $N_4$ and $N_5$, and the node apparatus $N_4$ was already been selected in step S103.

Therefore, in step S107, the node apparatus $N_3$ selects the node apparatus $N_5$ not yet selected as the LD, and transmits the data frame to the node apparatus $N_5$. That is, the node apparatus $N_3$ in step S107 corresponds to the node β that reselects the node ϵ as the LD and transmits the data frame to the node ϵ in FIG. 5.

Then, in step S107, the node apparatus $N_5$ recognizes that "the same data frame that the node apparatus $N_5$ itself transmitted in step S105 has been received". That is, the node apparatus $N_5$ in step S107 corresponds to the node β that failed at transmission of a data frame to the node γ as in (D2) in FIG. 5. Therefore, the node apparatus $N_5$ updates the weighting table 104-$h_5$-$N_5$ in the same manner as in FIG. 5 (specifically, sets the value of the weighting associated with the node apparatus N3 being the LD of the transmission in step S106 to the maximum value).

Then, for the node apparatus $N_5$, the adjacent node apparatus other than the OLS (that is, the node apparatus $N_4$ being the LS at the time when the node apparatus $N_5$ first received the data frame in step S105) is only the node apparatus $N_3$ that has proved with transmission failure. Therefore, there is no more adjacent node apparatus that may be selected as the LD.

Therefore, in step S108, the node apparatus $N_5$ sends the data frame back to the node apparatus $N_4$ being the OLS. Step S108 is a back tracking operation, and the node apparatus N5 may notify the node apparatus $N_4$ of the fact that "in transmission of the data frame with the node apparatus $N_7$ being the GD, the path beyond the node apparatus $N_5$ has become a dead end".

Then, in step S108, the node apparatus $N_4$ recognizes that "the same data frame that the node apparatus $N_4$ itself transmitted in step S105 has been received". That is, the node apparatus $N_4$ in step S108 corresponds to the node β that failed at transmission of a data frame to the node γ as in (D2) in FIG. 5. Therefore, the node apparatus $N_4$ updates the weighting table 104-$h_4$-$N_4$ in the same manner as in FIG. 5 (specifically, sets the value of the weighting associated with the node apparatus $N_5$ being the LD of the transmission in step S105 to the maximum value).

However, while the node β in FIG. 5 still had the node δ and the like that may be selected as the LD even if transmission of the data frame to the node γ failed, for the node apparatus $N_4$ in step S108, there is no adjacent node that may be selected as the LD. That is, the two adjacent nodes $N_7$ and $N_5$ other than the OLS were selected in steps S104 and S105 already, and it has become clear that both results in transmission failure.

Therefore, the node apparatus N4 sends the data frame back to the node apparatus $N_3$ being the OLS in step S109. Step S109 is also a backtracking operation, and the node apparatus $N_4$ may notify the node apparatus $N_3$ of the fact that "in transmission of the data frame with the node apparatus $N_7$ being the GD, the path beyond the node apparatus $N_4$ has become a dead end".

Then, in step S109, the node apparatus $N_3$ recognizes that "the same data frame that the node apparatus $N_3$ itself transmitted in step S107 has been received". That is, the node apparatus $N_3$ in step S109 corresponds to the node β that received the looped data frame from the node ζ in FIG. 5. Therefore, the node apparatus $N_3$ updates the weighting table 104-$h_3$-$N_3$ in the same manner as in FIG. 5 (specifically, sets the value of the weighting associated with the node apparatus $N_5$ being the LD of the transmission in step S107 to the maximum value).

However, while the node β in FIG. 5 still had the node ϵ and the like that may be selected as the LD even if transmission of the data frame to the node δ failed, for the node apparatus $N_3$ in step S109, there is no adjacent node that may be selected as the LD. That is, the two adjacent nodes $N_4$ and $N_5$ other than the OLS were selected in steps S103 and S107 already, and it has become clear that both results in transmission failure.

Therefore, the node apparatus N3 sends the data frame back to the node apparatus $N_2$ being the OLS in step S110. Step S110 is also a backtracking operation, and the node apparatus $N_3$ may notify the node apparatus $N_2$ of the fact that "in transmission of the data frame with the node apparatus $N_7$ being the GD, the path beyond the node apparatus $N_3$ has become a dead end".

Then, in step S110, the node apparatus $N_2$ recognizes that "the same data frame that the node apparatus $N_2$ itself transmitted in step S102 has been received". That is, the node apparatus $N_2$ in step S110 corresponds to the node β that failed at transmission of a data frame to the node γ as in (D2) in FIG. 5. Therefore, the node apparatus $N_2$ updates the weighting table 104-$h_z$-$N_2$ in the same manner as in FIG. 5 (specifically, sets the value of the weighting associated with the node apparatus $N_3$ being the LD of the transmission in step S102 to the maximum value).

Then, in step S111, the node apparatus $N_2$ selects another node apparatus $N_6$ that has not been tried, as the LD for forwarding the data frame, and transmits the data frame to the node apparatus $N_6$.

Other than the node apparatus $N_2$ being the LS of the data frame transmitted in step S111, only the node apparatus $N_7$ is adjacent to the node apparatus $N_6$.

Then, in step S112, the node apparatus $N_6$ selects the node apparatus $N_7$ as the LD for forwarding the data frame received in step S111, and transmits the data frame to the node apparatus $N_7$.

Thus, even if a failure occurs in the network 1, with each node apparatus behaving in an autonomously-distributed manner, the data frame reaches the GD successfully.

In addition, in the forwarding of the data frame, even if an inappropriate node apparatus is selected as the LD locally, in the network as a whole, eventually, a path from the GS leading to the GD is selected. This is because each node apparatus sequentially selects a node apparatus that may be selected as the LD and performs a backtracking operation if there is no more node apparatus that may be selected.

Specifically, in the example in FIG. 6, the selection of the node apparatus $N_3$ as the LD by the node apparatus $N_2$ in step S102 eventually proves to be appropriate in step S110. However, by the operations in steps S103-S110, the network as a whole eventually succeeds in selecting a path <$N_1$, $N_2$, $N_6$, $N_7$>.

The path selected as described above is learned and contributes to make next and subsequent forwarding of data frames more efficient. Specific description of improvement in efficiency by learning is as follows.

As a result of the reception of the data frame in step S110, the node apparatus $N_2$ performs learning of the weighting table 104-$h_2$-$N_2$ and sets the weighting associated with the node apparatus $N_3$ to the maximum value. Therefore, upon receiving a new data frame with the node apparatus $N_7$ being the GD from the adjacent node apparatus $N_1$, the node apparatus $N_2$ selects the node apparatus $N_6$ as the LD in the beginning. That is, it becomes possible for the network 1 as a whole to transmit the data frame to the GD effectively through the path <$N_1$, $N_2$, $N_6$, $N_7$> without trial and error including backtracking, as a result of the learning in an autonomously-distributed manner.

Furthermore, according to the first embodiment, influence of selection of an inappropriate LD or a local failure does not affect the network 1 as a whole, and is limited locally. That is, according to the first embodiment, even if a failure occurs in the link between the node apparatuses $N_4$ and $N_7$ for example, it does not lead to flooding of a control frame for inquiring an alternative path to all the node apparatuses in the entire network 1. Therefore, according to the first embodiment, even if a failure or loop occurs locally, it does not lead to a situation such as generation of a broadcast storm in the entire network 1.

In addition, in the example in FIG. 6, it is obvious that the node apparatus $N_1$ does not recognize the failure in the link between the node apparatuses $N_4$ and $N_7$ and the path <$N_1$, $N_2$, $N_6$, $N_7$> at all. This means that influence from selection of an inappropriate LD or a local failure is limited locally and does not affect the network 1 as a whole.

Limitation of influence of a problem locally means that a local problem is never fed back positively for the entire network 1 and spread, and that the network is stable as a system. Another example of limitation of influence of a problem locally is as follows.

For example, it is assumed that there is also a link between the node apparatuses $N_5$ and $N_7$, and in the weighting table 104-$h_5$-$N_5$, the node apparatus $N_7$ is associated with a lighter weighting than the node apparatus $N_3$. Then, immediately after step S105, the node apparatus $N_5$ selects the node apparatus $N_7$ as the LD and transmits the data frame to the node apparatus $N_7$. As a result, transmission in steps S108-S112 is not performed, and not only the node apparatus $N_1$ but also node apparatuses $N_2$ and $N_3$ do not recognize the occurrence of the failure at all/Thus, the problems such as occurrence of a link failure and a loop only affect a minimum local area according to the location at which the problem occurs.

Next, the configuration and operation of the node apparatus 100 described above and an autonomously-distributed coordinated operation realized in the network 1 as a whole are described in greater detail.

FIG. 7 is a diagram illustrating an example of a frame.

The data frame in the first embodiment includes, as a data frame 302 in FIG. 7, a header including each field for LD, LS, GD, GS, FID, type and length, and a payload. For example, the data frame 201 in FIG. 5 is in the same format as the data frame 302.

In the LD field, the LS field, the GD field and the GS field, the node ID of each node apparatus being the LD, LS, GD and GS of the data frame 302 are specified, respectively. in the FID field of the data frame 302, the FID generated and assigned to the data frame 302 by the node apparatus being the GS of the data frame 302 is specified.

In the type field of the data frame 302, a predetermined constant number indicating the type "data frame" is specified. In addition, in the length field of the data frame 302, the length of the payload is specified. The payload of the data frame 302 is PDU of the protocol of a higher layer than the protocol in which the data frame 302 is defined.

For example, division of the MAC sublayer further into two sublayers virtually is assumed. The frame in the first embodiment may be defined in the lower layer of the two virtual sublayers, that is, it may include PDU of another protocol (Ethernet and the like for example) defined in the MAC sublayer in the payload. In other words, the frame in the first embodiment may be a frame that capsulate the Ethernet frame defined in the second layer. In this case, since the higher later processing unit 111 is a processing unit that processes the Ethernet frame, it may be realized using a known MAC chip.

Hereinafter, for convenience of description, the payload of the data frame 302 is assumed to a frame of the protocol of the MAC layer (specifically, the Ethernet frame).

However, of course, depending on the embodiment, the payload of the data frame 302 may be PDU of a protocol defined in the network layer (the third layer) and above, or may be raw data that is irrelevant to any particular communication protocol. For example, the payload of the data frame 302 may be IP (Internet Protocol) datagram. In this case, the higher layer processing unit 111 is a processing unit to process the IP datagram.

While the format of the data frame 302 is as described above, it is illustrated in greater detail using specific values as data frames 303 and 304.

The data frame 202 is a data frame that the node apparatus $N_2$ transmits to the node apparatus $N_3$ in step S102 in FIG. 6. Specific contents of the data frame 303 are as follows.

- In the LD field, the node ID (that is, $N_3$) of the node apparatus $N_3$ selected as the LD in transmission in step S102 is specified.
- In the LS field, the node ID (that is, $N_2$) of the node apparatus $N_2$ being the LS of in transmission in step S102 is specified.
- In the GD field, the node ID (that is, $N_7$) of the node apparatus $N_7$ that the node apparatus $N_1$ being the GS specified at the time of transmission in step S101 is specified.
- In the GS field, the node ID (that is, $N_1$) of the node apparatus $N_1$ being the GS.
- In the FID field, the FID (hereinafter, referred to as $F_a$) that the node apparatus $N_1$ being the GS generated is specified.
- In the type field, a predetermined constant number D indicating the type "data frame" is specified. For example, the type may be expressed in two bits, as $D=(00)_2$.
- In the length field, the length $P_a$ of the payload of the data frame 302 is specified. Meanwhile, the length may be expressed in units of bytes, or may be expressed in other units.
- As a payload, a frame in the MAC layer protocol (for example, the Ethernet frame) is included.

Meanwhile, it is the data frame 304 in FIG. 7 that the node apparatus $N_3$ that received the data frame 303 to the node apparatus $N_4$ in step S103 in FIG. 6. Specific contents of the data frame 304 are as follows.

- In the LD field, the node ID (that is, $N_4$) of the node apparatus $N_4$ which is selected as the LD in transmission in step S103 is specified. That is, upon forwarding, the node apparatus $N_3$ rewrites the LD field.
- In the LS field, the node ID (that is, $N_a$) of the node apparatus $N_3$ being the LS in transmission in step S103 is specified. That is, upon forwarding, the node apparatus $N_3$ rewrites the LS field, to set the own node ID.
- Each field for the GD, GS, FID, type, length and contents of the payload are the same as the data frame 303 that the node apparatus $N_3$ received.

In addition, the HELLO frame in the first embodiment has a header including each field for the LD, LS, GD, GS, FID and type as a HELLO frame 311 in FIG. 7, but has no payload. A specific example of the HELLO frame 311 is a HELLO frame 312, and the HELLO frame 312 is transmitted by the node apparatus $N_3$ in step S1203 in FIG. 31 described later.

In the LD field of the HELLO frame 311, a special value indicating broadcast to all the node apparatuses adjacent to the node apparatus that transmits the HELLO frame 311 is specified. Meanwhile, "broadcast" here is "broadcast to all the adjacent node apparatuses", and it should be noted that it is not "flooding to the entire network 1".

Hereinafter, for convenient of description, it is assumed that the node ID is expressed in three bytes in the first embodiment, and that "0x" represents a hexadecimal number. In addition, it is assumed that 0x000000 and 0xFFFFFF are reserved, and are not used as a normal node ID.

In the all HELLO frames in the first embodiment, in the same manner as the HELLO frame 312, in the LD field, 0xFFFFFF is specified as a special value indicating broadcast to all the node apparatuses adjacent to the node apparatus that transmits the HELLO frame.

In the LS field of the HELLO frame 311, the node ID of the node apparatus itself that transmits the HELLO frame 311. Therefore, in the LS field of the HELLO frame 312 that the node apparatus $N_3$ transmits, $N_3$ being the node ID of the node apparatus $N_3$ is specified.

In addition, in all the HELLO frames in the first embodiment, a special value 0x000000 indicating null is specified in the GD field. This is because the HELLO frame is only used by the adjacent node apparatus and is not to be forwarded.

In the GS field of the HELLO frame 311, in the same manner as in the LS field, the node ID of the node apparatus itself that transmits the HELLO frame 311 is specified. Therefore, in the GS field of the HELLO frame 312, $N_3$ being the node ID of the node apparatus $N_3$ is specified.

In the FID field of the HELLO frame 311, the FID that the node apparatus that transmits the HELLO frame 311 generated and assigned to the HELLO frame 311 is specified. In the same manner, in the FID field of the HELLO frame 312, the FID (hereinafter, referred to as $F_b$) that the node apparatus $N_3$ that transmits the HELLO frame 312 generated and assigned to the HELLO frame 312 is specified.

In the type field of the HELLO frame 311, a predetermined constant number indicating the type "HELLO frame" is specified. Specifically, the type "HELLO frame" is represented by a predetermined constant number H as illustrated in the HELLO frame 312, which may be $H=(10)_2$ for example.

Figure 31:
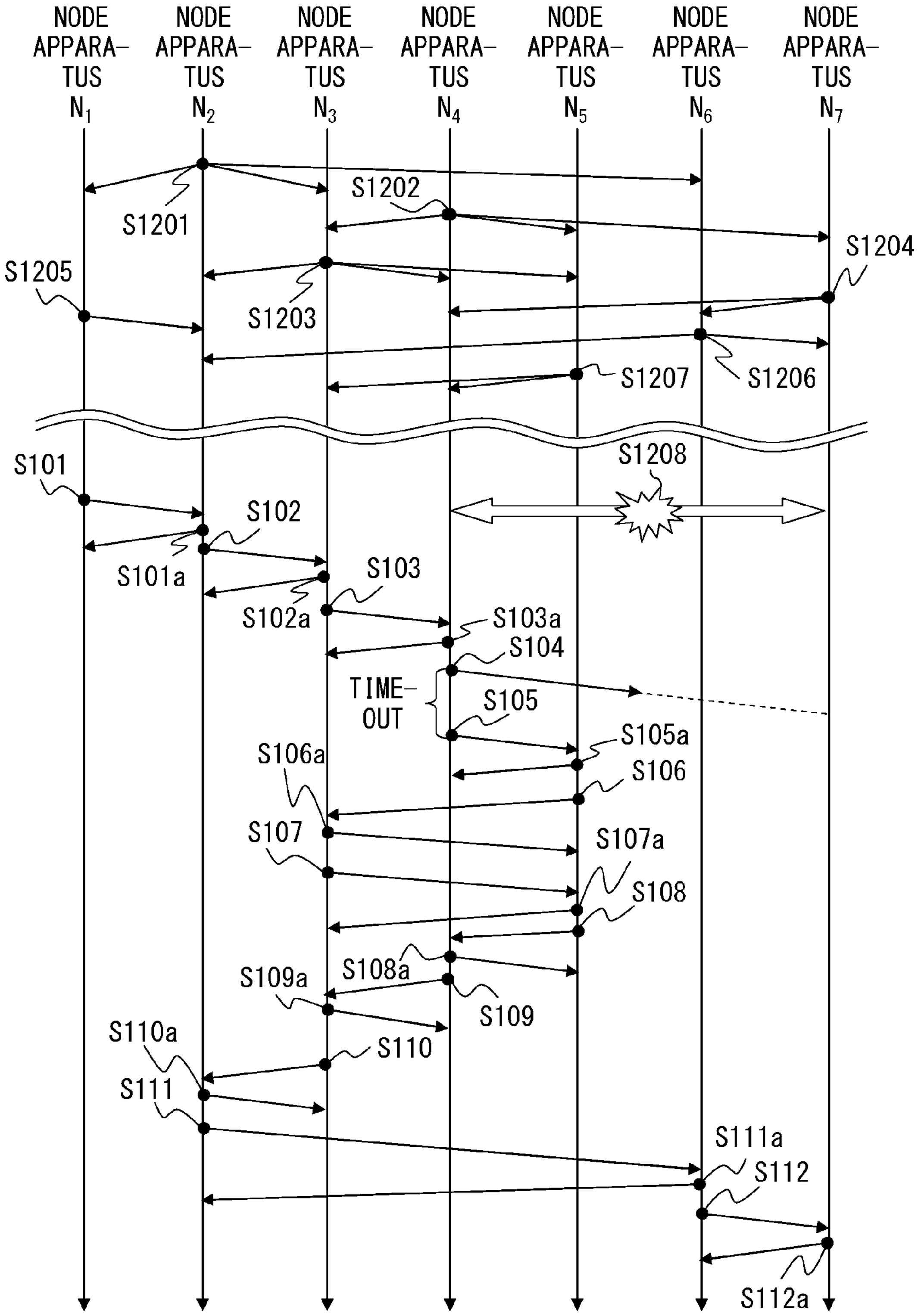
FIG. 31 is a timing chart illustrating the recognition of an adjacent node by transmission/reception of a HELLO frame and path selection in FIG. 6.

In addition, the ACK frame in the first embodiment has a header including each field for the LD, LS, GD, GS, FID and type as the ACK frame 321 in FIG. 7, but has no payload. A specific example of the ACK frame 321 is an ACK frame 322. In addition, the ACK frame 322 is the ACK frame that the node apparatus $N_3$ returns to the node apparatus $N_2$ when the node apparatus $N_2$ transmits the node apparatus $N_3$ in step S102 in FIG. 6. In FIG. 31 described later, return of the ASK frame 322 from the node apparatus $N_3$ to the node apparatus $N_2$ is presented as step S102*a*.

In the LD field of the ACK frame 321, the node ID of the adjacent node apparatus that transmitted the data that triggered the transmission of the ACK frame 321 is specified. Therefore, for example, in the LD field of the ACK frame 322, $N_2$ being the node ID of the adjacent node apparatus $N_2$ of the node apparatus $N_3$ that transmitted the data frame 303 that triggered the transmission of the ACK frame 322 by the node apparatus $N_3$.

In the LS field of the ACK frame 321, the node ID of the node apparatus itself that transmits the ACK frame 321 is specified. Therefore, in the LS field of the ACK frame 322 that the node apparatus $N_3$ transmits, $N_3$ being the node ID of the node apparatus $N_3$ is specified.

In addition, since the ACK frame is not to be forwarded in the same manner as the HELLO frame, in all the ACK frames in the first embodiment, a special value 0x000000 indicating null is specified in the GD field.

In the GS field and the FID field of the ACK frame 321, the values of the GD field and the FID field of the data frame that triggered the transmission of the ACK frame 321 are copied. As described above, by the combination of the values of the GS field and the FID field, the data frame is uniquely identified in the network. Therefore, with the node apparatus that transmits the ACK frame copying the values from the received data frame, the node apparatus that receives the ACK frame 321 may identify which data frame the ACK frame 321 is for.

Therefore, in the ACK frame 322 transmitted with the reception of the data frame 303 as the trigger, for example, the values of the GS field and the FID field are the same as in the data frame 303, being $N_1$ and $F_a$, respectively.

In the type field of the ACK frame 321, a predetermined constant number indicating the type "ACK frame". Specifically, the type "ACK frame" is represented by a predetermined constant number A as illustrated in the ACK frame 322, which may be $A=(11)_2$ for example.

Meanwhile, the format of the frame illustrated in FIG. 7 is only an example, and according to the embodiment, the order of the arrangement of the fields included in the frame may be determined as needed, and the frame may include other fields that are not illustrated in the drawing. In addition, the frame may further include a trailer such as FCS (Frame Check Sequence).

Meanwhile, hereinafter, in order to simplify the description, when there is no concern for confusion, for example, the "LD field" may be referred to simply as "LD". The same applies to other fields.

FIG. 8 is a diagram illustrating an example of data stored in the buffer unit 109 in FIG. 3.

The buffer unit 109 includes a plurality of entries that correspond respectively to individual data frames that the receiving unit 101 receives. Then, each entry includes a timeout time and a received data frame.

FIG. 8 illustrates a given entry in the buffer unit 109-$N_3$ in the node apparatus $N_3$. Specifically, in step S102 of FIG. 6, when the node apparatus $N_3$ receives the data frame 303 in FIG. 7 from the node apparatus $N_2$, an entry including a timeout time $TI_{3,j}$ and the data frame 303 is created in the buffer unit 109-$N_3$. Details of the creation of the entry in the buffer unit 109 are to be described later with FIG. 14. Meanwhile, the meaning of the timeout time $TI_{3,j}$ is as follows.

The node apparatus $N_3$ rewrites the header of the data frame 303 that is received in step S102 as the data frame 304 in FIG. 7 in step S103. Then, the node apparatus $N_3$ transmits the data frame 304 in step S103.

The timeout time $TI_{3,j}$ in FIG. 8 indicates reception of an ACK frame is to be waited until when after the node apparatus $N_3$ transmits the data frame 304. That is, if the node apparatus $N_3$ receives no ACK frame from the node apparatus $N_4$ by the timeout time $TI_{3,j}$, timeout occurs and it determines that transmission of the data frame 304 to the node apparatus $N_4$ has failed.

Figure 26:
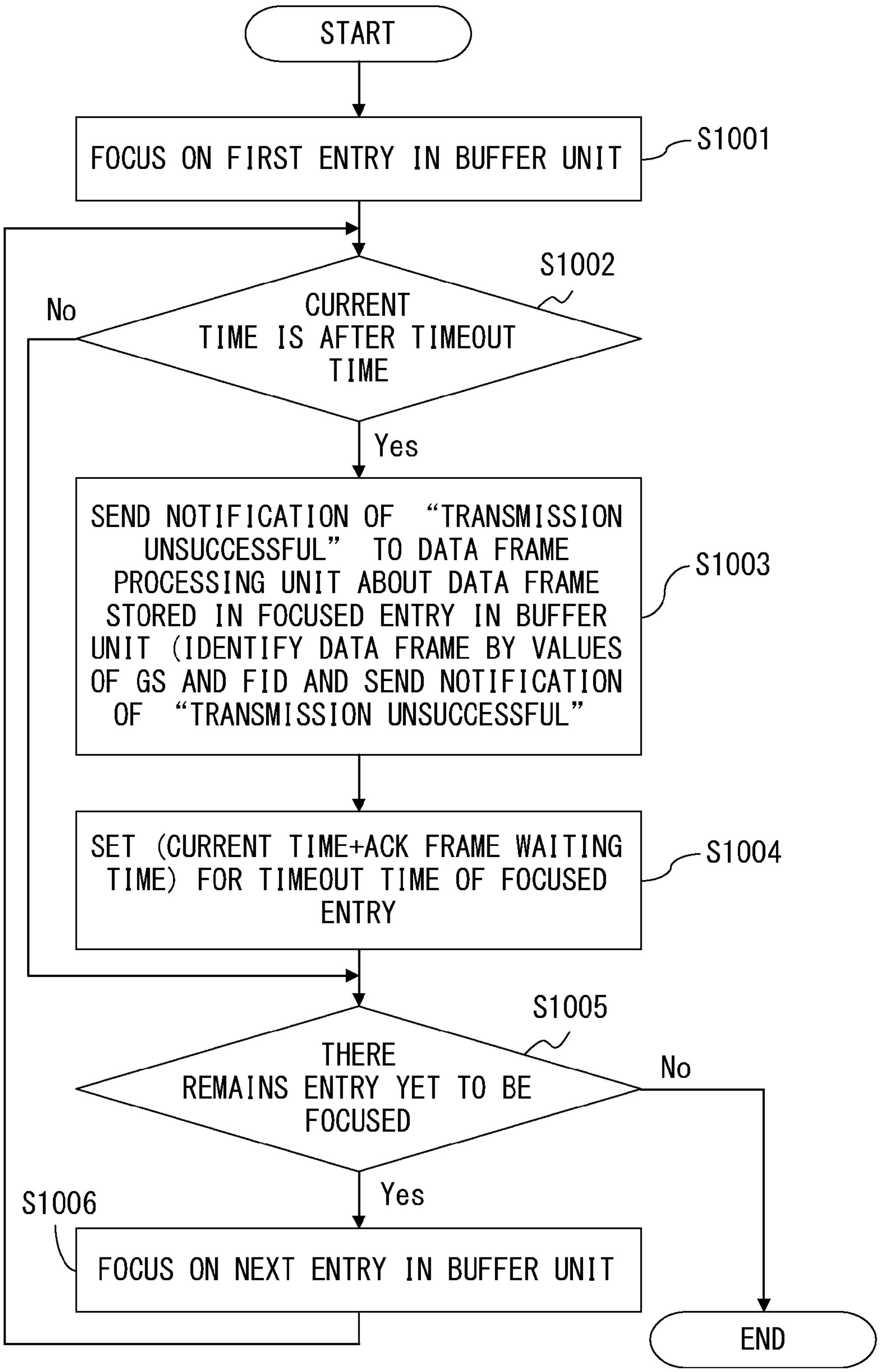
FIG. 26 is a flowchart illustrating a process in a case in which the ACK frame is not received by the timeout time.

Meanwhile, while details are illustrated in FIG. 22, FIG. 26 and FIG. 28, the timeout time set in the buffer unit 109 may be overwritten.

For example, the node apparatus $N_4$ that failed in transmission of the data frame to the node apparatus $N_7$ in step S104 in FIG. 6 updates the timeout time in the buffer unit 109-$N_4$ corresponding to the data frame received from the node apparatus $N_3$ in step S105. Specifically, the timeout time after the update represents until when the node apparatus $N_4$ is to wait for reception of a CK frame for the data frame transmitted to the node apparatus $N_5$ in step S105.

FIG. 9 is a diagram illustrating an example of the adjacent node managing table 103 in FIG. 3. There are a node ID field and a last update time field in the adjacent node managing table 103.

For example, in the network 1 in FIG. 1, node apparatuses $N_1$, $N_3$, $N_6$ are adjacent to the node apparatus $N_2$. Therefore, the adjacent node managing table 103-$N_2$ has three entries corresponding to the three adjacent node apparatuses $N_1$, $N_3$ and $N_6$, respectively. Then, in each entry corresponding to the adjacent node apparatus $N_i$ (i=1, 3, 6), $N_1$ being the node ID of the adjacent node apparatus $N_i$ is stored in the node ID field, and a time $TA_{2,i}$ at which the entry was last updated is stored in the last update time field.

Meanwhile, in the network 1 in FIG. 1, node apparatuses $N_2$, $N_4$, $N_5$ are adjacent to the node apparatus $N_3$. Therefore, the adjacent node managing table 103-$N_3$ has three entries corresponding to the three adjacent node apparatuses $N_2$, $N_4$, $N_5$, respectively. Then, in each entry corresponding to the adjacent node apparatus $N_i$ (i=2, 4, 5), $N_i$ being the node ID of the adjacent node apparatus $N_i$ is stored in the node ID field, and a time $TA_{3,i}$ at which the entry was last updated is stored in the last update time field.

FIG. 10 is a diagram illustrating the weighting table 104 in FIG. 3. FIG. 10 illustrates, as a specific example, the weighting table 104-$N_3$ of the node apparatus $N_3$ in FIG. 1.

As illustrated in FIG. 3, the "weighting table 104" is a generic term for the plurality of weighting tables 104-1 through 104-M managed for each GD. Each weighting table 104-*i* (1≤i≤M) stores the corresponding GD.

Then, each weighting table 104-*i* (1≤i≤M) has one or more entries, and each entry has a last update time field, an LD field and a weighting field. The last update time field stores the time at which the entry was last updated for learning weighting, the LD field stores the node ID of an adjacent node apparatus, and the weighting field stores the value of the weighting associated with the adjacent node apparatus.

In the example in FIG. 10, since the first weighting table 104-1-$N_3$ is a table for transmitting a data frame with the node apparatus $N_7$ specified as the GD, it stores $N_7$ being the node ID of the node apparatus $N_7$ as the GD.

In addition, in the network 1 in FIG. 1, node apparatuses $N_2$, $N_4$, $N_5$ are adjacent to the node apparatus $N_3$. Therefore, the weighting table 104-1-$N_3$ has three entries corresponding to the three adjacent node apparatuses $N_2$, $N_4$, $N_5$, respectively. In the weighting table 104-1-$N_3$, contents of each entry corresponding to the adjacent node apparatus $N_i$ (i=2, 4, 5), are as follows.

- In the last update time field, the last update time $TW_{3,7,i}$ of the entry is stored.
- In the LD field, $N_i$ being the node ID of the adjacent node apparatus $N_i$ is stored.
- In the weighting field, the weighting $W_{3,7,i}$ associated with the adjacent node apparatus $N_i$ is stored.

That is, the weighting is the weighting corresponding to the adjacent node apparatus $N_i$ that is referred to when the node apparatus $N_3$ transmits a data frame that specifies the node apparatus $N_7$ (that is, the GD corresponding to the weighting table 104-1-$N_3$) as the GD.

In the same manner, in example in FIG. 10, since the second weighting table 104-2-$N_3$ is a table for transmitting a data frame with the node apparatus $N_4$ specified as the GD, it stores $N_4$ being the node ID of the node apparatus $N_4$ as the GD.

Then, in the network 1 in FIG. 1, since node apparatuses $N_2$, $N_4$, $N_5$ are adjacent to the node apparatus $N_3$, the weighting table 104-2-$N_3$ also has three entries corresponding to the three adjacent node apparatuses $N_2$, $N_4$, $N_5$, respectively. In the weighting table 104-1-$N_3$, contents of each entry corresponding to the adjacent node apparatus $N_i$ (i=2, 4, 5), are as follows.

In the last update time field, the last update time $TW_{3,4,i}$ of the entry is stored.

In the LD field, $N_i$ being the node ID of the adjacent node apparatus $N_i$ is stored.

In the weighting field, the weighting $W_{3,4,i}$ associated with the adjacent node apparatus $N_i$ is stored.

Of course, the weighting table 104-$N_3$ may further include a 104-*j*-$N_3$ (j>2) associated with a yet another GD.

Meanwhile, the following point should be noted. That is, in the weighting table 104, as long as the GD is the same, even when a data frame with a different combination of the FID and GS is received, with every transmission, the weighting of the LD that became the transmission destination is updated. For example, at the time of transmitting a data frame, even if the weighting of a particular LD become larger for a link failure (even if its degree of priority becomes smaller), if the link failure is solved and transmission becomes successful shortly with transmission of another data frame (with the same GD and LD), the weighting of the LD becomes smaller (its degree of priority becomes higher). On the contrary, it is also possible that if a plurality of different data frames (the GD and LD are the same) successively suffer transmission failure due to a link failure, even if the attempt is made only once for transmission of the data frame with the same combination of the FID and GS, the weighting of the LD becomes the maximum value.

FIG. 11 is a diagram describing change in the weighting table 104-1-$N_3$. In the example in FIG. 11, $T_a<T_b<T_c<T_d<T_e$.

For example, it is assumed that at the time when a data frame is received from the node apparatus N2 in step S102 in FIG. 6, the weighting table 104-1-$N_3$ did not exist in the weighting table 104-$N_3$. Then, it is assumed that triggered by the reception in step S102, the new weighting table 104-1-$N_3$ with the following contents is created in the weighting table 104-$N_3$.

The last update times for the three entries are all the time $T_a$.

In the three entries, the weightings $W_{3,7,i}$ associated with the adjacent node apparatus $N_i$ (i=2, 4, 5) are all 0.5.

Meanwhile, regarding FIG. 6, to simplify the description, it was described that "of the two adjacent node apparatuses $N_4$ and $N_5$, the node apparatus $N_4$ is associated with a lighter weighting in the weighting table 104-1-$N_3$. That is, FIG. 10 and FIG. 11 are examples of $h_3=1$, and $W_{3,7,4}<W_{3,7,5}$ is assumed in the description of FIG. 6.

However, as illustrated in FIG. 11 for example, there may be a case where $W_{3,7,2}=W_{3,7,4}=W_{3,7,5}=0.5$. In the example in FIG. 11, since the node apparatuses $N_4$ and $N_5$ are associated with the equal weighting 0.5, the node apparatus $N_3$ may select either of the node apparatuses $N_4$ and $N_5$ as the LD for the transmission in step S103, but tentatively, it is supposed that the node apparatus $N_4$ was selected as the LD in the same manner as in the example in FIG. 6.

Then, in step S103, the node apparatus $N_3$ transmits the data frame to the node apparatus $N_4$. After that, when the node apparatus $N_4$ transmits the ACK frame to the node apparatus $N_3$ as illustrated as step S103*a* in FIG. 31, the node apparatus $N_3$ recognizes that the transmission of the data frame to the node apparatus $N_4$ was successful.

Then, in the same manner as in the example in FIG. 5, the node apparatus $N_3$ reduces the value $W_{3,7,4}$ associated with the node apparatus $N_4$. In the example in FIG. 11, specifically, the node apparatus $N_3$ updates the value of $W_{3,7,4}$ from 0.5 to 0.4. In addition, the node apparatus $N_3$ sets the current time $T_b$ in the last update time field of the entry corresponding to the node apparatus $N_4$.

After that, as illustrated in FIG. 6, the node apparatus $N_3$ receives the same data frame again in step S106. As a result, as described regarding FIG. 6, the node $N_3$ updates the value of $W_{3,7,4}$ associated with the node apparatus $N_4$ in the weighting table 104-1-$N_3$ from 0.4 to the maximum value 1.0. In addition, the node apparatus $N_3$ sets the current time $T_o$ in the last update time field of the entry corresponding to the node apparatus $N_4$.

Next, as illustrated as step S107 in FIG. 6, the node apparatus $N_3$ selects the node apparatus $N_5$ as the LD and transmits the data frame. After that, when the node apparatus $N_5$ transmits an ACK frame to the node apparatus $N_3$ as illustrated as step S107*a* in FIG. 31, the node apparatus $N_3$ recognizes that the transmission of the data frame to the node apparatus $N_5$ was successful.

Then, in the same manner as in the example in FIG. 5, the node apparatus $N_3$ reduces the value of the weighting $W_{3,7,5}$ associated with the node apparatus $N_5$. In the example in FIG. 11, specifically, the node apparatus $N_3$ updates the value of $W_{3,7,5}$ from 0.5 to 0.4. In addition, the node apparatus $N_3$ sets the current time $T_d$ in the last update time field of the entry corresponding to the node apparatus $N_5$.

After that, as illustrated in FIG. 6, the node apparatus $N_3$ receives the same data frame again in step S109. As a result, as described regarding FIG. 6, the node $N_3$ updates the value of $W_{3,7,5}$ associated with the node apparatus $N_5$ in the weighting table 104-1-$N_3$ from 0.4 to the maximum value 1.0. In addition, the node apparatus $N_3$ sets the current time $T_3$ in the last update time field of the entry corresponding to the node apparatus $N_5$.

As described above, the weighting table 104-1-$N_3$ is updated with reception of an ACK frame as a trigger, or with reception of the same data frame as an already-transmitted data frame as a trigger.

FIG. 12 and FIG. 13 are diagrams illustrating examples of the FID managing table 105 in FIG. 3. As illustrated in FIG. 12 and FIG. 13, there is each field for the FID, GS, LD, OLS and the last update time, The FID field and the GS field in the FID managing table 105 are fields for identifying the data frame uniquely, in which the values are copied respectively from the FID field and the GS field of the received data frame.

In the LD field of the FID managing table 105, in order to transmit the data frame identified by the values of the FID field and the GS field, the node ID of the adjacent node apparatus last selected as the LD is stored.

Meanwhile, in the OLS field of the FID managing table 105, the node ID of the adjacent node apparatus that was specified in the LS field of the data frame when the data frame identified by the values of the FID field and the GS field was first received. The OLS field is also used for eliminating the OLS from candidates for the LD in selecting the LD for forwarding the data frame, and is also used for determining the LD at the time of the backtracking operation.

Then, in the last update time field of the FID managing table 105, the time at which the entry was last updated is stored.

By the way, FIG. 12 and FIG. 13 illustrate the FID managing table 105 of each node apparatus in steps S101-S112 in FIG. 6. Hereinafter, the time at which steps S101-S112 are respectively performed is presented as $TF_{101}$-$TF_{112}$.

When the node apparatus N1 transmits the data frame to the node apparatus $N_2$ in step S101, the node apparatus $N_1$ creates a new entry $E_1$ in the FID managing table 105-$N_1$.

Then, the node apparatus $N_1$ sets the values of the FID and GS of the transmitted data frame in the FID field and the GS field of the entry $E_1$.

Here, the values of the GS and FID of the data frame are not written even if the data frame is forwarded in the network 1, as described above. Therefore, the values of the FID and GS of the data frame transmitted in the network 1 in steps S101-S112 in FIG. 6 are $F_a$ and $N_1$ respectively, in the same manner as the data frames 303 and 304 in FIG. 7. Therefore, at the step S101 the node apparatus $N_1$ sets the FID field and the GS field of the entry $E_1$ with the value of $F_a$ and $N_1$, respectively.

Meanwhile, the values that other node apparatuses respectively set in the FID field and the GS field of the entry in the FID managing table 105 of each in each step S102-S112 below are also $F_a$ and $N_1$. Therefore, hereinafter, description about the FID field and the GS field is omitted.

Meanwhile, in step S101, the node apparatus $N_1$ sets $N_2$ being the node ID of the node apparatus $N_2$ selected as the LD in the LD field of the entry $E_1$.

Incidentally, for a particular data frame identified uniquely by the combination of the values of the GS and FID, the OLS is the adjacent node apparatus identified by the node ID specified in the LS of the particular data frame at the time when the particular data frame was first received.

However, when the OLS is defined as described above, in a case for example in which the node apparatus $N_1$ transmits a data frame with itself being the GS, for the node apparatus $N_1$ itself, the OLS becomes undefined about the transmitted data frame. Therefore, hereinafter, the definition of the OLS is expanded. Specifically, it is defined that "when the node apparatus $N_i$ transmits a data frame with itself being the GS, the OLD for the node apparatus $N_i$ itself for the data frame is the node apparatus $N_i$ itself.

In other words, the OLS is the node apparatus recognized as the origin of the data frame for the node apparatus $N_i$ within the range of the network that the node $N_i$ itself directly recognizes. Meanwhile, the "range of the network that the node $N_i$ itself directly recognizes" here is the range of the number of hop 1 and smaller from the node apparatus $N_i$, which specifically includes only the node apparatus $N_i$ and the adjacent nodes of the node apparatus $N_i$. For example, in the example in FIG. 2, only the range of the network that the node apparatus N105 directly recognizes is indicated with a solid line.

According to the expanded definition of the OLS above, the value that the node apparatus $N_1$ sets in the OLS field of the entry $E_1$ in step S101 is the node ID (that is, $N_1$) of the node apparatus $N_1$ itself. If the node apparatus $N_1$ receives a data frame with the value of GS being $N_1$ and the value of the FID being $F_a$ afterwards, it may recognize that "the data frame that the node apparatus $N_1$ itself previously transmitted has been received", based on the entry $E_1$ created as described above.

In addition, in step S101, the node apparatus $N_1$ sets the current time $TF_{101}$ in the last update time field of the entry $E_1$. Meanwhile, the value that other node apparatuses set in the last update time field of the entry of the FID managing table 105 of each is, in the same manner, the time TF1-2-$TF_{112}$ at which each step S102-S112 are performed. Therefore, hereinafter, description about the last update time field is also omitted.

Then, in step S101, the node apparatus $N_2$ that received the data frame from the node apparatus $N_1$ creates a new entry $E_2$ in the FID managing table 105-$N_2$ when it transmits the data frame to the node apparatus $N_3$. Then, in the entry $E_2$, the node apparatus $N_2$ sets $N_1$ in the OLS field and $N_3$ in the LD field.

Next, in step S102, the node apparatus $N_3$ that received the data frame from the node apparatus $N_2$ creates a new entry $E_3$ in the FID managing table 105-$N_3$ when it transmits the data frame to the node apparatus $N_4$. Then, in the entry $E_2$, the node apparatus $N_3$ sets $N_2$ in the OLS field and $N_4$ in the LD field.

Next, in step S103, the node apparatus $N_4$ that received the data frame from the node apparatus $N_3$ creates a new entry $E_4$ in the FID managing table 105-$N_4$ when it transmits the data frame to the node apparatus $N_7$. Then, in the entry $E_4$, the node apparatus $N_3$ sets $N_3$ in the OLS field and $N_7$ in the LD field.

However, the transmission in step S104 fails due to the link failure in the link between the node apparatuses N4 and $N_7$. That is, timeout occurs to the node apparatus $N_4$ because it could receive no ACK frame from the node apparatus $N_7$. As a result, as in step S105, the node apparatus $N_4$ reselects another adjacent node apparatus $N_5$ as the next LD, and transmits the data frame to the node apparatus $N_5$.

Here, the data frames transmitted respectively in steps S104 and S105 are the same data frames as their value of FID is $F_a$ and their value of GS is $N_1$. Therefore, in step S1105, the node apparatus $N_4$ does not create a new entry but updates the existing entry $E_4$.

Specifically, in step S105, the node apparatus $N_4$ overwrites the value of the LD field in the entry $E_4$ with $N_5$. Meanwhile, no matter how many times the node apparatus N4 transmits the same data frame with the value of the GS being $N_1$ and the value of the FID being $F_a$, the fact that "it was from the node apparatus $N_3$ that the node apparatus $N_4$ first received the data frame" is unchanged. Therefore, the value of the OLS field of the entry $E_4$ is not to be rewritten, and remains $N_3$.

Next, the node apparatus $N_5$ that received the data frame from the node apparatus $N_4$ in step S105 creates a new entry $E_5$ in the FID managing table 105-$N_5$ when it transmits the data frame to the node apparatus $N_4$. Then, in the entry $E_s$, the node apparatus $N_3$ sets $N_4$ in the OLS field and $N_3$ in the LD field.

Then, the node apparatus $N_3$ that received the data frame from the node apparatus $N_5$ in step S106 searches the FID managing table 105-$N_3$ with the values of the GS and FID of the received data frame as the key, and finds the entry $E_3$. Since the entry $E_3$ is found, the node apparatus $N_3$ may recognize that "the same data frame that the node apparatus $N_3$ itself transmitted previously in step S103 was received in step S106".

Therefore, upon transmitting the data frame to the node apparatus $N_5$ in next step S107, the node apparatus $N_3$ does not create a new entry in the FID managing table 105-$N_3$ but updates the existing entry $E_3$. Specifically, in step S107, the node apparatus $N_3$ overwrites the value of the LD field with $N_5$ in the entry $E_3$. Meanwhile, the value of the OLS field of the entry $E_3$ is not to be rewritten and remains $N_2$.

Then, the node apparatus $N_5$ that received the data frame from the node apparatus $N_3$ in step S107 searches the FID managing table 105-$N_3$ with the values of the GS and FID of the received data frame as the key, and finds the entry $E_3$. Since the entry $E_3$ is found, the node apparatus $N_5$ may recognize that "the same data frame that the node apparatus $N_5$ itself transmitted previously in step S106 was received in step S107".

Therefore, upon transmitting the data frame to the node apparatus N45 in next step S108, the node apparatus $N_5$ does not create a new entry in the FID managing table 105-$N_5$ but updates the existing entry $E_5$. Specifically, in step S108, the node apparatus $N_5$ overwrites the value of the LD field with $N_4$ in the entry $E_5$. Meanwhile, the value of the OLS field of the entry $E_5$ is not to be rewritten and remains $N_4$.

Then, the node apparatus $N_4$ that received the data frame from the node apparatus $N_5$ in step S108 searches the FID managing table 105-$N_4$ with the values of the GS and FID of the received data frame as the key, and finds the entry $E_4$. Since the entry $E_4$ is found, the node apparatus $N_4$ may recognize that "the same data frame that the node apparatus $N_4$ itself transmitted previously in step S105 was received in step S108".

Therefore, upon transmitting the data frame to the node apparatus $N_4$ in next step S108, the node apparatus $N_5$ does not create a new entry in the FID managing table 105-$N_5$ but updates the existing entry $E_5$. Specifically, in step S108, the node apparatus $N_5$ overwrites the value of the LD field with $N_4$ in the entry $E_5$. Meanwhile, the value of the OLS field of the entry $E_5$ is not to be rewritten and remains $N_4$.

Then, the node apparatus $N_3$ that received the data frame from the node apparatus $N_4$ in step S109 searches the FID managing table 105-$N_3$ with the values of the GS and FID of the received data frame as the key, and finds the entry $E_3$. Since the entry $E_4$ is found, the node apparatus $N_3$ may recognize that "the same data frame that the node apparatus $N_3$ itself transmitted previously in step S103 was received in step S109".

Therefore, upon transmitting the data frame to the node apparatus $N_2$ in next step S110, the node apparatus $N_3$ does not create a new entry in the FID managing table 105-$N_3$ but updates the existing entry $E_3$. Specifically, in step S110, the node apparatus $N_3$ overwrites the value of the LD field with $N_2$ in the entry $E_3$. Meanwhile, the value of the OLS field of the entry $E_3$ is not to be rewritten and remains $N_2$.

Then, the node apparatus $N_2$ that received the data frame from the node apparatus $N_3$ in step S110 searches the FID managing table 105-$N_2$ with the values of the GS and FID of the received data frame as the key, and finds the entry $E_3$. Since the entry $E_2$ is found, the node apparatus $N_2$ may recognize that "the same data frame that the node apparatus $N_2$ itself transmitted previously in step S102 was received in step S110".

Therefore, upon transmitting the data frame to the node apparatus $N_6$ in next step S111, the node apparatus $N_2$ does not create a new entry in the FID managing table 105-$N_2$ but updates the existing entry $E_2$. Specifically, in step S111, the node apparatus $N_2$ overwrites the value of the LD field with $N_6$ in the entry $E_2$. Meanwhile, the value of the OLS field of the entry $E_2$ is not to be rewritten and remains $N_1$.

Then, the node apparatus $N_6$ that received the data frame from the node apparatus $N_2$ in step S111 creates a new entry $E_6$ upon transmitting the data frame to the node apparatus $N_7$ in step S112. Then, in the entry $E_6$, the node apparatus $N_6$ sets $N_2$ in the OLS field and $N_7$ in the LD field.

Next, details of the operation of the node apparatus 100 are described with reference to the flowcharts in FIG. 14-FIG. 29.

FIG. 14 is a flowchart of a frame reception process. The frame reception process starts when the power of the node apparatus 100 is turned on.

In step S201, the receiving unit 101 waits until it receives a frame. That is, if it has not received a frame, the receiving unit 101 repeats the step S201. When it receives a frame, the receiving unit 101 outputs the received frame to the frame branching processing unit 106, and the process moves to step S202.

In step S202, the frame branching processing unit 106 refers to the value of the type field of the frame that the receiving unit 101 in step S201, and judges the type of the frame. When the type of the received frame is the HELLO frame, the process shifts to the step S203, and when it is the data frame, the process moves to the step S204, and when it is the ACK frame, the process moves to step S206.

In step S203, the frame branching processing unit 106 outputs the received HELLO frame to the link managing unit 108, and the link managing unit 108 performs a HELLO frame reception process in FIG. 15. Then, the process returns to step S201. Of course, in a multi-task environment where the MPU 201 in FIG. 4 executes a plurality of tasks corresponding to each part in FIG. 3 in a parallel manner, once the frame branching processing unit 106 outputs a HELLO frame, the process may shift to step S201 without waiting for the completion of the HELLO frame reception process.

Meanwhile, in step S204, the frame branching processing unit 106 stores the data frame received in step S201 in the buffer unit 109. That is, the frame branching unit 106 secures an area for a new entry in the buffer unit 109, and stores the data frame received in step S201 in the secured area. In addition, the frame branching processing unit 106 takes out and stores the values of the GS and FID from the data frame, for next step S205.

Meanwhile, as in FIG. 8, the buffer unit 109 has a timeout time field, but the timeout time is not set yet as of step S204.

Then, in step S205, the frame branching processing unit 106 instructs the data frame processing unit 110 to perform a data frame reception process. Upon the instruction, the frame branching processing unit 106 tells the values of the GS and FID of the data frame stored in step S204 to the data frame processing unit 110.

Meanwhile, if the node apparatus 100 is an apparatus of a type that does not become the GS (that is, if the node apparatus is an apparatus dedicated for relaying), the data frame reception processing is as in FIGS. 20-23. On the other hand, if the node apparatus 100 is an apparatus of a type that may become the GS, the data frame reception process is as in FIGS. 20-22, 29.

When the data frame processing 110 performs the data frame reception process according to the instruction, the process returns to step S201. Of course, in a multi-task environment, once the frame branching processing unit 106 instructs the data frame processing unit 110 to perform the data frame reception process, the process may shift to step S201 without waiting for the completion of the data frame reception process.

Figure 25:
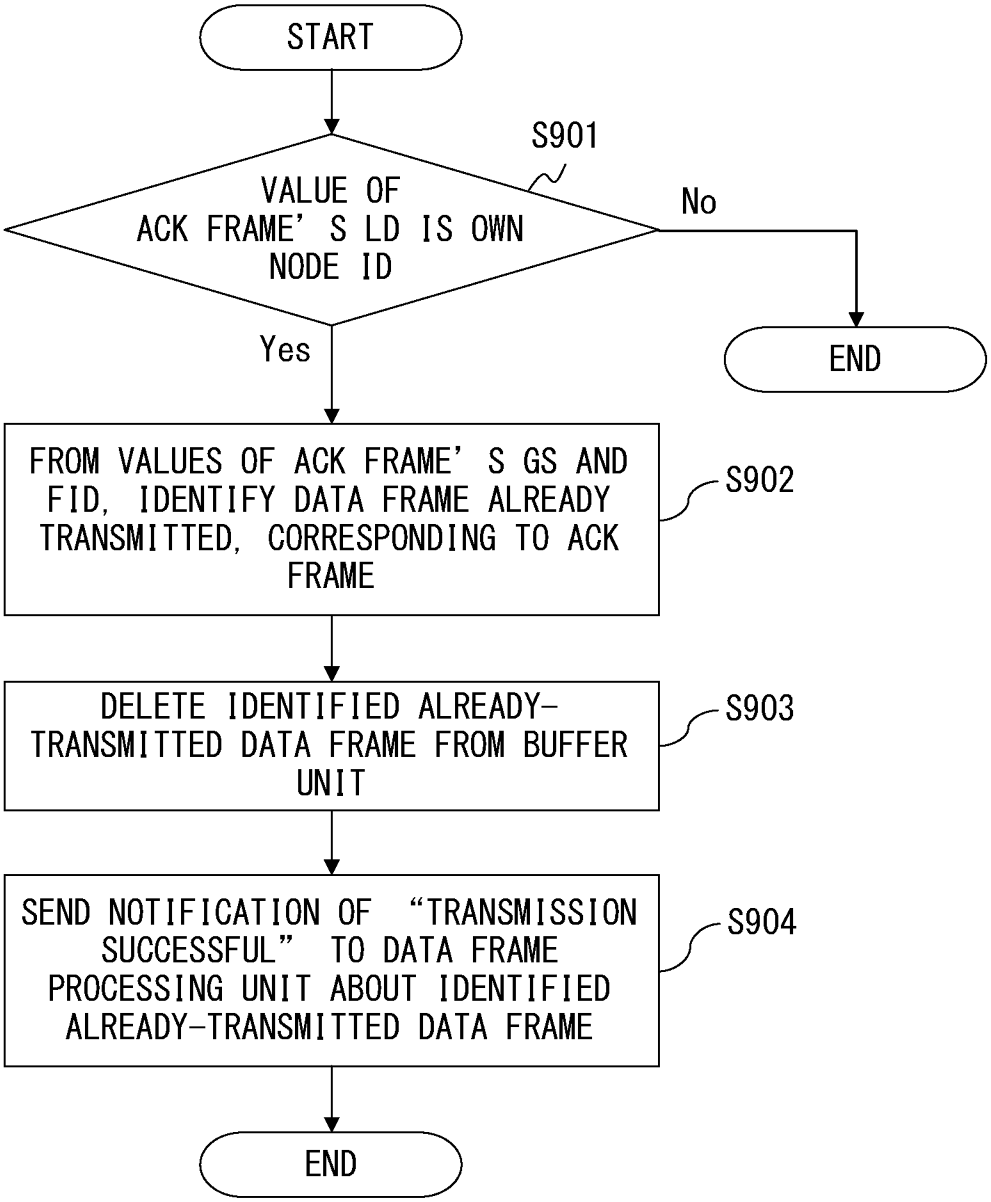
FIG. 25 is a flowchart of an ACK frame reception process in step S206 in FIG. 14.

Meanwhile, in step S206, the frame branching processing unit 106 outputs the received ACK frame to the ACK processing unit 107, and the ACK processing unit 107 performs an ACK frame reception process in FIG. 25. Then, the process returns to step S201. Of course, in a multi-task environment, once the frame branching processing unit 106 outputs the ACK frame, the process may shift to step S201 without waiting for the completion of the ACK frame reception process.

FIG. 15 is a flowchart of a HELLO frame reception process in step S203 in FIG. 14. The process in FIG. 15 starts when the HELLO frame is output from the frame branching processing unit 106 to the link managing unit 108.

In step S301, the link managing unit 108 determines whether or not an entry having the same value as the LS of the received HELLO frame as the node ID exists in the adjacent node managing table 103 (see FIG. 9). The process moves to step S302 if an entry is found, and to step S303 if no entry is found.

Meanwhile, the "received HELLO frame" in the description of FIG. 15 is a HELLO frame that the receiving unit 101 received in step S201 in FIG. 14. That is, the "received HELLO frame" in the description of FIG. 15 is the HELLO frame that the frame branching processing unit 106 outputs to the link managing unit 108 in step S202 and triggered the start of the process in FIG. 15.

In step S302, the link managing unit 108 sets the current time as the last update time of the entry found in step S301. Then, the process in FIG. 15 is terminated.

For example, as a result of step S302 performed in the node apparatus N2, as in FIG. 9, in the adjacent node managing table 103-$N_2$, the value of the last update time field corresponding to the node ID $N_1$ is updated to $TA_{2,1}$. As a result, the node apparatus $N_2$ may memorize that "at the time $TA_{2,1}$, the node apparatus $N_2$ could recognize the node apparatus $N_1$ as the adjacent node apparatus".

On the other hand, if no entry is found in step S301, it means that the HELLO frame has been received from a new node apparatus that has not been recognized as an adjacent node apparatus. Therefore, in the subsequent steps S303-S308, a process to register the new node apparatus as the adjacent node apparatus is performed.

In step S303, the link managing unit 108 sets the value of the LS of the received HELLO frame and the current time in the new entry added in step S303. For example, when the HELLO frame 312 in FIG. 7 is first received, the node apparatus $N_2$ sets $N_3$ being the value of the LS of the HELLO frame 312 in the node ID field of the new entry, and sets the current time in the last update time field of the new entry.

Next, in step S305, the link managing unit 108 determines whether or not there is a weighting table 104-*i* ($1 \le i \le M$) that is yet to be focused, among the weighting tables 104-1 through 104-M (see FIG. 10 and FIG. 11). If all the weighting tables 104-1 through 104-M have been focused already, the process in FIG. 15 is terminated, and if there is any weighting table 104-*i* yet to be focused, the process moves to step S306.

In step S306, the link managing unit 108 focuses, of the ones that have not been focused among the weighting tables 104-1 through 104-M, on the next weighting table. Hereinafter, for convenience of description, it is assumed that the weighting table 104—is focused in step S306.

Then, in step S307, the link managing unit 108 adds a new entry to the focused weighting table 104-*i*.

Further, in step S308, the link managing unit 108 sets the LS of the received HELLO frame, the initial weighting value and the current time in the LD, weighting, last update time fields, respectively, of the added new entry. The initial weighting value is a constant number that is determined arbitrarily according to the embodiment.

In the first embodiment, the value of the weighting is equal to or larger than 0 and equal to or smaller than 1, and 1 is a special value indicating unavailability for selection as the LD, so the initial weighting value may be any value equal to or larger than 0 and smaller than 1. More specifically, the initial weighting value may be 0.5 for example. For example, the first entry of the weighting table 104-1-$N_3$ presented on the opt of the FIG. 11 may be created as follows (however, to be precise, in that case, a different value from the last update time Ta for the two other entries is set as the last update time of the first entry, and it does not become completely the same as FIG. 11).

The weighting table 104-1-$N_3$ associated with the node apparatus N7 as the GD already exists.

However, the node apparatus $N_3$ has not recognized the node apparatus N2 as an adjacent node apparatus.

The node apparatus $N_3$ received the HELLO frame for the first time from the node apparatus $N_2$.

In the above situation, in step S306, the 104-1-$N_3$ was focused in step S306.

Therefore, in step S308, N2 being the value of the LS of the received HELLO frame was set in the LD field of the new entry, and 0.5 being the initial weighting value was set in the weighting field of the new entry.

After the execution of step S308, the process returns to step S305.

Figure 16:
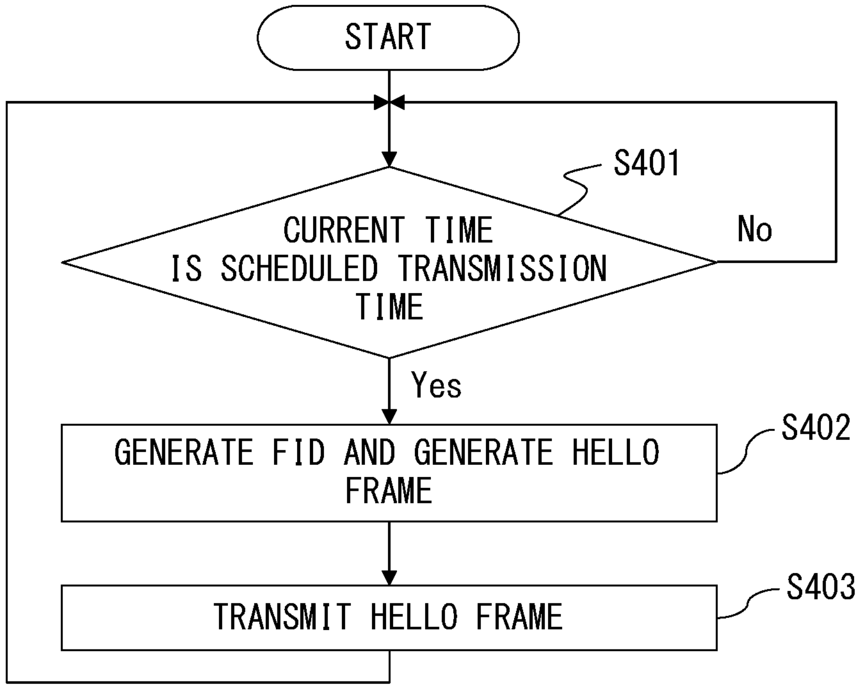
FIG. 16 is a flowchart of a HELLO frame transmission process.

FIG. 16 is a flowchart of a HELLO frame transmission process. The process in FIG. 16 is performed by the HELLO frame generating unit 112 independently from and in parallel to the process in FIG. 14. Specifically, when the power of the node apparatus 100 is turned on, the HELLO frame generating unit 112 starts the process in FIG. 16.

In step S401, the HELLO frame generating unit 112 determines whether or not the current time is the scheduled transmission time. If the current time is the scheduled transmission time, the process moves to step S402, and if the current time is not the scheduled transmission time, the process returns to step S401. That is, the HELLO frame generating unit 112 stands by until the scheduled transmission time.

For example, a reference time $T_{ref}$ and a transmission interval $\Delta T_{hello}$ of HELLO frames may be determined in advance. In addition, the HELLO frame generating unit 112 may refer to the current time $T_{now}$ based on the block of the MPU 201 in FIG. 4 for example. The HELLO frame generating unit 112 may determined that "the current time is the scheduled transmission time" only when Z in expression (4) is an integer.

$$Z(T_{ref}-T_{now})/\Delta T_{hello} \tag{4}$$

For example, the reference time $T_{ref}$ may be a predetermined constant number, or may be the time when the power of the node apparatus 100 is turned on. In addition, the transmission interval $\Delta T_{hello}$ may be determined as needed depending on the embodiment, and may be a relatively long period of time such as 10 seconds.

In step S402, the HELLO frame generating unit 112 requests the FID generating unit 113 to generate anew FID, and the FID generating unit 113 generates a new FID. For example, the FID may be a sequence number, and the FID generating unit 113 may be realized using a counter circuit. Of course, the FID generating unit 113 may also be realized by the MPU 201 executing a program.

In step S402, further, the HELLO frame generating unit 112 generates a HELLO frame using the FID that the FID generating unit 113 generated.

For example, the HELLO frame 312 in FIG. 7 is generated as follows. That is, the FID generating unit 113-$N_3$ of the node apparatus $N_3$ generates a value $F_b$ as a new FID. Then, the HELLO frame generating unit 112-$N_3$ of the node apparatus $N_3$ generates a new HELLO frame 312.

At that time, the HELLO frame generating unit 112-$N_3$ sets a predetermined value 0xFFFFFF in the LD in the HELLO frame 312, sets $N_3$ being the own node ID in the LS and GS, and sets a predetermined value 0x000000 in the GD. In addition, the HELLO frame generating unit 112-$N_3$ sets the value $F_b$ generated by the FID generating unit 113-$N_3$ in the FID in the HELLO frame 312, and sets a predetermined value H in the type.

When the HELLO frame is generated in S402 as described above, next, in step S403, the HELLO frame generating unit 112 requests the transmitting unit 102 to transmit the generated HELLO frame, and the transmission unit 102 transmits the HELLO frame. Then, the process returns to step S401.

Next, the aging processes for various tables are described with reference to FIG. 17-FIG. 19. Each aging process may start being triggered for example by an interrupt signal from the timer IC 203 in FIG. 4.

FIG. 17 is a flowchart of the aging process of the adjacent node managing table 103. For example, the timer IC 203 may output an interrupt signal to the link managing unit 108 at a predetermined interval $I_a$, and the link managing unit 108 may perform the process in FIG. 17 at the predetermined interval $I_a$ triggered by the interrupt signal.

In step S501, the link managing unit 108 focuses on the first entry of the adjacent node managing table 103 (see FIG. 9). Hereinafter, in the description regarding FIG. 17, the entry of the adjacent node managing table 103 that the link managing unit 108 focuses on is referred to as a "focused entry".

Next, in step S502, the link managing unit 108 determines whether or not the difference between the current time and the last update time of the focused entry is equal to or larger than a predetermined value $G_a$. Meanwhile, depending on the embodiment, either $G_a=I_a$, $G_a<I_a$ or $G_a>I_a$ will do.

If the difference between the current time and the last update time of the focused entry is equal to or larger than the predetermined value $G_a$, the process moves to step S503. On the other hand, if the difference between the current time and the last update time of the focused entry is smaller than the predetermined value $G_a$, the process moves to step S505.

In step S503, the link managing unit 108 deletes an entry having the same value as the node ID of the focused entry from the weighting table 104.

For example, if the focused entry is the third entry in the adjacent node managing table 103-$N_3$ in FIG. 9, the value of the node ID of the focused entry is $N_5$. Therefore, in step S503, the link managing unit 108 deletes the entry whose value of LD is $N_5$ from each of the weighting tables 104-1-$N_3$ through 104-M-$N_3$. For example, in step S503, the third entry of the weighting table 104-1-$N_3$ and the third entry of the weighting table 104-5-$N_3$ are deleted.

Then, in step S504, the link managing unit 108 deletes the focused entry from the adjacent node managing table 103. Then, the process moves to step S505.

In step S505, the link managing unit 108 determines whether or not there remains an entry yet to be focused in the adjacent node managing table 103. If the link managing unit 108 has focused on all the entries in the adjacent node managing table 103, the process in FIG. 17 is terminated. On the other hand, if there remains an entry that the link managing unit 108 has not focused on, the process moves to step S506.

In step S506, the link managing unit 108 focuses on the next entry among entries yet to be focused on in the adjacent node managing table 103. Then, the process returns to step S502.

By the aging process in FIG. 17 described above, it becomes possible for the node apparatus 100 to recognize that, when the reception of HELLO frames from node apparatus that has been recognized as an adjacent node apparatus is discontinued, that "the node apparatus is no longer adjacent to the node apparatus 100". That is, by the process in FIG. 17, it becomes possible for the node apparatus 100 to manage adjacent node apparatuses as candidates for a potential LD appropriately in accordance with change in the environment.

Meanwhile, it is desirable that the predetermined interval $I_a$ and the predetermined value $G_a$ mentioned above are determined as needed, according to variability of the environment and the like, depending on the embodiment. Meanwhile, in the first embodiment, the same transmission interval $\Delta T_{hello}$ of HELLO frames is set in all the node apparatuses in the network, and the value $G_a$ mentioned above being the aging time of the adjacent node managing table 103 satisfies $G_a>\Delta T_{hello}$.

FIG. 18 is a flowchart of the aging process of the weighting table 104. For example, the timer IC 203 may output an interrupt signal to the data frame processing unit 110 at a predetermined interval $I_w$, and the data frame processing unit 110 may perform the process in FIG. 18 at the predetermined interval $I_w$ triggered by the interrupt signal.

In step S601, the data frame processing unit 110 focuses on the first weighting table 104-1 in the weighting tables 104 (see FIG. 10 and FIG. 11). Hereinafter, in description regarding FIG. 18, the weighting table that the data frame processing unit 110 focuses on is presented with a reference numeral "104-*i*" (1≤i≤M), and is referred to as a "focused table". Immediately after execution of step S601, i=1.

Next, in step S602, the data frame processing unit 110 focuses on the first entry in the focused table 104-*i*. Hereinafter, the entry that the data frame processing unit 110 focuses on in the focused table is referred to as the "focused entry".

Next, in step S603, the data frame processing unit 110 determines whether or not the difference between the current time and the last update time of the focused entry is equal to or larger than a predetermined value $G_w$. Meanwhile, depending on the embodiment, either $G_w=I_w$, $G_w<I_w$ or $G_w>I_w$ will do.

If the difference between the current time and the last update time of the focused entry is equal to or larger than the predetermined value $G_w$, the process moves to step S604. On the other hand, if the difference between the current time and the last update time of the focused entry is smaller than the predetermined value $G_w$, the process moves to step S605.

In step S604, the data frame processing unit 110 deletes the focused entry from the focused table 104-*i*. Then, the process moves to step S605.

In step S605, the data frame processing unit 110 determines whether or not there remains an entry yet to be focused in the focused table 104-*i*. If the data frame processing unit 110 has focused on all the entries in the focused table 104-*i*, the process moves to step S607. On the other hand, if there remains an entry that the data frame processing unit 110 has not focused on, the process moves to step S606.

In step S606, the data frame processing unit 110 focuses on the next entry among entries yet to be focused on in the focused table 104-*i*. Then, the process returns to step S603.

In step S607, the data frame processing unit 110 determines whether or not any entry exists in the focused table 104-*i*. As a result of repetition of steps S603-S606, when there is no more entry in the focused table 104-*i*, the process moves to step S608. On the other hand, if one or more entries exist in the focused table 104-*i*, the process moves to step S609.

In step S608, the data frame processing unit 110 deletes the focused table 104-*i* in which no entry exists. Then, the process moves to step S609.

In step S609, the data frame processing unit 110 determines whether or not any weighting table that is yet to be focused on remains among the weighting tables 104. If the data frame processing unit 110 has focused on all the weighting tables 104-1 through 104-M, the process in FIG. 8 is terminated. On the other hand, any weighting table 104-*j* (1≤i≤M) that the data frame processing unit 110 has not focused on remains among the weighting tables 104, the process moves to step S610.

In step S610, the data frame processing unit 110 focuses on the next weighting table 104-*j* yet to be focused on among the weighting tables 104 (that is, selects the weighting table 104-*j* as the focused table 104-*i*). Then, the process returns to FIG. 602.

By the aging process in FIG. 8, the situation where "influences from past failures are accumulated, making it impossible to select any node apparatus as the LD" is avoided for the node apparatus 100.

For example, in the example in FIG. 6, a situation is assumed where, after step S112, a failure occurs in the link between the node apparatuses $N_6$ and $N_7$, and the link between the node apparatuses $N_4$ and $N_7$ recovers from a failure. In the aging process in FIG. 18 is not performed, even if it has actually become possible to transmit data frames in a path <$N_1$, $N_2$, $N_3$, $N_4$, $N_7$> due to recovery from the failure, the path is not to be selected as a result of the autonomously-distributed coordination. However, if the aging process in FIG. 18 is performed, in the situation assumed above, it becomes possible for the path <$N_1$, $N_2$, $N_3$, $N_4$, $N_7$> to be selected.

Meanwhile, it is desirable that the predetermined interval $I_w$ and the predetermined value $G_w$ mentioned above are determined as needed, according to variability of the environment and the like, depending on the embodiment.

FIG. 19 is a flowchart of the aging process of the FID managing table 105. For example, the timer IC 203 may output an interrupt signal to the data frame processing unit 110 at a predetermined interval $I_f$, and the data frame processing unit 110 may perform the process in FIG. 19 at the predetermined interval $I_f$ triggered by the interrupt signal.

In step S701, the data frame processing unit 110 focuses on the first entry in the FID managing table 105 (see FIG. 12 and FIG. 13). Hereinafter, in description regarding FIG. 19, the entry that the data frame processing unit 110 focuses on is referred to as the "focused entry".

Next, in step S702, the data frame processing unit 110 determines whether or not the difference between the current time and the last update time of the focused entry is equal to or larger than a predetermined value $G_f$. Meanwhile, depending on the embodiment, either $G_f=I_f$, $G_f<I_f$ or $G_f>I_f$ will do.

Meanwhile, for the reason described later regarding step S807 in FIG. 21, in the first embodiment, the predetermined value $G_w$ being the aging time for the weighting table 104 and the predetermined value $G_f$ being the aging time for the FID managing table 105 satisfy $G_f<G_w$.

If the difference between the current time and the last update time of the focused entry is equal to or larger than the predetermined value $G_f$, the process moves to step S703. On the other hand, if the difference between the current time and the last update time of the focused entry is smaller than the predetermined value $G_f$, the process moves to step S704.

In step S703, the data frame processing unit 110 deletes the focused entry from the FID managing table 105. Then, the process moves to step S704.

In step S703, the data frame processing unit 110 determines whether or not there remains an entry yet to be focused in the FID managing table 105. If the data frame processing unit 110 has focused on all the entries in the FID managing table 105, the process in FIG. 19 is terminated. On the other hand, if there remains an entry that the data frame processing unit 110 has not focused on, the process moves to step S705.

In step S705, the data frame processing unit 110 focuses on the next entry among entries yet to be focused on in the FID managing table 105. Then, the process returns to step S702.

By the aging process in FIG. 19 described above, a situation where "entries in the FID managing table 105 keep increasing and the storage area runs out" may be avoided.

Meanwhile, the value of the predetermined value $G_f$ may be determined, for example, so that in the worst case where backtracking occurs many times, it becomes equal to or longer than the length of time predicted to be required for the data frame to reach the GD from the GS. Meanwhile, the "worst case" means, while details are to be described later with FIG. 30, a case of tracking, in the search space, all search nodes that are not pruned in order of the degree of depth while backtracking. Generally, it is desirable, with a larger scale of the network, to set the predetermined value $G_f$ large as well.

FIG. 20-FIG. 23 are flowcharts of the data frame reception process in step S205. Meanwhile, for convenience of description, the data frame reception process in a case in which the node apparatus 100 is that type that does not become the GS and is dedicated for relaying is described first with reference to FIG. 20-FIG. 23. In a case in which the node apparatus 100 is a type that may also become the GS, the part in FIG. 23 is replaced with the process in FIG. 29.

Upon receiving an instruction from the frame branching processing unit 106 in step S205 in FIG. 14 to perform the data frame receiving process, the data frame processing unit 110 starts the process in FIG. 20. Meanwhile, as described above, the instruction from the frame branching processing unit 106 may be accompanied with the notification of the values of the GS and FID of the received data frame.

In step S801, the data frame processing unit 110 determines whether or not the value of the LD of the received data frame is the own node ID. If the value of the LD of the received data frame is not the own node ID, the process moves to step S802, and if the value of the LD of the received data frame is the own node ID, the process moves to step S803.

Meanwhile, in the description of the data frame reception process, the "received data frame" is the data frame that the receiving unit 101 receives in step S201 in FIG. 14, is stored in the buffer unit 109 in step S204, and triggered the start of the process in FIG. 20.

Meanwhile, the frame branching processing unit 106 tells the values of the GS and FID of the received data frame when it instructs the data frame processing unit 110 to start the data frame reception process. Therefore, the data frame processing unit 110 may find the entry including the received data frame by searching the buffer unit 109 with the told GS and FID. Therefore, the data frame processing unit 110 may read out the value of each field included in the header of the received data frame, from the found entry.

To be precise, in step S801, the data frame processing unit 110 first reads out and stores the value of each field included in the header of the received data frame from the buffer unit 109 as described above. Then, it compares the stored value of the LD (that is, the value of the LD of the received data frame) with the own node ID. Meanwhile, the own node ID being the node ID of the node apparatus 100 itself is recorded in the flash memory 205 in advance, so the data frame processing unit 110 may refer to the own node ID.

When the value of the LD of the received data frame is different from the own node ID, it means that the node apparatus 100 accidentally received a data frame that is irrelevant to the node apparatus 100 itself. Therefore, in step S802, the data frame processing unit 110 discards the received data frame. That is, the data frame processing unit 110 deletes the entry in the buffer unit 109 that was found in step S801. Then, the data frame reception process is terminated.

On the other hand, if the value of the LD of the received data frame is equal to the own node ID, in step S803, the data frame processing unit 110 generates an ACK frame, and requests the transmitting unit 102 to transmit the ACK frame. Then, the transmitting unit 102 transmits the ACK frame.

For example, when the node apparatus $N_3$ receives the data frame 303 in FIG. 7, the data frame processing unit 110-$N_3$ of the node apparatus $N_3$ generates the ACK frame 322 in FIG. 7 in step S803. Then, the transmitting unit 102-$N_3$ transmits the ACK frame 322.

Specifically, the data frame processing unit 110-$N_3$ sets $N_2$ being the value of the LS of the received data frame 303 as the LD of the ACK frame 322, and sets the own node ID (that is, $N_3$ being the own node ID of the node apparatus $N_3$ itself) as the LS of the ACK frame 322. In addition, the ACK frame 322 is irrelevant to ones other than the node apparatus $N_2$ being the LS of the corresponding data frame 303, so the data frame processing unit 110-$N_3$ sets a special value 0x000000 representing null as the GD of the ACK frame 322.

Meanwhile, the data frame processing unit 110-$N_3$ sets the GS and FID of the ACK frame 322 so that the node apparatus $N_2$ may recognize that "the ACK frame 322 is an ACK frame for the data frame 303". That is, the data frame processing unit 110-$N_3$ sets $N_1$ and $F_a$ being the values of the GS and FID of the received data frame 303 as the GS and FID of the ACK frame 322, respectively.

Then, the data frame processing unit 110-$N_3$ sets a predetermined value A indicating the "ACK frame" as the type of the ACK frame 322. In step S803, the data frame processing unit 110-$N_3$ generates the ACK frame 322 as described above, and the transmitting unit 102-$N_3$ transmits the ACK frame 322.

Next, in step S804, the data frame processing unit 110 determines whether or not the value of GD of the received data frame is the own node ID. If the value of the GD of the received data frame is the own node ID, the process moves to step S805. On the other hand, if the value of GD of the received data frame is different from the own node ID, the process moves to step S806 in FIG. 21.

In step S805, the data frame processing unit 110 gives the payload of the received data frame to the higher layer processing unit 111, and terminates the data frame reception process. Specifically, the data frame processing unit 110 takes out the payload from the entry in the buffer unit 109 found in step S801 and outputs to the higher layer processing unit 111, and deletes the entry from the buffer unit 109. Then, the data frame reception process is terminated.

For example, in the node apparatus $N_7$ that received the data frame from the node apparatus $N_6$ on step S112 in FIG. 6, the payload of the received data frame is output to the higher layer processing unit 111-$N_7$, and is processed in the higher layer processing unit 111-$N_7$.

The processes after step S806 in FIG. 21 are performed when the value of the LD of the received data frame is equal to the own node ID and the value of the GD of the received data frame is different from the own node ID.

In step S806, the data frame processing unit 110 searches the FID managing table 105 using the values of the FID and GS of the received data frame as a key. Meanwhile, as described above, the values of the FID and GS of the received data frame is told from the frame branching processing unit 106 at the time of start of the process in FIG. 20.

Next, in step S807, the data frame processing unit 110 determines whether or not an entry is hit as a result of the search in step S806. When an entry is hit, it means that the same data frame as the data frame that the node apparatus 100 previously transmitted has been received, so the process moves to step S808. On the other hand, if no entry is hit, it means that a data frame that the node apparatus 100 never transmitted has been received, so the process moves to step S810.

Meanwhile, to be precise, no entry is hit also in a case in which "while the same data frame as the data frame that the node apparatus 110 previously sent was received, the entry being the target of search has already disappeared due to aging". In order for such a case not to occur, it is desirable that the aging time $G_f$ of the FID managing table 105 is determined, based on an estimation of the worst time in which backtracking is repeated in the network, and so on.

In step S808, the data frame processing unit 110 takes out the values of the LD and OLS of the entry in the FID managing table 105 that was hit in the search in step S806, and stores in a storage area of the DRAM 204 in FIG. 4 for example.

Next, in step S809, the data frame processing unit 110 updates the weighting table (hereinafter, in the description of FIGS. 21-23, referred to by a reference numeral "104-*i*") corresponding to the value of the GD of the received data frame in the following manner. That is, the data frame processing unit 110 changes the weighting in the weighting table 104-*i* corresponding to the LD taken out in step S808 to the maximum value. Meanwhile, in the first embodiment, the maximum value of the weighting is 1. After changing the weighting, the process moves to step S817.

Meanwhile, when the process proceeds from step S807 to S808 and to S809, the existence of the entry corresponding to the LD taken out in step S808 is assured in step S809. The reason for it is as follows.

As described regarding FIG. 12 and FIG. 13, the last update time is set at the time of transmission of the data frame, in the entry in the FID managing table 105. In addition, as described regarding FIG. 19, the aging time Gf of the FID managing table Gf is set as equal to or longer than the time predicted in the worst case, for example. Therefore, when the data frame that the node apparatus 100 previously transmitted is received in the node apparatus 100 after travelling through the network, the entry corresponding to the data frame is assured to be still in the FID managing table 105.

Then, as described regarding FIG. 11, when the data frame is transmitted and an ACK frame is returned, the weighting is updated, and in each entry in the weighting tables 104-1 through 101-M, the last update time is set when the weighting is updated.

Therefore, according the time series, the order is (E1)-(E5) as follows.

(E1) A data frame with the value of GD being $N_{GD}$, the value of GS being $N_{GS}$, the value of LD being $N_{LD}$ and the value of FID being $F_c$ is transmitted from the node apparatus 100. At this time, the last update time is set in the FID managing table 105. For example, in the node apparatus $N_3$ in FIG. 6, the last update time $T_{103}$ is set in the entry $E_3$ in FIG. 12 in step S103.

(E2) When the ACK frame for the data frame is received, in the weighting table 104-*i* corresponding to the node apparatus $N_{GD}$, the weighting of the entry having $N_{LD}$ as the value of the LD field is updated. At this time, the last update time of the entry is set. For example, in the node apparatus $N_3$, the last update time of the entry having $N_4$ as the value of the LD field in the weighting table 104-1-$N_3$ is set to $T_b$ in step S103*a* as illustrated in FIG. 11.

(E3) The same data frame having $N_{GS}$ as the value of the GS and $F_c$ as the value of the FID is received in the node apparatus 100. For example, in step S106 in FIG. 6, the node apparatus $N_3$ receives the data frame. Meanwhile, the value of the GD of the data frame is not to be rewritten upon relaying, so the value of the GD of the data frame received in (E3) is of course $N_{GD}$ according to (E1) above.

(E4) The aging time $G_f$ of the FID managing table 105 passes after the time of (E1).

(E5) The aging time $G_w$ of the weighting table 104 passes after the time of (E2).

As described above, the time of (E3) is precedent to the time of (E5) therefore, at the point of time (E3), in the weighting table 104-*i* corresponding to the node apparatus $N_{SD}$, the existence of the entry having $N_{LD}$ as the value of the LD field is assured.

For example, in the example above, the entry in the weighting table 104-1-$N_3$ having $N_4$ as the value of the LD field is assured at the time of S106 in FIG. 6. Meanwhile, the "time of step S106" is, in greater detail, the point of time at which the node apparatus N3 performs the process in S809 included in the data frame reception process triggered by the reception in FIG. 106.

Therefore, if an entry is found in the FID managing table 105 by the search in step S806 in FIG. 21, in step S809, the entry corresponding to the LD taken out in step S808 always exists in the weighting table 104-*i*. Therefore, in step S809, the data frame processing unit 110 sets the value of weighting to the maximum value in the entry whose existence is assured.

On the contrary, if no entry is found by the search in step S806, in step S810, the data frame processing unit 110 stores the value of the LS of the received data frame as the OLS in the storage area such as the DRAM 204 in FIG. 4 for example.

Then, in step S8011, the data frame processing unit 110 searches the weighting table 104 using the value of the GD of the received data frame as the key.

If the weighting table corresponding to the value of the GD of the received data frame exists in the weighting tables 104, the process moves to step S812*a*. Meanwhile, the reference numeral "104-*i*" introduced in step S809, refers to the weighting table corresponding to the value of the GD of the received frame, and the table hit as a result of the search in step S811 is also the "weighting table 104-*i*".

On the other hand, if the weighting table corresponding to the value of the GD of the received frame does not exist in the weighting tables 104, the process moves to step S813.

In step S812, the data frame processing unit 110 adjusts the weighting table 104-*i* hit in the search in step S811. The weighting table adjustment process in step S812*a* is, while details are to be described later with FIG. 24, a process to counteract the side effect of the aging process.

As a result of the step S812*a*, the existence of entries corresponding to all the adjacent apparatuses managed in the adjacent node managing table 103 in the weighting table 104-*i* is assured. Then, the process moves to step S817.

In step S813, the data frame processing unit 110 adds a new weighting table corresponding to the value of the GD of the received data frame. Meanwhile, the table added in step S813 is also the "weighting table 104-*i*".

Then, in step S814, the data frame processing unit 110 sets the value of the GD of the received data frame as the GD of the weighting table 104-*i* in the new weighting table 104-*i*.

Further, in step S815, the data frame processing unit 110 creates the same number of entries as the number of entries in the adjacent node managing table 103.

Then, in step S816, the data frame processing unit 110 sets the node ID of each entry in the adjacent node managing table 103, the initial weighting value and the current time in each entry created in step S815.

Meanwhile, specific examples of steps S811-S816 are as follows.

For example, it is assumed that the weighting table 104-1-$N_3$ in FIG. 11 does not exist when the data frame 303 in FIG. 7 is received from the node apparatus $N_2$ in step S102 in FIG. 6. Then, even if the data frame processing unit 110-$N_3$ searches the weighting table 104-$N_3$ in step S811 with N7 being the value of the GD of the data frame 303 that the node apparatus $N_3$ received as the search key, no table is hit.

Then, in step S813, the data frame processing unit 110-$N_3$ newly creates the weighting table 104-1-$N_3$, and sets $N_7$ as the GD of the weighting table 104-1-$N_3$. Then, in step S185, the data frame processing unit 110-$N_3$ the same number (that is, three) new entries as in the adjacent node managing table 103-$N_3$ in the weighting table 104-1-$N_3$.

Here, the node ID of each entry of the adjacent node managing table 103-$N_3$ is, as in FIG. 10, $N_2$, $N_4$, and $N_5$. Therefore, in the three entries created in step S815, $N_2$, $N_4$, and $N_5$ are set respectively as the LD. In addition, the data frame processing unit 110-$N_3$ sets the initial value 0.5 in the weighting field of all the three entries, and sets the current time for the last update time of all the three entries.

As a result of steps S813-S816 above, the weighting table 104-1-$N_3$ as in the first row in FIG. 11 is added in the weighting table 104-$N_3$.

Here, the description returns from specific examples to the processes in general in FIG. 21. It is after the execution of step S809, after the execution of step S816, or after that it is determined in step S812 that a table was hit in the search in step S811, that step S817 is performed. Therefore, when step S817 is performed, the existence of the weighting table 104-*i* corresponding to the value of the GD of the received data frame is assured.

Then, in step S817, the data frame processing unit 110 obtains the value of the LD associated with the smallest weighting among the LDs other than the OLS, in the weighting table 104-*i* corresponding to the value of the GD of the received data frame.

That is, in the weighting table 104-*i*, the data frame processing unit 110 selects, among the entries having values other than the value of the OLS stored in step S808 or S810, the one whose value of weighting is the smallest. Then, the data frame processing unit 110 stores the values of the LD and the weighting of the selected entry in a storage area such as DRAM 204 in FIG. 4 for example.

Next, in step S818, the data frame processing unit 110 determines whether or not either of two conditions (F1) and (F2) below is satisfied.

(F1) The weighting corresponding to the value of the LD obtained in step S817 (or S829 described later) is the maximum value for weighting (1.0 in the first embodiment).

(F2) Forwarding of the data frame to the LDs other than the value of the OLS stored in step S808 or step S810 all failed (however, including the case in which only the OLS existed as the LD in the weighting table 104-*i* originally).

If the condition (F1) or (F1) is satisfied, there is no longer any adjacent node apparatus that may be selected as the LD, so the process moves to step S830.

On the other hand, when neither (F1) nor (F2) is satisfied, there is still an adjacent node apparatus that may be selected as the LD. In other words, at least one adjacent node apparatus exists that does not corresponds to any of (G1)-(G4). Then, the node ID of the adjacent node apparatus that may be selected as the LD is obtained in step S817 (or S829 described later).

(G1) It is determined that the path beyond the adjacent node apparatus is a dead end or loop, so the adjacent node apparatus is associated with the weighting of the maximum value.

(G2) Past results where transmission of the data frame addressed to the same GD to the same adjacent node apparatus failed have been accumulated, so the adjacent node apparatus is associated with the weighting of the maximum value.

(G3) As a result of an attempt of transmission of the data frame to the adjacent node apparatus in the current data frame reception process, it has been determined as "transmission failure". That is, no ACK frame was received from the adjacent node apparatus to which the data frame was transmitted after a predetermined period of time passed.

(G4) The adjacent node apparatus is the OLS.

Then, if it is determined in step S818 that neither (F1) nor (F2) is satisfied, the process moves to step S819. The processes after step S819 are processes to try to forward a data frame to the adjacent node apparatus that is identified by the obtained value of the LD.

In step S819, the data frame processing unit 110 creates a new data frame and outputs to the transmitting unit 102, and the transmitting unit 102 transmits the created data frame.

Specifically, the data frame processing unit 110 sets the value of the LD obtained in step S817 (or S829 described later) as the LD of the new data frame, and specifies the own node ID as the LS of the new data frame. In addition, the data frame processing unit 110 copies the values of the respective fields of the GD, GS, FID, type, length and the payload from the received frame to the new data frame. Meanwhile, the "received data frame" is the data frame stored in the entry in the buffer unit 109 found in step S801, as described above.

After the transmission in step S819, the process moves to step S820, and the data frame processing unit 110 updates the timeout time of the buffer unit 109. That is, the data frame processing unit 110 sets the time $T_{timetout}$ in expression (5) as the timeout time of the entry storing the received data frame in the buffer unit 109.

$$T_{timetout}=T_{now}+T_{wait} \tag{5}$$

Meanwhile, in the expression (5), the time $T_{now}$ is the current time and the time $T_{wait}$ is the ACK frame waiting time.

Then, in step S821, the data frame processing unit 110 checks whether an entry was hit in the search in the FID managing table 105 in step 806, or a new entry was added or values were set in the FID managing table 105 in step S823 and S824 described later. That is, the data frame processing unit 110 checks whether an entry exists in the FID managing table 105 having values equal to the values of the GS and FID of the received data frame as the GD and FID.

If an entry was hit in the search in step S806 or a new entry was added or values were set in the FID managing table 105 in step S823 and S824, the current data frame reception process is a process triggered by reception of the same data frame that the node apparatus 100 itself transmitted previously. Therefore, the data frame processing unit 110 executes step S822 next. On the other hand, if no entry was hit in the search in step S806 or not new entry was added or values were not set in the FID managing table 105 in step S823 and S824, the node apparatus 100 is trying for the first time to forward a data frame received for the first time. Therefore, the process moves to step S823.

In step S822, the data frame processing unit 110 updates the entry that was hit in the search in step S806. Specifically, in the entry hit in the search in step S806, the data frame processing unit 110 sets the value of the LD of the data frame transmitted in step S819 in the LD field, and sets the current time in the last update time field. Then, the process moves to step S825.

Meanwhile, in step S823, the data frame processing unit 110 adds a new entry to the FID managing table 105.

Then, in next step S824, the data frame processing unit 110 sets values in the new entry. Specifically, in the each field of the FID, GS and LD, the values in the data frame transmitted in step S819 are set respectively. In addition, in the new entry, the data frame processing unit 110 sets the current time in the last update time fields and copies the value of the OLS stored in step S810 in the OLS field. Then, the process moves to step S825.

In step S825, the data frame processing unit 110 waits for notification as to success/failure of the transmission in step S819.

For example, when the data frame processing unit 110 is realized by the MPU 201 in FIG. 4 that executes the thread of a predetermined program, the thread may be sleeping in step S825. In that case, notification of "transmission success" or "transmission failure" is a process to activate the thread.

When the transmission in step S819 was successful, an ACK frame is returned from the adjacent node apparatus specified as the LD in the data frame transmitted in step S819. then, the ACK processing unit 107 performs the process in FIG. 25 described later, and sends notification of "transmission success" to the data frame processing unit 110.

Meanwhile, failure of the transmission in step S819 means that no ACK frame from the adjacent node apparatus specified as the LD in the data frame transmitted in step S819 is received in the node apparatus 100 when the time T timeout in expression (5) arrives. The reception of the ACK frame is monitored by the process by the ACK processing unit 107 in FIG. 26 described later, and if no ACK frame is received when the time $T_{timeout}$ in expression (5) arrives, the ACK processing unit 107 sends notification of "transmission failure" to the data frame processing unit 110.

When the data frame processing unit 110 receives notification of "transmission success" or "transmission failure" from the ACK processing unit 107, the process moves to step S826.

In step S826, the data frame processing unit 110 determines whether or not the transmission in step S819 was successful, based on the notification received from the ACK processing unit 107. When the transmission was successful, the process moves to step S827, and when the transmission failed, the process moves to step S828.

When the transmission was successful, in step S827, the data frame processing unit 110 in the weighting table 104, the data frame processing unit 110 reduces the weighting corresponding to the combination of the GD and LD in the data frame transmitted in step S819. Here, putting it in other words while noting that the GD of the data frame is not to be rewritten due to forwarding, in step S827, the data frame processing unit 110 performs update of weighting in the weighting table 104-*i* corresponding to the GD of the received data frame.

That is, the data frame processing unit 110 searches for the entry having the value of the LD obtained in step S817 (or S829 described later) as the LD in the weighting table 104-*i*, and reduces the value of weighting of the found entry. To reduce the value of weighting is to increase the degree of priority of the corresponding LD.

Here, assuming the value of the current weighting of the found entry as $W_{current}$ the data frame processing unit 110 may in step S827 update the value of the weighting of the found entry to $W_{revised}$ in expression (6) for example.

$$W_{revised}=\max(W_{min}, W_{current}-\Delta W_{success}) \tag{6}$$

Meanwhile, in the expression 6, $W_{min}$ is the minimum value of weighting, which is $W_{min}$=0.1 in the first embodiment. In addition, $W_{success}$ is a predetermined amount by which weighting is reduced when the transmission is successful, whose value may be determined as needed according to the embodiment. For example, $W_{success}$=0.1 is possible.

Further, in step S827, the data frame processing unit 110 sets the current time as the last update time in the entry in the weighting table 104-*i* having the value of the LD obtained in step S817 (or step S829 described later) as the LD. Then, the data frame reception process is terminated.

On the other hand, if the transmission failed, in step S828, the data frame processing unit 110 increases the weighting corresponding to the combination of the GD and LD of the data frame transmitted in step S819, in the weighting table 104. That is, in step S828, the data frame processing unit 110 searches for the entry having the value of the LD obtained in step S817 (or S829 described later) as the LD in the weighting table 104-*i*, and increases the value of weighting of the found entry. To increase the value of weighting is to lower the degree of priority of the corresponding LD.

For example, the data frame processing unit 110 may in step S828 update the value of the weighting of the found entry to $W_{revised}$ in expression (7) for example.

$$W_{revised}=\text{mix}(W_{max}, W_{current}-\Delta W_{failure}) \quad (7)$$

Meanwhile, in the expression (7), $W_{max}$ is the maximum value of weighting, which is $W_{max}=1$ in the first embodiment. In addition, $W_{failure}$ is a predetermined amount by which weighting is increased when the transmission fails, whose value may be determined as needed according to the embodiment. For example, $\Delta W_{failure}=0.1$ is possible. Of course, $\Delta W_{failure}\neq\Delta W_{success}$ is possible.

Meanwhile, in step S828, the data frame processing unit 110 stores the value of the LD obtained in step S817 (or S829 described later) in the work area such as the DRAM 204 in FIG. 4 for example as the "LD with which forwarding failed". For example, the data frame processing unit 110 may initialize and empty the linear list on the DRAM 204 in step S817, and may add an element to hold the value of the LD obtained in step S817 (or S829 described later). Of course, another data structure such as an array may be used to store the "LD with which for warding failed".

Further, in step S828, the data frame processing unit 110 sets the current time as the last update time in the entry in the weighting table 104-*i* having the value of the LD obtained in step S817 (or S829 described later) as the LD. Then, the process moves to step S829.

In step S829, the data frame processing unit 110 searches for another adjacent node apparatus that may be selected and have not been tried as the LD. Specifically, the data frame processing unit 110 obtains the value of the LD associated with the smallest weighing among LDs other than the LD with which forwarding failed, in the weighting table 104-*i* corresponding to the value of the GD of the received data frame. Meanwhile, the LD with which forwarding failed is stored in step S828 in the work area such as the DRAM 204 in FIG. 4 for example, in the form of a linear list, for example.

That is, the data frame processing unit 110 selects, from entries having the values satisfying (H1) and (H2) as the LD in the weighting table 104-*i*, the one whose value of weighting is the smallest. Then, the data frame processing unit 110 stores the values of the LD and weighting of the selected entry in a storage area such as the DRAM 204 in FIG. 4 for example.

(H1) A value different from the value of the LD obtained previously in S817 or S829

(H2) A value different from the value of the OLS stored in step S808 or S810

Therefore, for example, it is possible that the adjacent node apparatus that is associated with the weighting updated to 0.2 in step S828 is not selected as the LD in step S829, and an adjacent node apparatus having a larger weighting than 0.2, such as 0.8.

Specific examples of steps S817-S829 are as follows. For example, node apparatuses $N_3$, $N_5$ and $N_7$ are adjacent to the node apparatus N4 in FIG. 6. Then, as in FIG. 12, the value of the OLS of the entry E4 of the FID managing table 105-$N_4$ of the node apparatus $N_4$ is $N_3$.

In the example in FIG. 6, since the data frame processing unit 110-$N_4$ of the node apparatus $N_4$ first obtains the value $N_7$ of the LD in step S817, the transmission of the data frame to the node apparatus $N_7$ is performed as in step S104. However, as illustrated in FIG. 6, the transmission in step S104 fails, and the data frame processing unit 110-N4 determines as "transmission failure" in step S826.

Then, at the time when the data frame processing unit 110-$N_4$ executes S829, the value of the LD other than the LD (that is, $N_7$) with which forwarding failed and being different from the OLS (that is, $N_3$) is $N_5$ only. Therefore, in step S829, the value $N_5$ of the LD is obtained.

When the value of the LD is obtained in step S829, the process returns from S829 to S818.

Therefore, in the example of the node apparatus N4, after step S829, steps S818-S826 are executed. Then, as presented as step S105 as in FIG. 6, "transmission success" is determined in FIG. 6 in step S826 this time, and step S827 is executed, then the data frame reception process is terminated.

Meanwhile, the influence of updating weighting in as in the expression (7) for example in step S828 is explained with a specific example as follows.

For example, it is assumed that in the network 2 in FIG. 2, the node apparatus $N_{106}$ received, from the adjacent node apparatus $N_{108}$, the first data frame that specifies the node apparatus $N_{118}$ as the GD at the time $T_{rcv1}$. Then, it is assumed that at the time $T_{rcv1}$, the weighting table 104-$g_{106}$-$N_{106}$ corresponding to the node apparatus $N_{118}$ existed in the node apparatus $N_{106}$. In addition, it is assumed that in the weighting table the weighting table 104-$g_{106}$-$N_{106}$ at the time $T_{rcv1}$, the node apparatus $N_{102}$ is associated with weighting 0.4, the node apparatus $N_{103}$ with weighting 0.7, the node apparatus $N_{107}$ with weighting 0.1, and the node apparatus $N_{108}$ with 0.5, respectively.

Then, in step S817, the node apparatus $N_{107}$ associated with the smallest weighting 0.1 is selected as the LD. It is assumed that, however, when the data frame is transmitted in step S819, the wireless link between the node apparatus $N_{106}$ and the node apparatus $N_{107}$ temporarily becomes unavailable for communication due to a reason such as that a shielding matter is placed accidentally between the node apparatus $N_{106}$ and the node apparatus $N_{107}$.

Then, since no ACK frame is returned, in step S828, the weighting of the node apparatus $N_{107}$ is updated from 0.1 to 0.2. Then, in step S829, the node apparatus $N_{102}$ associated with weighting 0.4 is selected as the LD. Here, it is assumed that the transmission of the data frame in step S819 is successful, and an ACK frame is returned from the node apparatus $N_{102}$.

Here, it is assumed that the first data frame transmitted from the node apparatus $N_{106}$ to the node apparatus N102 reaches the node apparatus $N_{118}$ without backtracking to the node apparatus $N_{106}$. That is, it is assumed that in the weighting table 104-$g_{106}$-$N_{106}$, there is no entry whose weighting is updated to 1 with the forwarding of the first data frame.

Then, at the time $T_{rcv2}$ after that, when the node apparatus$_{106}$ receives the second data frame that also specifies the node apparatus $N_{118}$ as the GD from the node apparatus $N_{103}$ this time, the contents of the weighting table 104-$g_{106}$-$N_{106}$ is as follows. That is, the node apparatus $N_{102}$ is associated with weighting 0.3, the node apparatus $N_{103}$ with weighting 0.7, the node apparatus $N_{107}$ with weighting 0.2, and the node apparatus $N_{108}$ with weighting 0.5, respectively.

Therefore, in step S817, forwarding of the first data frame failed, but the node apparatus $N_{107}$ associated with the smallest weighting is still selected as the LD. Then, if the communication quality of the wireless link between the node apparatuses $N_{106}$ and $N_{107}$ has improved as at the time $T_{rcv2}$ and transmission of the second data frame in step S819 succeeds, the weighting of the node apparatus $N_{107}$ returns to 0.1 again in step S827.

Here, assuming that as a result of the forwarding of the second data frame to the node apparatus $N_{107}$, backtracking is not to occur, the weighting of the node apparatus $N_{107}$ remains 0.1. Therefore, at the time $T_{rcv3}$ after that, if the node apparatus $N_{106}$ receives the third data frame that also specifies the node apparatus $N_{118}$ as the GD from an adjacent node apparatus other than the node apparatus $N_{107}$, the one that is selected with the highest priority as the LD is still the node apparatus $N_{107}$.

As described above, when the weighting is not set drastically to the maximum value but is increased only slightly in step S829, the weighting table 104 does not react excessively to the change in the communication environment. Therefore, if a link temporarily experiencing a failure recovers from the failure while the node apparatus $N_{106}$ receives a plurality of data frames that specify the same node apparatus as the GD one after another, following the improvement in the environment, the result of past learning starts to be utilized again for the selection of the LD. That is, in the example above, the node apparatus $N_{107}$ for which learning was done previously as appropriate for the LD starts to be selected with priority as the LD again.

Instead, the case in which the wireless link between the node apparatuses $N_{106}$ and $N_{107}$ has not recovered from the failure at the time $T_{rcv2}$. In that case, it is also possible that as the LD at the time of transmitting the second data frame, the node apparatus $N_{107}$ with weighting 0.2 is selected once, but since no ACK frame is received, the node apparatus $N_{102}$ associated with weighting 0.3 is selected eventually, and the weighting is updated to 0.2 as the transmission is successful.

Then, at the time $T_{rcv3}$, when the node apparatus $N_{106}$ receives the third data frame from the node apparatus $N_{103}$ for example, the node apparatus $N_{102}$ associated with weighting 0.2 is selected as the LD, and the transmission may be successful again, and the weighting of the node apparatus $N_{102}$ may become 0.1. Then, for a while after that, the node apparatus $N_{106}$ may keep selecting the node apparatus $N_{102}$ as the LD of the data frame that specifies the node apparatus $N_{118}$ as the GD.

However, further after that, if a failure occurs in the wireless link between the node apparatuses $N_{106}$ and $N_{102}$, no ACK frame is to be returned from the node apparatus $N_{102}$. Then, reselection of the LD is performed in step S829.

In that case, the node apparatus $N_{107}$ for which learning was done before the time $T_{rcv1}$ as preferable as the LD is selected as the LD with priority over the node apparatuses $N_{108}$ and $N_{103}$ that are associated with weightings 0.5 and 0.7 and are not very appropriate relatively as the LD. That is because the learning of weighing at the time of transmission of the first and second data frames is to change the weighting gradually as illustrated in step S828, and the weighting of the node apparatus $N_{107}$ is still smaller than weightings of the node apparatuses $N_{108}$ and $N_{103}$.

Then, if the wireless link between the node apparatuses N106 and N107 has recovered from the failure at this point of time, the weighting of the node apparatus N107 is reduced to 0.2 again. Thus, even if the recovery takes some time, since the temporary change in the environment is not reflected to the weighting table 104 excessively, the result of the learning in the past is reflected moderately. Therefore, the probability for an appropriate LD to be selected also increases.

As described above, in order not to be affected excessively from a temporary failure, in step S828, the weighting is adjusted only slightly.

Here, description returns to branching in step S818. When it is determined in step S818 that either of the two conditions (F1) and (F2) is satisfied, there is no longer any adjacent node apparatus that may be selected as the LD, so the process moves to step S830 in FIG. 23.

In step S830, the data frame processing unit 110 creates a new data frame as described below and outputs to the transmitting unit 102, and the transmitting unit 102 transmits the created frame.

Specifically, the data frame processing unit 110 specifies the value of the OLS stored in step S808 or S810 as the LD of the new data frame, and specifies the own node ID as the LS of the new data frame. In addition, the data frame processing unit 110 copies the value of each field of the GS, GS, FID, type and length and the payload from the received data frame to the new data frame. Meanwhile, the "received data frame" is, as described above, the data frame stored in the entry in the buffer unit 109 found in step S801. The transmission process performed in step S830 is namely the backtracking operation.

Meanwhile, a specific example of the transmission in step S830 is step S110 in FIG. 6.

After the transmission in step S830, the process moves to step S831. In step S831, the data frame processing unit 110 searches the FID managing table 105 using the values of the FID and GS of the received data frame as the search key.

Then, in step S832, the data frame processing unit 110 determines whether or not any entry was hit as a result of the search in step S831. If any entry was hit, the process moves to step S833, and if no entry is hit, the process moves to S834.

Meanwhile, in a case in which it is determined as "an entry was hit" in step S807, the entry found as a result of the search in step S831 is an entry that was found as a result of the search in step S806. Meanwhile, in a case in which it is determined as "no entry was hit" in step S807 and a new entry is created in step S823, the new entry created in step S823 is found as a result of the search in step S831.

It is with both a combination of (I1) and (I2), or both a combination of (J1) and (J2) in other words, that it is determined as "no entry was hit" in step S823.

(I1) It is determined in step S807 that "no entry was hit".

(I2) Immediately after step S818 was executed for the first time, the process moved to step S830.

(J1) A data frame that the node apparatus 100 had never received was received.

(J2) In the weighting table 104-*i* corresponding to the value of the GS of the received data frame, all the LDs are associated with the weighting of the maximum value.

In step S833, the data frame processing unit 110 updates the entry that was hit as a result of the search in step S831. Specifically, in the hit entry, the data processing unit 110 copies the value of the OLS of the entry itself to the LD, and sets the current time as the last update time. Then, the process moves to step S836.

Meanwhile, in step S834, the data frame processing unit 110 adds a new entry to the FID managing table 105.

Then, in next step S835, the data frame processing unit 110 sets values in the entry added in step S834. Specifically, in the new entry, the data frame processing unit 110 copies the values of the received data frame to the FID and GS respectively, sets the current time as the last update time, and copies the value of the LS of the received data frame to the OLS and LD. Then, the process moves to step S836.

In step S836, the data processing unit 110 waits for notification as to transmission success/failure of the data frame transmitted in step S830. Then, when the data frame processing unit 110 receives notification of "transmission success" or "transmission failure" from the ACK processing unit 107, the process moves to step S837. Since the step S836 is similar to step S825, detailed description is omitted.

Then, in step S837, the data frame processing unit 110 determines whether or not the transmission of the data frame in step S830 was successful. When the transmission failed, the process moves to step S838, and when the transmission was successful, the process moves to step S839.

It is in an exceptional with both a combination of (K1) and (K2) that step S838 is executed.

(K1) All the adjacent node apparatuses other than the OLS are (K1-1) or (K1-2).

(K1-1) Associated with the weighting of the largest value.

(K1-2) When the data frame specified as the LD is transmitted, the transmission fails.

(K2) Transmission of the data frame to the OLS (that is, the backtracking operation) failed.

In that case, the data frame processing unit 110 discards the received data frame in step S838. That is, the data frame processing unit 110 deletes the entry found in step S801 from the buffer unit 109. Then, the data frame reception process is terminated.

Meanwhile, the influence of step S838 is described below with a specific example.

For example, the step S110 in FIG. 6 is the transmission that the node apparatus $N_3$ performs in step S830. In the example in FIG. 6, in response to the transmission of the frame from the node apparatus $N_3$ to the node apparatus $N_2$ in step S110, the node apparatus $N_2$ returns an ACK frame to the node apparatus $N_3$.

Here, on the contrary, it is assumed that a failure occurs in the link between the node apparatuses $N_2$ and $N_3$ at the time of step S110, and the data frame that the node apparatus $N_3$ transmitted in step S110 (that is, step S830) did not reach the node apparatus $N_2$. Then, the node apparatus $N_3$ obviously never receives any ACK frame from the node apparatus $N_2$, so the node apparatus $N_3$ determines as "transmission failure" and executes step S838. That is, the data frame that the node apparatus $N_1$ transmitted in step S101 disappears in the network 1 before reaching the node apparatus $N_7$ being the GD.

Moreover, for the node apparatus $N_2$, the situation is "after the transmission was done successfully in step S102, the same data frame has not been received from any adjacent node". Therefore, in the node apparatus $N_2$ does not recognize that "it is inappropriate for the node apparatus $N_2$ to select the node apparatus $N_3$ as the LD when the node apparatus $N_7$ is selected as the GD". That is, as in the example in FIG. 6, the node apparatus N2 cannot learn that "when the node apparatus N7 is specified as the GD, it is appropriate for the node apparatus N2 to select the node apparatus N6 as the LD".

As a result, when the node apparatus $N_2$ receives another new data frame in which the node apparatus $N_7$ is specified as the GD (or the node apparatus $N_2$ transmits such a data frame while being the GS), the node apparatus $N_2$ selects the node apparatus $N_3$ as the LD.

Tentatively, it is assumed that the link between the node apparatuses $N_2$ and $N_3$ has not recovered from the failure yet at that point of time (for example, if a bad signal condition persists), the data frame transmitted from the node apparatus $N_2$ does not reach the node apparatus $N_3$. Therefore, the node apparatus $N_2$ is unable to receive the ACK frame, and it is determined as "transmission failure" in step S826 in FIG. 22.

As a result, in step S828, the weighting corresponding to the node apparatus $N_2$ in the weighting table 104-$h_2$-$N_2$ (the reference numeral is in the same manner as in the description of FIG. 6) corresponding to the node apparatus $N_7$ being the GD is increased. Then, the node apparatus N2 reselects the node apparatus $N_2$ as the LD in next step S829.

Thus, when the data frame is discarded in step S838 in the node apparatus $N_3$ in the network 1, the learning for the weighting table 104-$h_2$-$N_2$ corresponding to another node apparatus $N_2$ being the OLS related to the discarded data frame may be delayed.

However, as is apparent from the illustration above, learning in the node apparatus $N_2$ is delayed only slightly. After receiving the next data frame with the node apparatus $N_7$ as the GD in the same manner as the previous data frame, the node apparatus $N_2$ may learn the appropriate weighting by a series of processes triggered by the reception. That is, as the operation of the network 1 as a whole where a plurality of data frames are distributed one after another, even if there is a node apparatus in which learning of weighting is delayed locally due to transmission failure of the data frame for backtracking of the OLS, the delay in learning may soon be made up.

Here, the description returns to the flowchart in FIG. 23. Step S839 is performed when the transmission of the data frame to the OLS is successful.

In step S839, the data frame processing unit 110 reduces the weighting corresponding to the combination of the GD and LD of the data frame transmitted in step S830 in the weighting table 104. In other words, the data frame processing unit 110 updates the weighting corresponding to the LD of the transmitted data frame (that is, the OLS stored in step S808 or S810) in the weighing table 104-*i* corresponding to the GD of the received data frame.

While details of step S839 are similar to step S827 and description is omitted, the data frame processing unit 110 may update the weighting, for example using the expression (6). The data frame processing unit 110 further sets the last update time to the current time for the entry of the weighting table 104-*i* which updated the weighting. Then, the data frame reception process is terminated.

Next, with reference to FIG. 24, the details of the weighting table adjustment process in step S812*a* in FIG. 21 are described. Meanwhile, the weighting table adjustment process in FIG. 24 is also called in step S1108*a* in FIG. 27 described later. In the description of FIG. 24, the "hit weighting table 104-*i*" refers to a table hit in the search in step S881 in FIG. 21 or in the search in step S1107 in FIG. 27.

In step S851, the data frame processing unit 110 focuses on the first entry in the adjacent node managing table 103 (see FIG. 9). Meanwhile, in the description of FIG. 24 below, the entry that the data frame processing unit 110 focuses on in the adjacent node apparatus managing table 103 is referred to as the "focused entry".

Next, in step S852, the data frame processing unit 110 determines whether or not there is any entry including the value of the node ID of the focused entry as the LD in the hit weighting table 104-*i*. If there is any entry including the value of the node ID of the focused entry as the LD in the hit weighting table 104-*i*, the process moves to step S855. On the contrary, if there is no entry including the value of the node ID of the focused entry as the LD in the hit weighting table 104-*i*, the process moves to step S853.

In step S853, the data frame processing unit 110 adds an new entry in the hit weighting table 104-*i*.

Next, in step S854, the data frame processing unit 110 sets values in the new entry added to the weighting table 104-*i*. That is, in the new entry, the data frame processing unit 110 sets the value of the node ID of the focused entry in the adjacent node managing table 103 in the LD field, the initial weighting value in the weighting field, and the current time in the last update time field, respectively.

Meanwhile, the initial weighting value in step S854 is different from the initial weighting value in step S308 in FIG. 15. Specifically, the initial weighting value in step S854 is the maximum value of the weightings smaller than 1 in the weighting field of the hit weighting table 104-*i*.

For example, if four entries exist in the weighting field of the hit weighting table 104-*i* and the value of the weighting field of each is 0.4, 0.7, 1 and 0.5, the initial weighting value in step S854 is 0.7. Meanwhile, if the value of the weighting field in hit weighting table 104-*i* is 1 in the all entries, the initial weighting value in step S854 is any value smaller than 1, which may be 0.5 for example in the same manner as the initial weighting value in S308 in FIG. 15.

By using the initial weighting value as described above in step S854, the learning result reflected to the existing entries in the weighting table 104-*i* is taken in with priority. As a result, the path does not change more than needed, in other words, the path becomes stable.

For example, in the above example where the value of the weighting field of the four entries is 0.4, 0.7, 1 and 0.5 respectively, it is assumed that 0.5 is used as the initial weighting value in step S854 in the same manner in step S308 in FIG. 15. Then, an adjacent node apparatus for which no learning of weighting has been done (that is, the adjacent node apparatus whose node apparatus is recorded as the LD in the new entry added in step S853) is selected as the LD with a higher priority than the adjacent node apparatus with weighting 0.7. That is, the weighting 0.7 as the accumulation of learning so far is disregarded.

Therefore, in the first embodiment, to prevent an adjacent node apparatus for which no learning of weighting has been done from being selected as the LD with a higher priority than an adjacent node apparatus for which learning of weighting has been done and to take in the learning result so far, the initial weighting value defined as described above is used.

In step S855, the data frame processing unit 110 determines whether or not there remains any entry yet to be focused on in the adjacent node managing table 103. If the data frame processing unit 110 has focused on all the entries in the adjacent node managing table 103, the process in FIG. 24 is terminated. On the other hand, if there remains any entry that the data frame processing unit 110 has not focused on in the adjacent node managing table 103, the process moves to step S856.

Then, in step S856, the data frame processing unit 110 focuses on the next entry among the entries yet to be focused on in the adjacent node managing table 103. Then the process returns to step S852.

Meanwhile, the purpose of the process in FIG. 24 is as follows.

The following situation is possible immediately before the process in FIG. 24 as a side effect of the aging process for each entry in the weighting table 104-*i*. That is, the entry having the node ID of a given adjacent node apparatus registered in the adjacent node managing table 103 as the LD may not exist in the weighting table 104-*i*.

Here, the adjacent apparatuses of the node apparatus 100 are potential candidates that the data frame processing unit 110 selects when transmitting the data frame. Therefore, it is desirable for the appropriate operation of the node apparatus 100 that all the adjacent node apparatuses are covered in the LD field of the hit weighting table 104-*i*.

According to the weighting table adjustment process in FIG. 24 described above, the situation as described above that may occur as a side effect of the aging process is solved. That is, all of the node IDs registered in the adjacent node managing table 103 being registered the hit weighting table 104-*i* as the LD is assured.

The data frame reception process in step S205 in FIG. 14 was described in detail above with reference to FIGS. 20-24. Next, processes related to notification of transmission success/failure in step S826 and S837 in the data frame reception process are described with reference to FIG. 25 and FIG. 26.

FIG. 25 is a flowchart of the ACK frame reception process in step S206 in FIG. 14. The process in FIG. 25 starts when an ACK frame is output from the frame branching unit 106 to the ACK processing unit 107.

In step S901, the ACK processing unit 107 determines whether or not the value of the LD of the ACK frame received from the frame branching unit 106 is equal to the own node ID. If the value of the LD is equal to the own node ID, the process moves to step S902, and if the value of the LD of the ACK frame is different from own node ID, the process in FIG. 25 is terminated. The ACK processing unit 107 may also refer to the own node ID stored in advance in the flash memory 205 for example.

For example, when the node apparatus $N_5$ receives the ACK frame in response to the data frame that the node apparatus $N_4$ transmitted in step S105 in FIG. 6 as presented as step S105*a* in FIG. 31, the irrelevant node apparatus $N_3$ also receives the ACK frame. This is because the node apparatus $N_3$ is adjacent to the node apparatus $N_5$.

However, the ACK processing unit 107-$N_3$ terminates the process in FIG. 25 immediately as a result of the determination in step S901, the node apparatus $N_3$ is not to be affected by the side effect from the ACK frame that is irrelevant to the node apparatus $N_3$.

In step S902, the ACK processing unit 107 identifies the data frame that has already been transmitted and corresponds to the ACK frame, from the values of the GS and FID of the ACK frame.

For example, in response to the data frame 303 in FIG. 7 that the node apparatus $N_2$ transmits to the node apparatus N3 in step S102 in FIG. 6, the node apparatus $N_3$ returns the ACK frame 322 in FIG. 7 to the node apparatus $N_2$. Here, detail description of the case in which the ACK processing unit 107-$N_2$ of the node apparatus $N_2$ performs the process in FIG. 25 triggered by the reception of the ACK frame 322 is as follows.

In step S902, the ACK processing unit 107-$N_2$ takes out the values of the GS and FID (that is, $N_1$ and $F_a$) of the ACK frame 322. Meanwhile, since the buffer unit 109-N2 is in the same format as in FIG. 8, the data frame 303 that has already been transmitted from the node apparatus $N_2$ is stored in the buffer unit 109-$N_2$. Therefore, the ACK processing unit 107-$N_2$ searches the entries of the buffer unit 109-$N_2$ with the taken out values of the GS and FID as a key, and identifies the entry that includes the data frame 303.

Next, in step S903, the ACK processing unit 107 deletes the data frame that has already been transmitted and identified in step S902 from the buffer unit 109. That is, the ACK processing unit 1017 deletes the entry found in the search in step S902 from the buffer unit 109.

Meanwhile, in step S904, the ACK processing unit 107 sends notification of "transmission success" regarding the data frame that has been already transmitted and identified in step S902. Then, the process in FIG. 25 is terminated.

For example, the data frame processing unit 110 may be realized by the MPU 201 in FIG. 4 executing a program. In that case, the thread that makes the data frame processing unit 110 function may be sleeping after the transmission of the data frame until an ACK frame is received. The notification of "transmission success" is a process to activate the sleeping thread.

Meanwhile, the notification in step S904 is accompanied by notification of values of the GS and FID of the data frame identified in step S902. For example, in the example above, the ACK processing unit 107-$N_2$ also sends notification of the values of the GS and FID (that is, $N_1$ and $F_a$) for identifying the data frame 303 to the data frame processing unit 110.

FIG. 26 is a flowchart illustrating a case in which no ACK frame is received by the timeout time. The process in FIG. 26 is performed regularly triggered by interrupt signals that the timer IC 203 in FIG. 4 generates at a predetermined interval, for example.

In step S1001, the ACK processing unit 107 focus on the first entry in the buffer unit 109 (see FIG. 8). Hereinafter, in description regarding FIG. 26, the entry in the buffer unit 109 that the ACK processing unit 107 focuses on is referred to as the "focused entry".

Next, in step S1002, the ACK processing unit 107 compares the current time and the value of the timeout time field in the focused entry. Then, if the current time is later than the timeout time, the process moves to step S1003. On the other hand, if the current time has not reached the timeout time, the process moves to step S1005.

In step S1003, the ACK processing unit 107 sends notification of "transmission failure" regarding the data frame stored in the focused entry in the buffer unit 109 to the data frame processing unit 110. The notification in step S1003 may be, specifically, a process to activate a sleeping thread in the same manner as the notification in step S904, for example, In addition, in the same manner as the notification in step S904, the notification in step S1003 is accompanied by notification of the values of the GS and FID of the data frame. Specifically, the ACK processing unit 107 reads out the values of the GD and FID of the data frame stored in the focused entry, identifies the data frame from the read-out GS and FID, and sends notification of "transmission failure" of the identified data frame.

Meanwhile, in the case of transmission failure, the data frame processing unit 110 may attempt retransmission of the data frame while selecting an adjacent node apparatus that has not been tried as the LD yet as the new LD. Therefore, at the time of step S1003, the focused entry is not deleted from the buffer unit 109.

Next, in step S1004, the ACK processing unit 107 sets the time $T_{timeout}$ in the expression (5) as the timeout time of the focused entry. Then, the process moves to step S1005.

In step S1005, the ACK processing unit 107 determines whether or not there remains any entry in the buffer unit 109 yet to be focused. If the ACK processing unit 107 has focused on all the entries, the process in FIG. 26 is terminated. On the other hand, if there remains any entry that the ACK processing unit 107 has not focused on, the process moves to step S1006.

In step S1006, the ACK processing unit 107 focuses on the next entry yet to be focused in the buffer unit 109. Then the process returns to step S1002.

By the way, the data frame reception process described with reference to FIG. 20-FIG. 23 is, as described above, an example for the case in which the node apparatus 100 does not become the GS. Hereinafter, with reference to FIG. 27-FIG. 29, the process unique to the node apparatus of the type that may become the GS.

Figure 27:
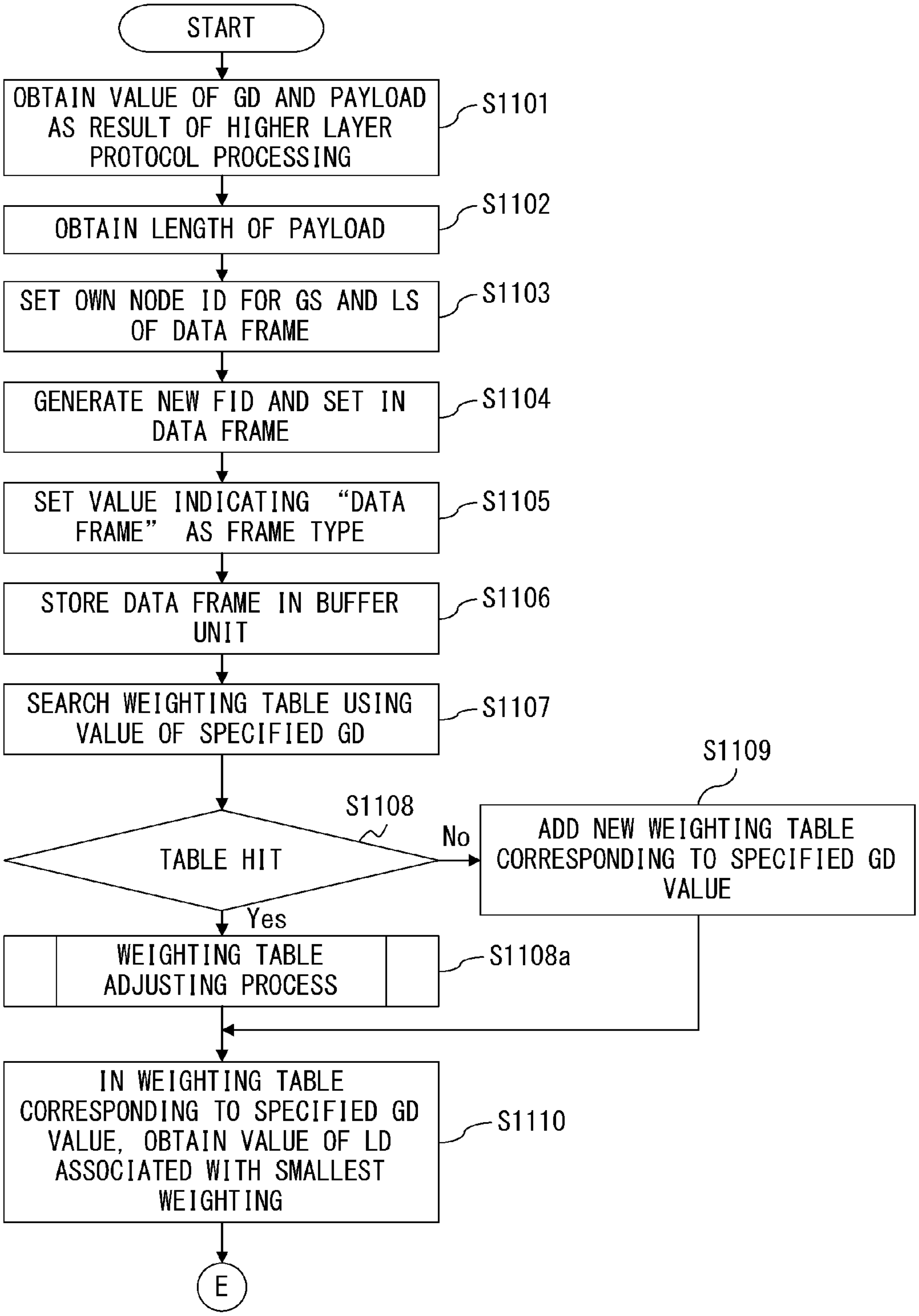
FIG. 27 is a flowchart (part 1) of a transmission process in a case in which the node apparatus 100 becomes GS and transmits the data frame.

FIG. 27 and FIG. 28 are flowchart of the transmission process in a case in which the node apparatus 100 transmits a data frame while being the GS. The process in FIG. 27 starts triggered by a request from the higher layer processing unit 111 to the data frame processing unit 110.

In step S1101, the data frame processing unit 110 obtains the value of the GD of the data frame and the payload, as a result of processing of a protocol of a higher layer in the higher layer processing unit 111.

For example, the "protocol in a higher layer" may be the Ethernet protocol. In that case, the higher layer processing unit 111 outputs an Ethernet frame to the data frame processing unit 110 as the payload of the data frame defined in the first embodiment. In addition, the higher layer processing unit 111 sends notification of the value set in as the GD of the data frame in the first embodiment to the data frame processing unit 110.

Then, the data frame processing unit 110 creates a new data frame including the payload obtained from the higher layer processing unit 111, and sets the value obtained from the higher layer processing unit as the GD of the created data frame. For example, in the example in FIG. 6, the data frame processing unit 110-$N_1$ of the node apparatus $N_1$ obtains $N_7$ as the value of the GD from the higher layer processing unit 111-$N_1$, and sets $N_7$ as the GD of the data frame.

Next, in step S1102, the data frame processing unit 110 obtains the length of the payload obtained in step S1101, and sets in the length field of the created data frame. For example, in the example in FIG. 6, since the length of the payload is Pa as illustrated in data frames 302 and 303 in FIG. 7, the data frame processing unit 110-$N_1$ of the node apparatus $N_1$ sets Pa in the length field of the created data frame.

Then, in step S1103, the data frame processing unit 110 sets the own node ID as the GS and LS of the created data frame. For example, in the example in FIG. 6, the data frame processing unit 110-$N_1$ of the node apparatus $N_1$ sets $N_1$ as the GS and LS of the created data frame respectively.

Then, in step S1104, the data frame processing unit 110 requests the FID generating unit 113 to create a new FID. Then, the FID generating unit 113 creates a new FID and outputs to the data frame processing unit 110, and the data frame processing unit 110 sets the created FID in the FID field of the created data frame.

Further, in step S1105, the data frame processing unit 110 sets a predetermined value D (see FIG. 7) indicating the "data frame" in the type field of the created data frame. Meanwhile, the order to execute steps S1102-S1105 above is random.

As described above, when creation of the data frame to be transmitted is completed, the data frame processing unit 110 stores the created data frame in the buffer unit 109 in step S1106. That is, the data frame processing unit 110 secures an area of a new entry in the buffer unit 109, and stores the created data frame in the secured area. Meanwhile, as illustrated in FIG. 8, the buffer unit 109 has a timeout time field, but the timeout time is not set at this point of time.

Next, in step S1107, the data frame processing unit 110 searches the weighting table 104 using the value of the GD specified by the higher layer processing unit 111 in step S1101.

Then, in step S1108, the data frame processing unit 110 determines whether or not the weighting table corresponding to the value of the specified GD was hit as a result of the search in step S1107. When the weighting table corresponding to the value of the specified GD was hit, the process moves so step S1108*a*, and when the weighting table corresponding to the value of the specified GD does not exist, the process moves to step S1009.

In step S1108*a*, the data frame processing unit 110 performs the weighting table adjustment process in FIG. 24, to counteract the side effect of the aging process. Then, the process moves to step S1110.

In step S1109, the data frame processing unit 110 adds a new weighting table corresponding to the value of the GD specified in step S1101 to the weighting tables 104. Specifically, the data frame processing unit 110 performs similar processes to steps S813-S816 in step S1109.

That is, in step S1109, the data frame processing unit 110 adds a new weighting table corresponding to the value of the GD specified by the higher layer processing unit 111, and sets the value of the GD specified by the higher layer processing unit 111 as the GD in the new weighting table. Further, the data frame processing unit 110 creates the same number of new entries as in the adjacent node managing table 103 in the new weighting table. Then, the data frame processing unit 110 sets the node ID of each entry in the adjacent node managing table 103, the initial value and the current time in created each entry, respectively.

Meanwhile, hereinafter, for convenience of description, the weighting table corresponding to the value of the GD specified in step S1101 is referred to by a reference numeral "104-*i*". That is, the weighting table 104-*i* is the table hit in the search in step S1107 or the table added in step S1109.

After it was determined that the weighting table 104-*i* was hit in step S1108, or after the weighting table 104-*i* was created in step S1109, the process moves to step S1110.

Then, in step S1110, the data frame processing unit 110 obtains the value of the LD associated with the smallest weighting in the weighting table 104-*i* corresponding to the value of the GD specified by the higher layer processing unit 111. Meanwhile, as illustrated in FIG. 11, there may be a case in which pluralities of entries have the same smallest weighting in the weighting table 104-*i*. In that case, the data frame processing unit 110 selects and obtains any one of the values of the plurality of LDS associated with the smallest value in step S1110. The data frame processing unit 110 stores the obtained value of the LD and the value of the corresponding weighting in a storage area such as the DRAM 204 for example.

Next, the process moves to step S1111 in FIG. 28, and in step S1111, the data frame processing unit 110 determines whether or not either of two conditions (L1) and (L2) below is satisfied.

(L1) The weighting corresponding to the value of the LD obtained in step S1110 is the maximum value of weighting (in the first embodiment, specifically, 1.0).

(L2) Transmission to all the LD registered in the weighting table 104-*i* failed.

If either the condition (L1) or (L2) is satisfied, there is no longer any adjacent node apparatus that may be selected as the LD, and the process moves to step S1112.

On the other hand, if neither (L1) nor (L2) is satisfied, there still remains an adjacent node apparatus that may be selected as the LD. In other words, there exists at least one adjacent node apparatus that does not correspond to any of (G1)-(G3) described regarding step S818 in the data frame reception process. Then, the node ID of the adjacent node apparatus that may be selected as the LD is obtained in step S1110 (or step S1125 described later). Then, if it is determined in step S1111 that neither the condition (L1) nor (L2) is satisfied, the process moves to step S1114.

If the condition (L1) or (L2) is satisfied, the data frame processing unit 110 discards the data frame in step S1112. That is, the data frame processing unit 110 deletes the entry created newly in step S1106 and stores the data frame from the buffer unit 109.

Next, in step S1113, the data frame processing unit 110 sends notification of "transmission failure" to the higher layer processing unit 111. That is, the data frame processing unit 110 notifies the higher layer processing unit 111 of the fact that the data frame could not be transmitted to any adjacent node apparatus successfully. Then, the processes in FIG. 27-FIG. 28 are terminated.

On the other hand, in step S1111, if it is determined that neither the condition (L1) nor (L2) is satisfied, a process to try forwarding of the data frame to an adjacent node apparatus identified by the value of the LD that has already been obtained is performed in step S1114-S1125.

In step S1114, the data frame processing unit 110 sets the value of the LD obtained in step S1110 or in step S1125 described later as the LD of the data frame stored in the buffer unit 109 in step S1106. Then, the data frame processing unit requests the transmitting unit 102 to transmit the data frame for which the value of the LD is set. Then, the transmitting unit 102 transmits the data frame.

Next, in step S1115, the data frame processing unit 110 sets the time $T_{timeout}$ in the expression (5) as the time out time of the entry in the buffer unit 109 in which the data frame is stored in the step S1106.

Then, in step S1116, the data frame processing unit 110 searches the FID managing table 105 using the own node ID and the FID that the FID generating unit 113 generated in step S1104.

Next, in step S1117, the data frame processing unit 110 determines whether or not any entry was hit in the search in the FID managing table in step S1116. Meanwhile, when step S1117 is executed for the first time, it is determined that "no entry was hit", and when step S1117 is executed for the second time and beyond, it is determined that "an entry was hit".

When an entry was hit in the search in step S1116, the process moves to step S1118. On the other hand, when no entry was hit in the search in step S1116, the process moves to step S1119.

In step S1118, the data frame processing unit 110 updates the entry hit in the search in step S1116. Specifically, in the entry hit in the search in step S1116, the data frame processing unit 110 sets the value of the LD of the data frame transmitted in step S1114 in the LD field, and sets the current time in the last update time field. Then, the process moves to step S1121.

Meanwhile, in step S1119, the data frame processing unit 110 adds a new entry to the FID managing table.

Then, in next step S1120, the data frame processing unit 110 sets value in the new entry. Specifically, in the new entry, the data frame processing unit 110 copies the values of the data frame transmitted in step S1114 in each field of the FID, GS, and LD. In addition, in the new entry, the data frame processing unit 110 sets the current time in the last update time field, copies the own node ID in the OLS field.

For example, the entry E1 of the FID managing table 105-$N_1$ of the node apparatus N1 illustrated in FIG. 12 is the one that the data frame processing unit 110-$N_1$ of the node apparatus $N_1$ by the process above.

In step S1121, the data frame processing unit 110 waits for notification of success/failure of the transmission in step S1114. Details of step S1121 are similar to step S825 in FIG. 22. When the data frame processing unit 110 receives notification of "transmission success" or "transmission failure" from the ACK processing unit 107 after the waiting in step S1121, the process moves to step S1122.

In step S1122, the data frame processing unit 110 determines whether or not the transmission in step S1114 was successful. If the transmission was successful, the process moves to step S1123, and if the transmission failed, the process moves to step S1124.

When the transmission was successful, the data frame processing unit 110 reduces the weighting corresponding to the combination of the GD and LD of the data frame transmitted in step S1114 in the weighting table 104 in step S1123.

That is, the data frame processing unit 110 updates the weighing corresponding to the LD of the transmitted data frame using the expression (6) for example, in the weighting table 104-*i* corresponding to the value of the GD specified by the higher layer processing unit 111. The data frame processing unit 110 further sets the current time in the entry whose weighting has been updated. Then, the processes in FIG. 27-FIG. 28 are terminated.

On the other hand, if the transmission failed, in step S1124, the data frame processing unit 110 increases the weighting corresponding to the combination of the GD and LD of the data frame transmitted in step S1114 in the weighting table 104.

That is, the data frame processing unit 110 updates the weighting corresponding to the LD of the transmitted data frame using the expression (7) for example, in the weighting table 104-*i* corresponding to the value of the GD specified by the higher layer processing unit 111.

Meanwhile, the data frame processing unit 110 further stores, in step S1124, the value of the LD of the transmitted data frame as the "LD with which transmission failed" in a work area such as the DRAM 204 in FIG. 4 for example. In the same manner as in step S828 in FIG. 22, a data structure such as a linear list and array may be used for the storage of "LD with which transmission failed".

Meanwhile, the data frame processing unit 110 further in step S1124 sets the current time as the last update time in the entry for which weighting was updated in the weighting table 104-*i*. Then, the process moves to step S1125.

In step S1125, the data frame processing unit 110 searches for another node apparatus that may be selected as the LD and have not been tried as the LD. Specifically, the data frame processing unit 110 obtains the value of the LD associated with the smallest weighting among the LDs other than LDs with which transmission failed, in the weighting table 104-*i* corresponding to the value of the GD specified by the higher layer apparatus 111. Here, LDs with which transmission failed are stored in a work area such as the DRAM 204 in FIG. 4 for example in the form of the linear list and array in step S1124.

That is, the data frame processing 110 obtains, in the weighting table 104-*i*, among the values of the LDs that were not obtained previously in step S1110 or S1125, the one associated with the smallest weighting. The data frame processing unit 110 stores the value of the obtained LD and the value of the corresponding weighting in a storage area such as the DRAM 204 in FIG. 4. Then, the process returns to step S1111.

By the way, FIG. 29 is a flowchart of a process that the node apparatus 100 that may also become the GS performs instead of the process in FIG. 23 as apart of the data frame reception process.

When the node apparatus 100 is the type that may also become the GS, steps S801-S829 in the data frame reception process are in the same manner as the case in which the node apparatus 100 is dedicated for relaying, which are as illustrated in FIG. 20-FIG. 22. However, in the case in which the node apparatus 100 may also become the GS, when the data frame processing unit 110 determines in S818 in FIG. 22 that "either of the condition (F1) and (F2) is satisfied", the process moves to S830*a* in FIG. 29.

In step S830*a*, the data frame processing unit 110 determines whether or not the value of the GS of the received data frame is the own node ID or not. If the value of the GS of the received frame is different from the own node ID, the process moves to step S830*b*. If the value of the GS of the received frame is the own node ID, the process moves to step S830*c*.

In step S830*b*, the data frame processing unit 110 creates a new data frame as follows and outputs to the transmitting unit 102, and the transmitting unit 102 transmits the created data frame.

Specifically, the data frame processing unit 110 specifies the value of the OLS stored in step S808 or step S810 as the LD of the new data frame, and specifies the own node ID as the LS of the new data frame. In addition, the data frame processing unit 110 copies the value of each field of the GD, GS, FID, type and length and the payload from the received data frame to the new data frame. After the transmission of the data frame, the process moves to step S831*a*.

Meanwhile, in step S830*c*, the data frame processing unit 110 sends notification of "transmission failure" to the higher layer processing unit 111. Upon sending notification, the data frame processing unit 110 may take out the payload or apart of the payload from the received data frame for example, and may output to the payload or a part of the payload to the higher layer processing unit 111. Then, the higher layer processing unit 111 may recognize transmission of which data failed, based on the contents of the payload received from the data frame processing unit 110. After the notification of the transmission failure, the process moves to step S838*a*.

Meanwhile, in step S831*a*, the data frame processing unit 110 searches the FID managing table using the values of the FID and GS of the received data frame as a key. Meanwhile, steps S831*a*-S839*a* are steps similar to S831-S839 in FIG. 23 respectively.

In next step S832*a*, the data frame processing unit 110 determines whether not any entry was hit as a result of the search in S831*a*. If any entry was hit, the process moves to step S833*a*, and if no entry is hit, the process moves to S834*a*.

Meanwhile, in a case in which it is determined as "an entry was hit" in step S807, the entry found as a result of the search in step S831*a* is an entry that was found as a result of the search in step S806. Meanwhile, in a case in which it is determined as "no entry was hit" in step S807 and a new entry is created in step S823, the new entry created in step S823 is found as a result of the search in step S831*a*.

It is with both a combination of (M1) and (M2) that it is determined as "no entry was hit" in step S832*a*.

(M1) It is determined in step S807 that "no entry was hit".

(M2) Immediately after step S818 was executed for the first time, the process moved to step S830.

In step S833*a*, the data frame processing unit 110 updates the entry that was hit as a result of the search in step S831*a*. Specifically, in the hit entry, the data processing unit 110 copies the value of the OLS of the entry itself to the LD, and sets the current time as the last update time. Then, the process moves to step S836*a*.

Meanwhile, in step S834*a*, the data frame processing unit 110 adds a new entry to the FID managing table 105.

Then, in next step S835*a*, the data frame processing unit 110 sets values in the entry added in step S834*a*. Specifically, in the new entry, the data frame processing unit 110 copies the values of the received data frame to the FID and GS respectively, sets the current time as the last update time, and copies the value of the LS of the received data frame to the OLS and LD. Then, the process moves to step S836*a*.

In step S836*a*, the data processing unit 110 waits for notification as to transmission success/failure of the data frame transmitted in step S830*b*. Then, when the data frame processing unit 110 receives notification of "transmission success" or "transmission failure" from the ACK processing unit 107, the process moves to step S837*a*.

In step S837*a*, the data frame processing unit 110 determines whether or not the transmission of the data frame in step S830*b* was successful. When the transmission failed, the process moves to step S838*a*, and when the transmission was successful, the process moves to step S839*a*.

It is in the case of either (N1) or (N2) that step S838*a* is executed.

(N1) The data frame that the node apparatus 100 itself transmitted while being the GS returned to the node apparatus 100 by backtracking and received, and all the adjacent node apparatuses of the node apparatus 100 are (N1-1) or (N1-2).

(N1-1) Associated with the weighting of the largest value.

(N1-2) When the data frame specified as the LD is transmitted, the transmission fails.

(N2) The GS of the received data frame is another node apparatus other than the node apparatus 100, and all the adjacent node apparatuses other than the OLS are (N2-1) or (N2-2), and transmission of the data frame failed.

(N2-1) Associated with the weighting of the largest value.

(N2-2) When the data frame specified as the LD is transmitted, the transmission fails.

In this case, the data frame processing unit 110 discards the received data frame in step S838*a*. That is, the data frame processing unit 110 deletes the entry found in step S801 from the buffer unit 109. Then, the data frame reception process is terminated.

Meanwhile, the step S839*a* is performed when, regarding a data frame whose GS is another node apparatus other than the node apparatus 100, the transmission of the data frame from the node apparatus 100 to the OLS of the node apparatus 100 is successful. In step S839*a*, the data frame processing unit 110 reduces the weighting corresponding to the combination of the GD and LD of the data frame transmitted in step S830*b* in the weighting table 104. In other words, the data frame processing unit 110 updates the weighting corresponding to the LD of the transmitted data frame (that is, the OLD stored in step S808 or S810) in the weighing table 104-*i* corresponding to the GD of the received data frame.

For example, in the same manner as steps S829 and S839, the data frame processing unit 110 may update the weighting using the expression (6). The data frame processing unit 110 further sets the current time as the last update time in the entry for which weighting has been updated. Then, the data frame reception process is terminated.

Next, based on the detail description above, the example in FIG. 6 is described again.

FIG. 30 is a diagram describing path selection in FIG. 6 in the format of a search tree representing a search space for searching the path. In the field of artificial intelligence, a search space is often represented in the format of a search tree. FIG. 30 is a diagram representing the search space as a search tree 400 from the viewpoint of path search performed dynamically in a network. Meanwhile, the search tree 400 is neither a data structure created in a node apparatus nor the network topology itself.

A label of the node ID of the node apparatus in the network 1 is attached to each search node included in the search tree 40. Meanwhile, in FIG. 30, each search node is represented in the three kinds of figures, namely a circle, square and hexagon, and the difference between the meaning of the circle, square and hexagon is described later.

Meanwhile, in the example in FIG. 6, the GS and GD of the data frame are the node apparatuses $N_1$ and $N_7$ respectively, so the route node of the search tree 400 is a search node 401 to which the label $N_1$ is attached. Then, the goal of the path search is to find a search node 409 to which the label $N_7$ is attached in the search tree 400.

Here, if node apparatuses $N_i$ and $N_j$ are adjacent in the network 1 of FIG. 6, ($1 \le i$, $j \le 7$), the adjacent node apparatus Nj is a potential candidate of the LD for the node apparatus $N_i$, and the adjacent node apparatus $N_i$ also is a potential candidate of the LD for the node apparatus $N_j$. Therefore, in the search tree 400, the search node to which the label $N_i$ is attached has a search node to which the label $N_j$ is attached as a child node.

Therefore, in the search tree 400, the first search node to which the label $N_i$ is attached has the second search node the label $N_j$ is attached as a child node, and the second search node has the third search node to which the label $N_i$ is attached as a children node. Since the same applies thereafter, the search tree 400 potentially has infinite search nodes.

In the search of the search tree that potentially has an infinite size, depth first search is performed with pruning of the search space being performed. The "pruning of the search space" is a technique to disregard one or more branches of the search tree to increase the search efficiency, and in the study field of search algorithms, various pruning methods have been proposed according to the applied fields.

There are two types for pruning as a result of autonomously-distributed coordination of the node apparatus 100 in the first embodiment. Hereinafter, for convenience, reference is made as "the first type pruning" and "the second type pruning".

The first type pruning is pruning of children nodes having the same label as the parent node. For example, in the example of the first-third search nodes, the label of the third search node being a child node of the second search node is equal to the label of the first search node being the parent node of the second search node. Therefore, in the search from the second search node and beyond, the third search node is pruned. The search node pruned in the first type pruning is presented with the square in FIG. 30.

The second type pruning is pruning of children nodes having the same label as an ancestor node. The second type pruning is enabled by the FID managing table 105 in the first embodiment. The search node that is pruned in the second type pruning is presented with the hexagon in FIG. 30.

Meanwhile, in FIG. 30, the circle represents the search node that is searched without being pruned.

Hereinafter, the relationship between the example in FIG. 6 and the search tree is described specifically.

As described above, the label of the search node 401 being the route node of the search tree 400 is the node ID $N_1$ of the node apparatus $N_1$ being the GS of the data frame. Then, in the network 1, only the node apparatus $N_2$ is adjacent to the node apparatus $N_1$, so the search node 401 has only one search node 402 as a child node, and the label of the search node 402 is $N_2$.

Meanwhile, since only the node apparatus $N_2$ is adjacent to the node apparatus $N_2$, the data frame is transmitted from the node apparatus $N_1$ to the node apparatus $N_2$ as in step S101 in FIG. 6. The transmission in step S101 corresponds to the progress of the search from the search node 401 to the search node 402, in FIG. 30.

Then, in the network 1, the node apparatuses $N_1$ and $N_3$ and $N_6$ are adjacent to the node apparatus $N_2$. Therefore, the search node 402 has three search nodes 403 and 404 and 405 as children nodes, and the label of the search nodes 403 and 404 and 405 are $N_3$ and $N_6$ and $N_1$, respectively.

The node apparatus $N_2$ selecting the node apparatus $N_3$ first and the LD and transmitting the data frame to the node apparatus $N_3$ in step S102 in FIG. 6 corresponds to the progress of the search from the search node 402 to the search node 403 in FIG. 30.

Then, in the network 1, the node apparatuses $N_2$ and $N_4$ and $N_5$ are adjacent to the node apparatus $N_3$. Therefore, the search node 403 has three search nodes 406 and 407 and 408 as children nodes, and the label of the search nodes 406 and 407 and 408 are $N_4$ and $N_2$ and $N_5$, respectively.

The node apparatus $N_3$ selecting the node apparatus $N_4$ first as the LD and transmitting the data frame to the node apparatus $N_4$ in step S103 in FIG. 6 corresponds to the progress of the search from the search node 403 to the search node 406 in FIG. 30.

Then, in the network 1, the node apparatuses $N_7$ and $N_5$ and $N_3$ are adjacent to the node apparatus $N_4$. Therefore, the search node 406 has three search nodes 411, 412 and 413 as children nodes, and the label of the search nodes 411, 412 and 413 are $N_7$ and $N_5$ and $N_3$, respectively.

The node apparatus $N_4$ selecting the node apparatus $N_7$ first as the LD and transmitting the data frame to the node apparatus $N_7$ in step S103 in FIG. 6 corresponds to the progress of the search from the search node 406 to the search node 411 in FIG. 30.

However, as illustrated in FIG. 6, in step S104, the transmission fails due to the failure in the link between the node apparatuses $N_4$ and $N_7$. That is, in the search tree 400, the search fails at the search node 411 and backtracking occurs. Meanwhile, the backtracking on the search tree 400 from the search node 411 to the search node 406 is, on the actual network 1, a phenomenon in which the node apparatus $N_4$ experiences timeout as no ACK frame is received.

In FIG. 6, after the transmission failure in step S104, the node apparatus $N_4$ selects the node apparatus $N_5$ next as the LD and transmits the data frame to the node apparatus $N_5$ in step S105. The transmission in step S105 corresponds to the progress of the search from the search node 406 to the search node 412 in FIG. 30.

Then, since the node apparatuses $N_3$ and $N_4$ are adjacent to the node apparatus $N_5$ in the network 1, the search node 412 has two search nodes 414 and 415 as children nodes, and the label of the search nodes 414 and 415 are $N_3$ and $N_4$, respectively.

The node apparatus $N_5$ selecting the node apparatus $N_3$ first as the LD and transmitting the data frame to the node apparatus $N_3$ in step S106 in FIG. 6 corresponds to the progress of the search from the search node 412 to the search node 414 in FIG. 30.

Meanwhile, in the search tree 400, the search node 414 has the same label as the search node 403 being the ancestor node. However, since two search nodes 406 and 412 are sandwiched between the search nodes 403 and 414, the search node 414 is not pruned at this point of time.

Then, in the network 1, the node apparatuses $N_2$ and $N_4$ and $N_5$ are adjacent to the node apparatus $N_3$. Therefore, the search node 414 has three search nodes 416, 417 and 418 as children nodes, and the label of the search nodes 416, 417 and 418 are $N_2$ and $N_4$ and $N_5$, respectively.

By the way, at the time when the data frame is received in step S106, the entry $E_3$ already exists in the FID managing table 105-$N_3$ of the node apparatus $N_3$. This means (O1) and (O2) below.

(O1) In the search tree 400, the search node 403 having the same label $N_3$ as the search node 414 itself, as the ancestor node viewed from the search node 414.

(O2) Therefore, the search nodes 416, 417 and 418 being children node of the search node 414 are the target of pruning.

Then, the pruning is realized as follows.

The search node 406 having the label $N_4$ existing as the ancestor node of the search node 414 having the label $N_3$ corresponds to the value of the LD being $N_4$ at the time of step S106 in the entry E3 in the FID managing table 105-$N_3$ of the node apparatus $N_3$ (see FIG. 12). Then, when the data frame is received in step S106, the node apparatus $N_3$ sets the weighting corresponding to the node apparatus $N_4$ selected as the LD in step S103 to the maximum value as illustrated in FIG. 11.

In other words, triggered by the reception of the data frame in step S106, the node apparatus $N_3$ excludes the node apparatus $N_4$ from the potential candidate of the LD. Then, exclusion from the potential candidate of the LD is the pruning in the search tree 400, so the search node 417 having the label $N_4$ is pruned.

The search node 402 the label $N_2$ existing as the ancestor node of the search node 414 corresponds to the value of the OLS being $N_2$ in the entry E3 in the FID managing table 105-$N_3$ of the node apparatus $N_3$ (see FIG. 12).

Then, at the point of time when the data frame is received in step S106, since the node apparatus $N_5$ that may be selected potentially as the LD exists other than the OLS, the node apparatus $N_3$ does not select the node apparatus $N_2$ which is the OLS as the LD. That is, the search node 416 having the label $N_2$ is pruned.

Meanwhile, triggered by the reception in step S106, the node apparatus $N_3$ selects the node apparatus $N_5$ as the LD. Here, focusing on the fact that the search node 418 being the child node of the search node 414 in the search tree 400 it has the same label $N_5$ as the search node 412 being the parent node of the search node 414, the search node 418 is a target of the first type pruning.

In fact, the transmission of the data frame from the node apparatus $N_3$ to the node apparatus $N_5$ may be represented as backtracking from the search node 414 to the search node 412 being the parent node in the search tree 400, as illustrated in FIG. 30. In other words, the search node 418 being the child node of the search node 414 and having the same label $N_5$ as the search node 412 being the parent node is pruned.

In next step S108, as illustrated in FIG. 6, the node apparatus $N_5$ is having the data frame backtracked to the node apparatus $N_4$ being the OLS. The operation in step S108 is represented, in FIG. 30, as backtracking from the search node 415 having the label $N_5$ to the search node 406 having the label $N_4$ in the search tree 400. In other words, the search node 415 being the child node of the search node 412 and having the same label $N_4$ as the search node 406 being the parent node of the search node 412 is pruned.

Then, also in next step S109, as illustrated in FIG. 6, the node apparatus $N_4$ is having the data frame backtracked to the node apparatus $N_3$ being the OLS. The operation in step S109 is also represented, in FIG. 30, as backtracking from the search node 406 having the label $N_4$ to the search node 403 having the label $N_3$ in the search tree 400. In other words, the search node 413 being the child node of the search node 406 and having the same label $N_3$ as the search node 403 being the parent node of the search node 406 is pruned.

At this stage, among the children nodes of the search node 403 having the label $N_3$, the ones that have not been searched are the search node 407 having the label $N_2$ and the node 408 having the label $N_5$.

However, the node apparatus $N_3$ already transmitted the data frame to the node apparatus $N_5$ in step S107, and triggered by the reception of the data frame in step S109, as illustrated in FIG. 11, the weighting corresponding to the node apparatus N5 has been set to the maximum value. Therefore, the node apparatus $N_5$ is excluded from the candidate of the LD, and the search node 408 having the label $N_5$ is pruned.

Eventually, in step S110, as illustrated in FIG. 6, the node apparatus $N_3$ is having the data frame backtracked tot the node apparatus $N_2$ being the OLS. The operation in step S110 is represented, in FIG. 30, as backtracking from the search node 403 having the label $N_3$ to the search node 402 having the label $N_2$ in the search tree 400. In other words, the search node 407 being the child node of the search node 403 and having the same label $N_2$ as the search node 402 being the parent node of the search node 403 is pruned.

Next, in step S111, the node apparatus $N_2$ newly selects the node apparatus $N_6$ as the LD, and transmits the data frame to the node apparatus $N_6$. The transmission in step S111 corresponds to the progress of the search from the search node 402 having the label N2 to the search node 404 having the label $N_6$.

Then, in the network 1, the node apparatuses $N_7$ and $N_2$ are adjacent to the node apparatus $N_6$. Therefore, the search node 404 has two search nodes 409 and 410 as children nodes, and the label of the search nodes 409 and 410 are $N_7$ and $N_2$, respectively.

In FIG. 6, the node apparatus $N_6$ selects not the node apparatus N2 being the OLS but the node apparatus $N_7$ first as the LD and transmits the data frame in step S112. That is, the search node 410 having the label $N_2$ is pruned. Then, by the transmission in step S112, the search progresses to the search node 409 having the node ID $N_7$ of the node apparatus $N_7$ being the GS, and the search is terminated. Meanwhile, since the search is terminated at step S112, the search node 405 being the child node of the search node 402 is not searched, but the search node 405 is also a target of the first type pruning, and is presented with a square in FIG. 30 for convenience.

Meanwhile, in the search node 400, the labels of each search node on the path from the search node 401 being the route node to the search node 409 being the leaf node found by the search as described are lined up in order and expressed in a tuple as <$N_1$, $N_2$, $N_6$, $N_7$>. Then, the tuple is the path <$N_1$, $N_2$, $N_6$, $N_7$> learned in the network 1 in FIG. 6.

According to the first embodiment, the path is searched dynamically while the data frame is forwarded, and the search order represented in the search tree 400 is the depth first search order as in FIG. 30. The depth first search, not the width first search, being carried out is also understood from that the data frame is not multicast but always unicast.

Then, as is apparent from the description above, if the aging time $G_f$ of the entry of the FID managing table 105 is set appropriately, until the path from the GS to GD in the network 1 is found, potentially available paths are all searched by the depth first search. That is, unless the aging time $G_f$ is too short, as long as the path from the GS to GD exists, the path is found without fail. Meanwhile, the "worst case" mentioned regarding FIG. 19 is the case in which the search node having the node ID of the node apparatus being the GD as the label is the last to be found in traverse in depth first search order of the search tree 400.

Next, the first embodiment is described from yet another viewpoint.

FIG. 31 is a timing chart illustrating recognition of adjacent apparatuses by transmission/reception of the HELLO frame and path selection in FIG. 6.

In the network 1 in FIG. 1, each node apparatus $N_1$-$N_7$ independently performs the HELLO frame transmission process in FIG. 16. While which node apparatus first transmits the HELLO frame is random, in the example in FIG. 31, the node apparatus $N_2$ performs step S403 in FIG. 16 in step S1201 and transmits a HELLO frame first. Then, the HELLO frame is received respectively in the node apparatuses $N_1$, $N_3$ and $N_6$ adjacent to the node apparatus $N_2$. Then, the node apparatuses $N_1$, $N_3$ and $N_6$ each call and execute the HELLO frame reception process in FIG. 15 in step S203 in FIG. 14, and recognize the node apparatus $N_2$ as an adjacent node apparatus.

Meanwhile, in the example in FIG. 31, next, in step S1202, the node apparatus $N_4$ executes step S403 in FIG. 16, and transmits a HELLO frame. Then, the HELLO frame is received respectively in the node apparatuses $N_3$, $N_5$ and $N_7$ adjacent to the node apparatus $N_4$. Then, the node apparatuses $N_3$, $N_5$ and $N_7$ each call and execute the HELLO frame reception process in FIG. 15 in step S203 in FIG. 14, and recognize the node apparatus $N_4$ as an adjacent node apparatus.

Meanwhile, in step S1203, the node apparatus $N_3$ executes step S403 in FIG. 16, and transmits a HELLO frame 312. Then, the HELLO frame 312 is received respectively in the node apparatuses $N_2$, $N_4$ and $N_5$ adjacent to the node apparatus $N_3$. Then, the node apparatuses $N_2$, $N_4$ and $N_5$ each call and execute the HELLO frame reception process in FIG. 15 in step S203 in FIG. 14, and recognize the node apparatus $N_3$ as an adjacent node apparatus.

Meanwhile, in step S1204, the node apparatus $N_7$ executes step S403 in FIG. 16, and transmits a HELLO frame. Meanwhile, it is assumed that at the time of step S1204, any failure has not occurred yet in the link between the node apparatuses $N_4$ and $N_7$. Therefore, the HELLO frame is received respectively in the node apparatuses $N_4$ and $N_5$ adjacent to the node apparatus $N_3$. Then, the node apparatuses $N_4$ and $N_5$ each call and execute the HELLO frame reception process in FIG. 15 in step S203 in FIG. 14, and recognize the node apparatus $N_7$ as an adjacent node apparatus.

Meanwhile, in step S1205, the node apparatus $N_1$ executes step S403 in FIG. 16, and transmits a HELLO frame. Then, the HELLO frame is received respectively in the node apparatus $N_1$ adjacent to the node apparatus $N_2$. Then, the node apparatus $N_1$ calls and execute the HELLO frame reception process in FIG. 15 in step S203 in FIG. 14, and recognizes the node apparatus $N_1$ as an adjacent node apparatus.

Further, in step S1206, the node apparatus $N_6$ executes step S403 in FIG. 16, and transmits a HELLO frame. Then, the HELLO frame is received respectively in the node apparatuses $N_2$ and $N_7$ adjacent to the node apparatus $N_6$. Then, the node apparatuses $N_2$ and $N_7$ each call and execute the HELLO frame reception process in FIG. 15 in step S203 in FIG. 14, and recognize the node apparatus $N_6$ as an adjacent node apparatus.

Then, in step S1207, the node apparatus $N_5$ executes step S403 in FIG. 16, and transmits a HELLO frame. Then, the HELLO frame is received respectively in the node apparatuses $N_3$ and $N_4$ adjacent to the node apparatus $N_5$. Then, the node apparatuses $N_3$ and $N_4$ each call and execute the HELLO frame reception process in FIG. 15 in step S203 in FIG. 14, and recognize the node apparatus $N_5$ as an adjacent node apparatus.

By steps S1201-S1207 above, the node apparatuses $N_1$-$N_7$ illustrated in FIG. 1 and FIG. 6 each recognize adjacent node apparatuses, and update the adjacent node managing tables 103-N1 trough 103-$N_7$. In addition, as illustrated in FIG. 15, the node apparatuses $N_1$-$N_7$ may update, in some cases, the weighting tables 104-$N_1$ through 104-$N_7$ triggered by the reception of the HELLO frame.

After that, a failure occurs in the link between the node apparatuses $N_4$ and $N_7$ in step S1208.

Meanwhile, regardless of the occurrence of the failure, the node apparatus $N_1$ transmits a data frame that specifies the node apparatus $N_7$ as the GD while specifying the node apparatus $N_2$ as the LD, in step S101. That is, in step S101, the node apparatus $N_1$ performs processes in FIGS. 27-28.

Then, the node apparatus $N_2$ calls and executes processes in FIGS. 20-23 from step S205 in FIG. 14. The node apparatus $N_2$ transmitting the ACK frame in step S803 in FIG. 20 is expressed as step S101*a* in FIG. 31.

Meanwhile, the node apparatus $N_1$ is waiting for reception of the ACK frame in step S1121 in FIG. 28. Then, upon receiving the ACK frame transmitted in step S101*a*, the node apparatus $N_1$ calls and executes the process in FIG. 25 from step S206 in FIG. 14, and as a result, the waiting in step S1121 is terminated, and the process in FIG. 28 is terminated with execution of step S1122 and S1123.

Meanwhile, the node apparatus $N_2$ that transmitted the ACK frame in step S803 in FIG. 20 as illustrated in step S1101*a* continues the processes after step S804, and in step S819 in FIG. 22, transmits the data frame while specifying the node apparatus $N_3$ as the LD. The transmission in step S819 corresponds to step S102 in FIG. 31. Meanwhile, FIG. 7 illustrates the data frame 303 transmitted in step S102.

Then, the node apparatus $N_3$ that received the data frame calls and executes the processes in FIGS. 20-23 from step S205 in FIG. 14. The node apparatus $N_3$ transmitting the ACK frame in step S803 in FIG. 20 is presented as step S102*a* in FIG. 31. Meanwhile, FIG. 7 illustrates the ACK frame 322 transmitted in step S102.

Meanwhile, the node apparatus $N_2$ is waiting for reception of the ACK frame in step S825 in FIG. 22. Then, upon receiving the ACK frame transmitted in step S102*a*, the node apparatus $N_2$ calls and executes the process in FIG. 25 from step S206 in FIG. 14, and as a result, the waiting in step S825 is terminated, and the process in FIG. 22 is terminated with execution of step S826 and S827.

Meanwhile, the node apparatus $N_3$ that transmitted the ACK frame in step S803 in FIG. 20 as illustrated in step S102*a* continues the processes after step S804, and in step S819 in FIG. 22, transmits the data frame while specifying the node apparatus $N_4$ as the LD. The transmission in step S819 corresponds to step S103 in FIG. 31. Meanwhile, FIG. 7 illustrates the data frame 304 transmitted in step S103.

Then, the node apparatus $N_4$ that received the data frame calls and executes the processes in FIGS. 20-23 from step S205 in FIG. 14. The node apparatus $N_4$ transmitting the ACK frame in step S803 in FIG. 20 is presented as step S103*a* in FIG. 31.

Meanwhile, the node apparatus $N_3$ is waiting for reception of the ACK frame in step S825 in FIG. 22. Then, upon receiving the ACK frame transmitted in step S103*a*, the node apparatus $N_3$ calls and executes the process in FIG. 25 from step S206 in FIG. 14, and as a result, the waiting in step S825 is terminated, and the process in FIG. 22 is terminated with execution of step S826 and S827.

Meanwhile, the node apparatus $N_4$ that transmitted the ACK frame in step S803 in FIG. 20 as illustrated in step S103*a* continues the processes after step S804, and in step S819 in FIG. 22, transmits the data frame while specifying the node apparatus $N_7$ as the LD. The transmission in step S819 corresponds to step S104 in FIG. 31.

However, a failure occurs in the link between the node apparatuses $N_4$ and $N_7$ in step S1208, and the data frame does not reach the node apparatus $N_7$. For this reason, the arrow in step S104 in FIG. 31 becomes a broken line from the middle.

The node apparatus $N_4$ is waiting for reception of the ACK frame in step S825 in FIG. 22. However, since no ACK frame is received from the node apparatus $N_7$, the node apparatus $N_4$ recognizes that the transmission of the data frame to the node apparatus $N_7$ failed, in step S1003 of the process in FIG. 26 performed regularly.

As a result, the node apparatus $N_4$ terminates the waiting in step S825, and performs the processes in step S826, S828, S829, S818 in order. Then, the node apparatus $N_4$ transmits the data frame while specifying the node apparatus $N_5$ as the LD in following step S819. The transmission in step S819 corresponds to step S105 in FIG. 31.

Then, the node apparatus $N_5$ that received the data frame calls and executes the processes in FIGS. 20-23 from step S205 in FIG. 14. The node apparatus $N_5$ transmitting the ACK frame in step S803 in FIG. 20 is presented as step S105*a* in FIG. 31.

Meanwhile, the node apparatus $N_4$ is waiting for reception of the ACK frame in step S825 in FIG. 22. Then, upon receiving the ACK frame transmitted in step S105*a*, the node apparatus $N_4$ calls and executes the process in FIG. 25 from step S206 in FIG. 14, and as a result, the waiting in step S825 is terminated, and the process in FIG. 22 is terminated with execution of step S826 and S827.

Meanwhile, the node apparatus $N_5$ that transmitted the ACK frame in step S803 in FIG. 20 as illustrated in step S105*a* continues the processes after step S804, and in step S819 in FIG. 22, transmits the data frame while specifying the node apparatus $N_3$ as the LD. The transmission in step S819 corresponds to step S106 in FIG. 31.

Then, the node apparatus $N_3$ that received the data frame calls and executes the processes in FIGS. 20-23 from step S205 in FIG. 14. The node apparatus $N_3$ transmitting the ACK frame in step S803 in FIG. 20 is presented as step S106*a* in FIG. 31.

Meanwhile, the node apparatus $N_5$ is waiting for reception of the ACK frame in step S825 in FIG. 22. Then, upon receiving the ACK frame transmitted in step S106*a*, the node apparatus $N_5$ calls and executes the process in FIG. 25 from step S206 in FIG. 14, and as a result, the waiting in step S825 is terminated, and the process in FIG. 22 is terminated with execution of step S826 and S827.

Meanwhile, the node apparatus $N_3$ that transmitted the ACK frame in step S803 in FIG. 20 as illustrated in step S106*a* continues the processes after step S804, and in step S819 in FIG. 22, transmits the data frame while specifying the node apparatus $N_5$ as the LD. The transmission in step S819 corresponds to step S107 in FIG. 31.

Then, the node apparatus $N_5$ that received the data frame calls and executes the processes in FIGS. 20-23 from step S205 in FIG. 14. The node apparatus $N_5$ transmitting the ACK frame in step S803 in FIG. 20 is presented as step S107*a* in FIG. 31.

Meanwhile, the node apparatus $N_3$ is waiting for reception of the ACK frame in step S825 in FIG. 22. Then, upon receiving the ACK frame transmitted in step S107*a*, the node apparatus $N_3$ calls and executes the process in FIG. 25 from step S206 in FIG. 14, and as a result, the waiting in step S825 is terminated, and the process in FIG. 22 is terminated with execution of step S826 and S827.

Meanwhile, the node apparatus $N_5$ that transmitted the ACK frame in step S803 in FIG. 20 as illustrated in step S107*a* continues the processes after step S804. Specifically, the process proceeds from step S818 in FIG. 22 to step S830 in FIG. 23, and in step S830, the node apparatus $N_5$ transmits the data frame while specifying the node apparatus $N_4$ which is the OLS as the LD. The transmission in step S830 corresponds to step S108 in FIG. 31.

Then, the node apparatus $N_4$ that received the data frame calls and executes the processes in FIGS. 20-23 from step S205 in FIG. 14. The node apparatus $N_4$ transmitting the ACK frame in step S803 in FIG. 20 is presented as step S108*a* in FIG. 31.

Meanwhile, the node apparatus $N_5$ is waiting for reception of the ACK frame in step S836 in FIG. 23. Then, upon receiving the ACK frame transmitted in step S108*a*, the node apparatus $N_5$ calls and executes the process in FIG. 25 from step S206 in FIG. 14, and as a result, the waiting in step S836 is terminated, and the process in FIG. 23 is terminated with execution of step S837 and S839.

Meanwhile, the node apparatus $N_4$ that transmitted the ACK frame in step S803 in FIG. 20 as illustrated in step S108*a* continues the processes after step S804. Specifically, the process proceeds from step S818 in FIG. 22 to step S830 in FIG. 23, and the node apparatus $N_4$ transmits the data frame in step S830 while specifying the node apparatus $N_3$ which is the OLS as the LD. The transmission in step S830 corresponds to step S109 in FIG. 31.

Then, the node apparatus $N_3$ that received the data frame calls and executes the processes in FIGS. 20-23 from step S205 in FIG. 14. The node apparatus $N_3$ transmitting the ACK frame in step S803 in FIG. 20 is presented as step S109*a* in FIG. 31.

Meanwhile, the node apparatus $N_4$ is waiting for reception of the ACK frame in step S836 in FIG. 23. Then, upon receiving the ACK frame transmitted in step S109*a*, the node apparatus $N_4$ calls and executes the process in FIG. 25 from step S206 in FIG. 14, and as a result, the waiting in step S836 is terminated, and the process in FIG. 23 is terminated with execution of step S837 and S839.

Meanwhile, the node apparatus $N_3$ that transmitted the ACK frame in step S803 in FIG. 20 as illustrated in step S109*a* continues the processes after step S804. Specifically, the process proceeds from step S818 in FIG. 22 to step S830 in FIG. 23, and the node apparatus $N_3$ transmits the data frame in step S830 while specifying the node apparatus $N_2$ which is the OLS as the LD. The transmission in step S830 corresponds to step S110 in FIG. 31.

Then, the node apparatus $N_2$ that received the data frame calls and executes the processes in FIGS. 20-23 from step S205 in FIG. 14. The node apparatus $N_2$ transmitting the ACK frame in step S803 in FIG. 20 is presented as step S110*a* in FIG. 31.

Meanwhile, the node apparatus $N_3$ is waiting for reception of the ACK frame in step S836 in FIG. 23. Then, upon receiving the ACK frame transmitted in step S110*a*, the node apparatus $N_3$ calls and executes the process in FIG. 25 from step S206 in FIG. 14, and as a result, the waiting in step S836 is terminated, and the process in FIG. 23 is terminated with execution of step S837 and S839.

Meanwhile, the node apparatus $N_2$ that transmitted the ACK frame in step S803 in FIG. 20 as illustrated in step S110*a* continues the processes after step S804 and transmits the data frame in step S819 in FIG. 22 while specifying the node apparatus $N_6$ as the LD. The transmission in step S819 corresponds to step S111 in FIG. 31.

Then, the node apparatus $N_6$ that received the data frame calls and executes the processes in FIGS. 20-23 from step S205 in FIG. 14. The node apparatus $N_6$ transmitting the ACK frame in step S803 in FIG. 20 is presented as step S111*a* in FIG. 31.

Meanwhile, the node apparatus $N_2$ is waiting for reception of the ACK frame in step S825 in FIG. 22. Then, upon receiving the ACK frame transmitted in step S111*a*, the node apparatus $N_2$ calls and executes the process in FIG. 25 from step S206 in FIG. 14, and as a result, the waiting in step S825 is terminated, and the process in FIG. 22 is terminated with execution of step S826 and S827.

Meanwhile, the node apparatus $N_6$ that transmitted the ACK frame in step S803 in FIG. 20 as illustrated in step S111*a* continues the processes after step S804 and transmits the data frame in step S819 in FIG. 22 while specifying the node apparatus $N_7$ as the LD. The transmission in step S819 corresponds to step S112 in FIG. 31.

Then, the node apparatus $N_7$ that received the data frame calls and executes the processes in FIGS. 20-23 from step S205 in FIG. 14. The node apparatus $N_{67}$ transmitting the ACK frame in step S803 in FIG. 20 is presented as step S112*a* in FIG. 31.

By the series of processes described above, in the network 1 as a whole, even if a failure occurs in step S1208, as a result of autonomously-distributed coordination of the node apparatuses $N_1$-$N_7$, the path <$N_1$, $N_2$, $N_6$, $N_7$> is selected dynamically and learned. That is, by the series of process described above, the weighting tables 104-$N_1$ through 104-$N_6$ are updated in the node apparatuses $N_1$-$N_6$.

Therefore, after step S112*a*, as a result of the learning, a data frame that specifies the node apparatus $N_7$ as the GD is forwarded with a good efficiency from the beginning, instead of being forwarded with backtracking in the network 1 like trial and error as in FIG. 6. Several specific examples are provided below.

(P1) When the node apparatus $N_1$ transmits a data frame that specifies the node apparatus $N_7$ as the GD to the node apparatus $N_2$ while being the GS, the node apparatus $N_2$ selects the node apparatus $N_6$ as the LD from the beginning, based on the learned weighting table 104-$N_2$. Then, the data frame is transmitted from the node apparatus $N_6$ to the node apparatus $N_7$ being the GD.

(P2) In the same manner, when the node apparatus $N_2$ transmits the data frame that specifies the node apparatus $N_7$ as the GD, the node apparatus $N_2$ selects the node apparatus $N_6$ as the LD from the beginning, based on the learned weighting table 104-$N_2$. Then, the data frame is transmitted from the node apparatus $N_6$ to the node apparatus $N_7$ being the GD.

(P3) When the node apparatus $N_5$ transmits the data frame that specifies the node apparatus $N_7$ as the GD, the node apparatus $N_5$ selects, not the node apparatus $N_3$ with which backtracking occurred but the node apparatus $N_4$ first as the LD, based on the learned weighting table 104-$N_5$. After that, in the same manner, the node apparatus $N_4$ selects the node apparatus $N_3$ as the LD, the node apparatus $N_3$ selects the node apparatus $N_2$ as the LD, the node apparatus $N_2$ selects the node apparatus $N_6$, and the node apparatus $N_6$ selects the node apparatus $N_7$ as the LD.

(P4) When the node apparatus $N_3$ transmits the data frame that specifies the node apparatus $N_7$ as the GD, the node apparatus $N_3$ selects the node apparatus $N_2$ first as the LD, based on the learned weighting table 104-$N_3$. Therefore, the data frame is forwarded along the path <$N_3$, $N_2$, $N_6$, $N_7$> from the beginning with a good efficiency.

As described above, according to the first embodiment, when the path is selected like trial and error and dynamically in the network 1 by backtracking as in FIG. 6, in each node that was passed through in the course of the backtracking, the appropriate path is learned in the form of weighting in the weighting table 104. Therefore, when a data frame with the same node apparatus $N_7$ being specified as the GD is transmitted after that, path selection is made more efficient according to the learning result as in the example of (P1)-(P4).

Next, the second embodiment applied to a wireless network is explained. The first embodiment was described with an example of the case in which the receiving unit 101 and the transmitting unit 102 in FIG. 3 are realized by the wireless module in FIG. 4, and the network 1 in FIG. 1 is a wireless network. However, in the second embodiment, the networks 1 and 2 in FIG. 1 and FIG. 2 may be for example a wired ad hoc network connected with wireless links. Hereinafter, a specific example is described with reference to FIG. 32.

Figure 32:
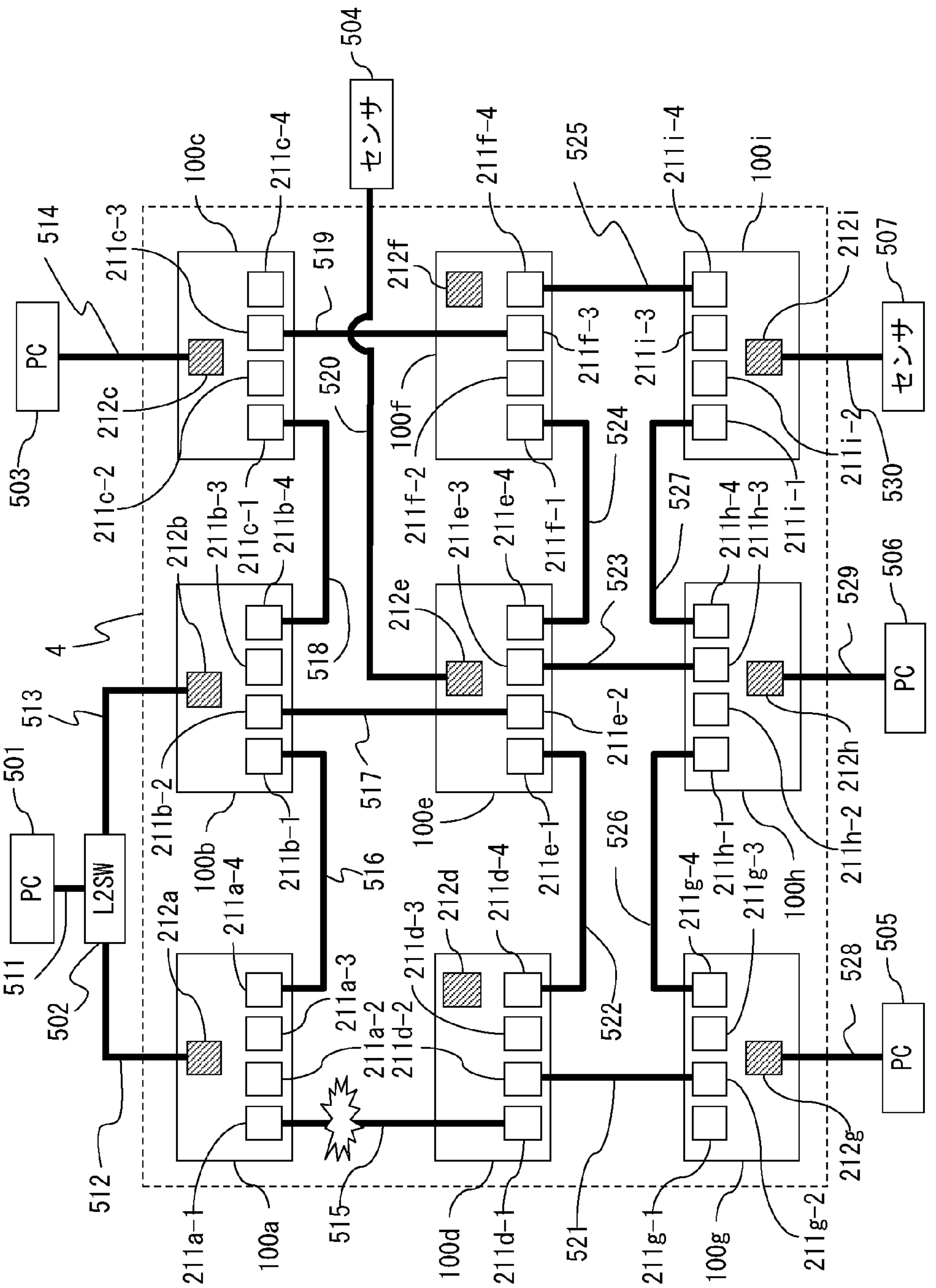
FIG. 32 is a diagram illustrating an example of a wired network to which the second embodiment is applied.

FIG. 32 is a diagram illustrating an example of a wired network to which the second embodiment is applied. A network 4 in FIG. 32 includes a plurality of node apparatuses 100*a*-100*i*, and is an example of a wired ad hoc network. First, the outline of the configuration of the node apparatus 100*a* is described.

Meanwhile, the configuration of the node apparatuses 100*a*-100*i* is the same. The same components among each other are assigned with the same reference numerals except for the suffix such as "211*a*-1", "211*a*-2", "211*b*-1", and detail description may be omitted.

The node apparatuses 100*a*-100*i* has, instead of the receiving unit 101 and the transmitting unit 102 in FIG. 3 realized by the wireless module 206, a receiving unit and a transmitting unit that are not illustrated in the drawing realized by a physical port (hereinafter, simply referred to as a "port") and a PHY chip for wireless communication. In the example in FIG. 32, the node apparatus 100*a* has four ports 211*a* through 211*a*-4, but the number of ports is arbitrary according to the embodiment.

Meanwhile, the ports 211*a* through 211*a*-4 are ports for performing the communication of frames according to the second embodiment. That is, a similar data frame as in the first embodiment illustrated in FIG. 7 is transmitted/received through the ports 211*a* through 211*a*-4. In other words, the ports 211*a* through 211*a*-4 are ports for wired connection of the node apparatus 100*a* with adjacent node apparatuses.

Hereinafter, for convenience of description, it is assumed that one PHY chip is provided corresponding to one port, but physically, it is possible for one PHY chip to perform the output process for four ports.

Meanwhile, in the second embodiment, the ACK frame and the HELLO frame are not used. Therefore, the node apparatus 100*a* does not include the ACK processing unit 107 and the HELLO frame generating unit 112 in FIG. 3. In addition, while details are to be described later, in the second embodiment, a part of the operation of the frame branching processing unit 106 and the link managing unit 108 and the data frame processing unit 110 is different from the first embodiment. Then, an adjacent node managing table 103*a* illustrated in FIG. 33 is used instead of the adjacent node managing table 103 in the first embodiment illustrated in FIG. 9.

By the way, in the first embodiment, the case in which the node apparatus 100 has the PHY chip 202 in FIG. 4 for connection with an external network was illustrated. The node apparatus 100*a* in the second embodiment has a general purpose LAN port 212*a* for connection with an external network in the same manner.

The general purpose LAN port 212*a* is a physical port for wired connection that complies with the Ethernet standard for example, and is connected with the PHY chip that is not illustrated in the drawing. In FIG. 32, the general purpose ports 212*a*-212*i* are presented with diagonal lines to be distinguished from the ports 211*a*-1 through 211*i*-4. Meanwhile, while the general purpose LAN ports 212*a*-212*i* in this embodiment are wired LAN ports, a wireless LAN interface may be used depending on the embodiment.

Then, the respective node apparatus 100*a*-100*i* having the configuration as described above are connected in the network 4 by cables (for example, a metal line cable such as a copper cable, or an optical fiber cable) in a mesh-like pattern (in other words, in a checkerboard pattern) physically.

Of course, the physical connection topology in the network is arbitrary depending on the embodiment, and may not necessarily be the mesh-like pattern.

The physical topology in a mesh-like pattern illustrated in FIG. 32 is, specifically, realized by the cable wiring as (Q1)-(Q12) below.

(Q1) The node apparatuses 100*a* and 100*d* are connected by a link 515 between the ports 211*a*-1 and 211*d*-1.

(Q2) The node apparatuses 100*a* and 100*b* are connected by a link 516 between the ports 211*a*-4 and 211*b*-1.

(Q3) The node apparatuses 100*b* and 100*a* are connected by a link 517 between the ports 211*b*-2 and 211*e*-2.

(Q4) The node apparatuses 100*b* and 100*c* are connected by a link 518 between the ports 211*b*-4 and 211*c*-1.

(Q5) The node apparatuses 100*c* and 100*f* are connected by a link 519 between the ports 211*c*-3 and 211*f*-3.

(Q6) The node apparatuses 100*d* and 100*g* are connected by a link 521 between the ports 211*d*-2 and 211*g*-2.

(Q7) The node apparatuses 100*d* and 100*e* are connected by a link 522 between the ports 211*d*-4 and 211*e*-1.

(Q8) The node apparatuses 100*e* and 100*h* are connected by a link 523 between the ports 211*e*-3 and 211*h*-3.

(Q9) The node apparatuses 100*e* and 100*f* are connected by a link 524 between the ports 211*e*-4 and 211*f*-1.

(Q10) The node apparatuses 100*f* and 100*i* are connected by a link 525 between the ports 211*f*-4 and 211*i*-1.

(Q11) The node apparatuses 100*g* and 100*h* are connected by a link 526 between the ports 211*g*-4 and 211*h*-1.

(Q12) The node apparatuses 100*h* and 100*i* are connected by a link 527 between the ports 211*h*-4 and 211*i*-1.

Of course, according to the embodiment, a mesh topology equivalent to FIG. 32 may be realized by connecting a combination of ports other than the one illustrated in FIG. 32 by a cable.

By the way, in the example in FIG. 32, the network 4 is not an isolated network, and is connected to an external network such as a LAN and WAN (Wide Area Network).

For example, in the example in FIG. 32, the network 4 is connected to an external network as follows. That is, an L2SW (Layer 2 Switch) 502 connected to a PC (Personal Computer) via a link 511 is connected to the general purpose LAN ports 212*a* and 212*b* of the node apparatuses 100*a* and 100*b* via links 512 and 513, respectively. In addition, PCs 503, 505, 506 are connected to the general purpose LAN ports 212*c*, 212*g*, 212*h* of the node apparatuses 100*c*, 100*g*, 100*h* via links 514, 528, 529, respectively.

Meanwhile, the L2SW 502 may further be connected to a router that is not illustrated in the drawing and another PC that is not illustrated in the drawing. In addition, the PCs 503, 505 and 506 may also be connected to another external network that is not illustrated in the drawing.

In addition, for convenience of description, FIG. 32 illustrates the network 4 including the nine node apparatuses 100*a*-100*i*, but according to the embodiment, for example, the wireless ad hoc network may include a number of node apparatuses such as several thousand to several hundred thousand.

For example, the wireless ad hoc network of the present embodiment may be applied to a sensor network being a network for collecting various information from a number of sensors placed in various places. In that case, corresponding to the number of sensors, the wired ad hoc network may include a number of node apparatuses in the order of several thousand to several hundred thousand. In a sensor network, for example, a sensor of any type such as an image sensor, a temperature sensor, a humidity sensor, a pressure sensor, an acceleration sensor and the like is used.

FIG. 32 also illustrates one of application examples of the wired ad hoc network of the present embodiment to a sensor network. That is, in FIG. 32, sensors 504 and 507 having a LAN interface are connected to the general purpose LAN ports 212*e* and 212*i* of the node apparatuses 100*e* and 100*i* via links 520 and 530, respectively. The sensors 504 and 507 outputs data representing the result of sensing as an Ethernet frame via the LAN interface. The type of these sensors 504 and 507 are is arbitrary.

By using the wired ad hoc network according to the present embodiment as illustrated in FIG. 32, since communication may often be conducted by wired communication even in an environment where communication is difficult by wireless communication, it becomes possible to establish a sensor network even in a severe environment.

For example, a sensor and a node apparatus connected to the sensor via a general purpose LAN port may be embedded in the soil of a field or a cliff, in water of a paddy or river or sea, and in a structural object such as a wall or pillar of a building. In such a case, the node apparatus may also communicated certainly with other node apparatuses by wired connection. Therefore, by using the wireless ad hoc network according to the present embodiment, even in an environment where wireless communication is difficult such as in the soil, water and a structural object, a sensor network may be established.

Next, regarding the configuration and operation of each node apparatus 100*a*-100*i* in the network 4 as in FIG. 32, the difference over the first embodiment is described with reference to FIGS. 7-29 regarding the first embodiment in order.

First, referring to the FIG. 7, the HELLO frame and the ACK frame are not used in the second embodiment. This is because the communication quality of the wired link is significantly better compared with the wireless link. That is, in the wired communication where physical ports are connected one-to-one, as long as the carrier signal on the transmission medium is detected, the communication succeeds practically with a 100% chance.

For example, the node apparatus 100*a* does not need to recognize adjacent node apparatuses triggered by the reception of the HELLO frame, and may simply monitor the ports 211*a*-1 through 211*a*-4 to check whether a carrier signal is detected. If a carrier signal is detected, an adjacent node exists.

In addition, for example unless the port 211*a*-4 is in the link down state, when the node apparatus 100*a* transmits a data frame to the adjacent node apparatus 100*b* via the link S16, the success of the transmission is secured. Therefore, the ACK frame is not required either.

Next, referring to FIG. 8, since the ACK frame is not used in the second embodiment, the timeout time field is not required in the buffer unit 109.

In addition, in the second embodiment, instead of the adjacent node apparatus managing table 103 in the format as in FIG. 9, the adjacent node managing table 103*a* as in FIG. 33 is used. FIG. 33 is a diagram illustrating an example of the adjacent node managing table 103*a* in the second embodiment.

Meanwhile, hereinafter, it is assumed that in the node apparatus 100*a*, port IDs to identify four ports 211*a*-1 through 211*a*-4 respectively are assigned to the respective ports 211*a*-1 through 211*a*-4 in advance.

Comparing FIG. 33 with FIG. 9, the only difference is that the port ID field is added in FIG. 33. For example, when the network 1 in FIG. 1 is a wired network, the adjacent node managing table 103-$N_z$ of the node apparatus $N_2$ has three entries respectively corresponding to the three node apparatuses $N_1$, $N_3$ and $N_6$ adjacent to the node apparatus $N_2$ in the same manner as in FIG. 9. Then, in each entry, the value $Q_{2,i}$ (i=1, 3, 6) of the port ID field indicates that "the node apparatus $N_i$ is connected to the port in the node apparatus N2 to which $Q_{2,i}$ is assigned as the port ID.

For example, the node apparatus $N_2$ takes out the value $N_i$ of the LS from the data frame received in the port to which a certain port ID $Q_{2,i}$, and creates the adjacent node managing table as in FIG. 33 while associating the taken value $N_i$ and port ID $Q_{2,i}$.

Next, referring to FIG. 10 and FIG. 11, the format of the weighting table 104 is the same in the second embodiment as in the first embodiment. However, in the second embodiment, the value of the weighting is two values "0" and "1".

In the first embodiment, weighting in adjusted little by little by the expression (6) or (7) according to whether or not the AKC frame is received, in order to select a more appropriate adjacent node as the LD, taking in the quality of the wireless link as well. However, the status of a wired link where ports are connected one-to-one is a choice between the following two, (R1) and (R2).

(R1) With a carrier signal being detected, the success of communication is assured at a 100% chance practically.

(R2) With a link down state where no carrier signal is detected, communication obviously fails.

For this reason, in the second embodiment, only two values of weighting will do. Details of the control of the values of weighting are described later.

Next, referring to FIG. 12 and FIG. 13, the format of the FID managing table 105 is the same in the second embodiment as in the first embodiment.

Next, referring to FIG. 14, in the second embodiment, there is no branching in step S202 according to the type of the received frame, and therefore steps S203 and S206 do not exist.

However, in the second embodiment, instead of the process in FIG. 15 called from step S203, the link managing unit 108 monitors the state of each port regularly. Then, the link managing unit 108 checks whether or not an entry having the port ID of the port where a carrier signal is detected exists in the adjacent node managing table 103*a* in FIG. 33.

If an entry exists, the link managing unit 108 updates the value of the last update time field of the found entry to the current time. If no entry is found, the link managing unit 108 creates a new entry, and registers the port ID of the port where the carrier signal is detected, and the current time in the new entry. At this stage, the node ID field is empty.

Meanwhile, in the second embodiment, when the data frame is received in step S201 in FIG. 14, the frame branching processing unit 106 further performs, in addition to the process in step S204, the following process. That is, the frame branching processing unit 106 notifies the value of the LS of the data frame and the port ID of the port where the data frame is received, to the link managing unit 108.

Then, the link managing unit 108 searches the adjacent node managing table 103*a* in FIG. 33, and performs the operations (S1)-(S4) below.

(S1) If there is an entry in which the value of the node ID field matches with the value of the LS of the data frame, and the value of the port ID field matches with the port ID of the port where the data frame is received.

The link managing unit 108 sets the current time as the last update time of the entry.

(S2) If there is an entry in which the node ID field is empty and the value of the port ID field matches with the port ID of the port where the data frame is received.

The link managing unit 108 sets the value of the LS of the data frame as the node ID and the current time as the last update time, in the entry. In addition, the link managing 108 performs processes of step S305-S208 in FIG. 15 using, instead of "the value of the LS of the received HELLO frame" in FIG. 15, the value of the LS of the received data frame.

(S3) If there is no entry in which the value of the port ID field matches with the port ID of the port where the data frame is received.

The link managing unit 108 creates a new entry in the adjacent node managing table 103*a*, and in the new entry, the value of the LS of the data frame, the port ID of the port where the data frame is received, and the current time. In addition, the link managing 108 performs processes of step S305-S208 in FIG. 15 using, instead of "the value of the LS of the received HELLO frame" in FIG. 15, the value of the LS of the received data frame.

(S4) If there is an entry in which the value of the node ID matches with the value of the LS of the data frame, but the value of the port ID field does not match with the port ID of the port where the data frame is received.

The link managing unit 108 deletes the entry. That is, the link managing unit 108 reflects the connection change of the cable to the adjacent node managing table 103*a*.

Next, describing the difference over the first embodiment with reference to FIG. 16, since the HELLO frame is not used in the second embodiment, the process in FIG. 16 is not performed.

Meanwhile, various aging processes in FIG. 17-FIG. 19 are the same in the second embodiment as in the first embodiment.

In the second embodiment, the data frame reception process in FIGS. 20-23 is modified as follows.

In FIG. 20, the step S803 is omitted. In addition, in step S816 in FIG. 21, "0" indicating availability of transmission is used as the initial weighting value.

In addition, since no ACK frame exists in the second embodiment, of course, the reselection of the LD triggered by timeout is not performed either. Then, in the second embodiment, weighting is in two values. Therefore, step S818 in FIG. 22 is modified as follows. That is, the data frame processing unit 110 determines whether or not the weighting corresponding to the obtained value of the LD is 1, and if the weighting is 1, the process moves to S830, and if the weighting is 0, the process moves to S819.

Then, in step S819, the data frame processing unit 110 creates a new data frame in the same manner as in the first embodiment and outputs to the transmitting unit 102. Then, the transmitting unit 102 in the second embodiment refers to the adjacent node managing table 103*a* and identifies the port ID corresponding to the adjacent node apparatus specified as the LD. Then, the transmitting unit 102 outputs the new data frame received from the data frame processing unit 110 to the port to which the identified port ID is assigned.

After that, in the second embodiment, step S820 is omitted. Steps S821-S824 are the same as in the first embodiment.

In addition, in the second embodiment, since there is no ACK frame, step S825 and step S826 are omitted. Then, the data frame processing unit 110 recognizes "transmission success" at the time when it completed request of transmission with the transmitting unit 102 in FIG. 819, and deletes the received data frame from the buffer unit 109.

Then, the data frame processing unit 110 will execute step S827 immediately after step S822 or S824. However, in the second embodiment, the data frame processing unit 110 does not perform update of weighting in step S827. This is because the weighting in the second embodiment is in two values 0 and 1, and the weighting may be kept at 0.

In addition, since the data frame processing unit 110 already recognized "transmission success" in step S819, step S828 and S829 do not exist in the second embodiment.

Then, in FIG. 23, the transmission in step S830 is modified in the same manner as step S819. In addition, steps S836 and S837 are omitted in the same manner as steps S825 and S826. Then, in step S839, in the same manner as step S827, the update of weighting is omitted, and only the last update time is updated.

Then, since the ACK frame does not exist in the second embodiment, the processes in FIG. 25 and FIG. 26 do not exist either.

In addition, the data frame transmission process in FIGS. 27-28 is modified as follows in the second embodiment.

Steps S1101-S1110 in FIG. 27 are the same in the first embodiment. However, step S1111 in FIG. 28 is modified in the same manner as in step S818. That is, the data frame processing unit 110 determines whether or not the weighting corresponding to the obtained value of the LD is 1 or not in step S1111, and if the weighting is 1, the process moves to step S1112, and if the weighting is 0, the process moves to step S1114.

In addition, the transmission in step S1114 is modified in the same manner as step S819, and the received data frame is deleted immediately form the buffer unit 109 after the transmission of the new data frame. Therefore, step S1115 is omitted.

While steps S1116-S1120 are the same as in the first embodiment, steps S1121, S1122, S1124 and S1125 do not exist in the second embodiment. In addition, step S1123 is modified in the same manner as S827. That is, the data frame processing unit 110 does not update the weighting and update the last update time only, in step S1123.

In addition, the process in FIG. 29 is modified in the second embodiment in the same manner as the process in FIG. 23.

Next, the third embodiment is described. The third embodiment is an embodiment in which the first and second embodiments are combined, and is an embodiment applied to a network where the wired connection and wireless connection exist in mixed manner.

Specifically, in the third embodiment, the following three types of node apparatuses exist in a mixed manner in the networks.

(T1) A wireless type node apparatus that performs communication with adjacent node apparatuses via a wireless link as the node apparatus 100 in the first embodiment.

(T2) A wired type node apparatus that performs communication with adjacent node apparatuses via a wired link as the node apparatuses 100*a*-100*h* in the second embodiment.

(T3) A mixed type node apparatus that has the receiving unit 101 and the transmitting unit 102 realized by the wireless module 206 as the node apparatus 100 in the first embodiment, and further has a port and PHY chip for wireless connection as the node apparatuses 100*a*-100*h* in the second embodiment. That is, a mixed type node apparatus that is able to perform communication with adjacent node apparatuses via a wireless link, and is also able to perform communication with adjacent node apparatuses via a wired link.

Meanwhile, in a mixed type node apparatus, for example, an adjacent node managing table as in FIG. 33 may be used. In that case, in the port ID field, regarding the adjacent node apparatus via a wired link, the value of the port ID may be stored, and regarding the adjacent node apparatus via a wireless link, a specific value that is not used as the port ID may be stored. The mixed type node apparatus operates in the same manner as the node apparatus 100 in the first embodiment regarding transmission/reception of a frame via a wireless link, and operates in the same manner as the node apparatuses 100*a*-100*h* in the second embodiment regarding transmission/reception of a data frame via a wired link.

Next, the fourth embodiment is described. The fourth embodiment is an embodiment in which the first embodiment related to a wireless network is modified so as not to use the ACK frame.

Here, first, the meaning of not using the ACK frame in a wireless network is described.

Generally, by using an ACK frame, assurance of arrival that a data frame arrives at an adjacent node apparatus successfully may be obtained. However, returning the ACK frame in response to a data frame has influences such as increase in the latency, decrease in the practical throughput, the performance of the network system as a whole may deteriorate.

In addition, as illustrated in FIG. 22, there may be a case in which due to absence of reception of the ACK frame, the node apparatus 100 selects different adjacent node apparatus one after another as the LD. Then, the path is switched one after another, and as a result, the order may not be maintained between pluralities of data frames addressed from the same GS to the same GD. That is, the order in which a plurality of data frames were transmitted from the GS and the order in which the plurality of data frames arrive at the GD may be different.

On the other hand, if the ACK frame is eliminated in the wireless network, there is no assurance that the data frame reaches an adjacent node apparatus, but in turn, the order of arrival to the GD is maintained.

That is, assurance of arrival and assurance of order are in the relationship of trade off. Therefore, considering factors such as the usage of the network, or what protocol's PDU is included in the payload of the data frame, whether or not to use the ACK frame in a wireless network may be determined.

For example, there may be a case in which the payload of the data frame is an Ethernet frame, the payload of the Ethernet frame is IP datagram, and the payload of IP datagram is TCP (Transmission Control Protocol) segment. In this case, since TCP is designed on an assumption that the TCP segment drops, assurance of arrival by the ACK frame is not required. That is, even if there is a data frame that does not arrive, retransmission control is performed by TCP being a protocol of a higher layer, no problem occurs. On the contrary, assurance of order is required in TCP.

Then, the fourth embodiment that does not use the ACK frame is preferable in a case such as described above for example when the TCP segment is included in the payload of the data frame 301 in FIG. 7.

Specifically, the fourth embodiment is similar to the second embodiment in that the ACK frame does not exist. However, in the fourth embodiment, adjacent node apparatuses are managed using the HELLO frame in the same manner as in the first embodiment.

Therefore, in the fourth embodiment, while step S206 is omitted from FIG. 14, the processes in the first embodiment in FIGS. 15-19 are the same in the first embodiment. In addition, while step S803 is omitted in FIG. 20 in the same manner as in the second embodiment, the subsequent process in FIG. 21 is the same as in the first embodiment.

In FIG. 22, step S818 is modified in the same manner as in the second embodiment, and step S819 is the same as in the first embodiment. However, in the fourth embodiment, the data frame processing unit 110 recognizes "transmission success" at the point of time when request of transmission with the transmission unit 102 is completed, and deletes the received data frame from the buffer unit 109. Therefore, step S820 is omitted in the same manner as in the second embodiment.

Steps S821-S824 are the same as in the first embodiment. Then, steps S825 and S826 are omitted in the same manner as in the second embodiment. The data frame processing unit 110 will perform step S827 immediately after step S822 or S824, and steps S828 and S829 do not exist. Therefore, weighting is not to be updated by the expression (7).

Meanwhile, step S827 may be the same as in the first embodiment, or may be a step in the same manner as in the second embodiment where update of weighting is omitted.

Then, in FIG. 23, the transmission in step S830 is modified as in the same manner in step S819. In addition, steps S836 and S837 are omitted in the same manner as steps S825 and S826, and step S838 is omitted in the same manner as step S828.

Step S839 may be the same as in the first embodiment, or may be a step in the same manner as in the second embodiment where update of weighting is omitted.

Since the ACK frame does not exist in the fourth embodiment, the processes in FIGS. 25 and 26 do not exist either.

In addition, the data frame transmission process in FIGS. 27-28 is modified in the fourth embodiment as follows.

While steps S1101-S1110 in FIG. 27 are the same as in the first embodiment, step S1111 in FIG. 28 is modified in the same manner as step S818. That is, in step S1111, the data frame processing unit 110 determines whether or not the weighting corresponding to the obtained value of the LD is 1, and if the weighting is 1, the process moves to step S1112, and if the weighting is 0, the process moves to step S1114.

In addition, the transmission in step S1114 is modified in the same manner as step S819, and the received data frame is deleted immediately from the buffer unit 109 after the transmission of the new data frame. Therefore, step S1115 is omitted.

While steps S1116-S1120 are the same as in the first embodiment, steps S1121, S1122, S1124 and S1125 do not exist in the fourth embodiment. Therefore, weighting is not to be updated by the expression (7).

Meanwhile, step S1123 may be the same as in the first embodiment, or may be a step in the same manner as in the second embodiment where update of weighting is omitted.

Meanwhile, the process in FIG. 29 is modified in the fourth embodiment in the same manner as in the process in FIG. 23.

Next, the fifth embodiment is described. The fifth embodiment is an embodiment is a fusion of the first embodiment and the fourth embodiment, and is an embodiment in which the frequency of the ACK frame is adjusted.

That is, in the fifth embodiment, a first type data frame that requires the ACK frame and a second type data frame that does not required the ACK frame are used. The first and second type data frames are distinguished by the value of the type field illustrated in FIG. 7.

For example, in the type field of the first type data frame, in the same manner as the data frame 303 in FIG. 7, a predetermined constant number D is specified, and in the type field of the second type data frame, another constant number C is specified. Specifically, when the type field is 2 bit, for example, $D=(00)_2$ and $C=(01)_2$ is possible.

By the way, one of the purposes of using the ACK frame is assurance of arrival as described regarding the fourth embodiment, and another purpose is to understand the quality of the link.

Generally, if the communication quality of a wireless link $L_{i,j}$ between node apparatuses $N_i$ and $N_j$ is very bad, communication from the node apparatus $N_i$ to the node apparatus $N_j$ (or from the node apparatus $N_j$ to the node apparatus $N_i$) via the wireless link $L_i$, is almost impossible. It is difficult even for a very short frame such as a HELLO frame to arrive at the node apparatus $N_j$ from the node apparatus $N_i$ (or from the node apparatus N to the node apparatus $N_i$) via the wireless link $L_{i,j}$ with a very bad communication quality.

On the other hand, if the communication quality of the wireless link $L_{i,j}$ between node apparatuses $N_i$ and N is very good, even if a long frame such as a data frame arrives successfully at the node apparatus $N_j$ from the node apparatus $N_i$ (or from the node apparatus N to the node apparatus $N_i$) via the wireless link $L_{i,j}$.

However, if communication quality of the wireless link $L_{i,j}$ between node apparatuses $N_i$ and $N_j$ is at a medium level, there may be a case "transmission via the wireless link $L_{i,j}$ is successful for a very short frame, and transmission via the wireless link $L_{i,j}$ fails for a long frame". In cases in which it is determined as transmission failure in step S826 in FIG. 22 and the like, not only a case in which a failure occurs in a link temporarily, but also a case in which, as described above, the communication quality of the wireless link is sufficient for transmission of the HELLO frame but insufficient for transmission of the data frame.

Here, focusing on steps S827 and 828 in FIG. 22, weighting gradually decreases or gradually increases depending on whether or not the ACK frame is received. Therefore, the value of weighting as a result of learning reflects the ratio at which the ACK frame is received, that is, it reflects the communication quality. That is, the weighting corresponding to a node apparatus that is adjacent via a link with a good communication quality has a smaller value, and therefore, is selected with priority as the LD.

Incidentally, while the ACK frame may be used as described above for understanding the quality of the link other than assurance of arrival, as described regarding the fourth embodiment, it may cause deterioration in the performance of the network system as a whole. Therefore, in the fifth embodiment, the first and second type data frames are used as described above.

For example, the node apparatus 100 may basically use the second type data frame for improving the performance, and may use the first type data frame like a surprise inspection to understand the quality of the link. Alternatively, according to the protocol of a higher layer, the node apparatus 100 that transmits the data frame as the GS may understand which of the first and second types is appropriate, and may set the value in the type field of the data frame.

Various variations such as (U1) through (U4) below for example are possible for the fifth embodiment.

(U1) In the node apparatus 100 that transmits the data frame as the GS, the data frame processing unit 100 stores the time $T_{last}$ at which the data frame is last transmitted. Then, when transmitting a data frame, the data frame processing unit 110 sets a predetermined value D indicating the first type in the type field of the data frame, only in the case in which the difference between the current time $T_{now}$ and the last transmission time $T_{last}$ is equal to or larger than a predetermined interval $I_{ack}$. In other cases, the data frame processing unit 110 sets a predetermined value E indicating the second type in the type field of the data frame. For example, the interval $I_{ack}$ may be a relatively long period of time such as 10 seconds.

(U2) In the node apparatus 100 that transmits the data frame as the GS, the data frame processing unit 100 may store the time $T_{last}$ for each GD or each selected LD, and may operate in the same manner as in (U1).

(U3) In the node apparatus 100 that transmits the data frame as the GS, the data frame processing unit 110 counts the number C of transmitted data frames. That is, when transmitting a data frame, the data frame processing unit 110 increments C. Only in the case in which the counted value C is equal to a predetermined value $C_{ask}$, the data frame processing unit 110 sets the predetermined value D indicating the first type in the type field, and resets C to zero. In other cases, the data frame processing unit 110 sets the predetermined value E indicating the second type in the type field of the data frame. For example, the predetermined value $C_{ask}$ may be a relatively large number such as several thousand.

(U4) In the node apparatus 100 that transmits the data frame as the GS, the data frame processing unit 100 may count the number C of transmitted data frame for each GD or each selected LD, and may operate in the same manner as in (U3).

Meanwhile, in the node apparatus 100 that forwards a data frame received from an adjacent node apparatus, the data frame processing unit 110 copies the value of the type specified in the received data frame to the type field of the data frame to be transmitted without change.

Alternatively, according to the value of the weighting associated with the selected LD, the data frame processing unit 110 may rewrite the value of the type field. For example, if the weighting associated with the selected LD is equal to or larger than a predetermined threshold value, the link quality is estimated to be bad. Then, the data frame processing unit 110 may set the predetermined value E indicating the second type in the type field of the data frame to be transmitted, regardless of the value of the type field in the received data frame.

Alternatively, the type field may be expressed in 3 bits or more, and there may be a plurality of subtypes of the data frame such as (V1)-(V4) below.

(V1) A data frame that requires the ACK frame and does not allow rewriting of the value of the type field upon relaying.

(V2) A data frame that requires the ACK frame and allows rewriting of the value of the type field upon relaying.

(V3) data frame that does not require the ACK frame and does not allow rewriting of the value of the type field upon relaying.

(V4) A data frame that does not require the ACK frame and allows rewriting of the value of the type field upon relaying.

While the first-fifth embodiments were described in detail above, in order to facilitate understanding of advantages of these embodiments, comparison examples of the first and second embodiments are described next. Meanwhile, hereinafter, for convenience of description, the judgment as to "whether or not the values of the GS and FID of the received data frame are equal to the values of the GS and FID of a data frame that was transmitted previously" (that is, step S807 in FIG. 21) is referred to as "loop judgment".

FIG. 34 and FIG. 35 are diagrams illustrating the first comparison example that involves the loop judgment but does not involve the backtracking operation. FIG. 34 and FIG. 35 illustrates, in the same manner as in FIG. 6, the way of forwarding the data frame in the network 1.

The node apparatus in the first comparison example has the same FID managing table as in the first embodiment, and performs the loop judgment. That is, in the same manner as in step S809 in FIG. 21, the node apparatus in the first comparison example also sets, when a data frame that was transmitted previously is received, the weighting corresponding to the LD selected upon the transmission to the maximum value.

However, the node apparatus in the first comparison does not perform the backtracking operation. That is, in the node apparatus in the first comparison example, the OLS field of the FID managing table is only referred to in order to exclude the node apparatus corresponding to the OLS from the candidate of the LD (see step S817 in FIG. 21 in step S829 in FIG. 22). Then, in the first comparison example, instead of the processes in step S830-S839 in FIG. 23, simply in the same manner in step S838, only the process to discard the received data frame is performed.

Therefore, in the case in which the node apparatus $N_1$-$N_7$ are a; the node apparatus in the first comparison example, if the node apparatus $N_1$ specifies the node apparatus $N_7$ as the GD and a failure is occurring in the link between the node apparatuses $N_4$ and $N_7$, the data frame is forwarded as in FIG. 34 or FIG. 35.

FIG. 34 is the same as the first embodiment up to step S106, and description is omitted.

In the same manner as in the first embodiment, the node apparatus $N_3$ that received in step S106 sets the weighting corresponding to the node apparatus $N_4$ selected as the LD in step S103 to 1. Then, the node apparatus $N_5$ is newly selected as the LD, and the data frame is transmitted in step S107.

Then, the node apparatus $N_5$ that received the data frame in step S107 recognizes that the same data frame as transmitted in step S106 was received, based on the FID managing table. Then, the node apparatus $N_5$ sets the weighting of the node apparatus $N_3$ selected as the LD in step S106 to the maximum value.

Here, only the node apparatus $N_4$ being the OLS and the node apparatus $N_3$ whose weighting is set to the maximum value are adjacent to the node apparatus $N_5$. Therefore, the node apparatus N5 determines that there is no adjacent apparatus that may be selected as the LD, and discards the data frame received in step S107. Thus, the data frame disappears from the network 1 without arriving at the node apparatus $N_7$ being the GD.

Then, for the node apparatus $N_3$, the situation is "after the transmission in step S107, no same data frame is returned from any adjacent node apparatus". Therefore, the node apparatus $N_3$ learns wrongly as "it is appropriate to select $N_5$ as the LD when transmitting a data frame that specifies the node apparatus $N_7$ as the GD". In the same manner, the node apparatus N2 learns wrongly as "it is appropriate to select $N_3$ as the LD when transmitting a data frame that specifies the node apparatus $N_7$ as the GD".

That is, in the example in FIG. 6 in the first example, a wrong learning result is corrected by the backtracking operation in step S109 and S110, but in the first comparison example, the wrong learning result is not corrected.

Then, assuming that after the forwarding of the data frame in FIG. 34, the node apparatus N1 specifies the node apparatus $N_7$ as the GD again, and the link between the node apparatuses $N_4$ and $N_7$ has not recovered from the failure yet, the data frame is forwarded next as in FIG. 35.

Step S101 and S102 in FIG. 35 are the same as in FIG. 6, and description is omitted. The node apparatus $N_3$ that received the data frame in step S102 selects the node apparatus $N_5$ as the LD in step S103*b*, and forwards the data frame.

Then, the node apparatus $N_5$ that learned that "the node apparatus $N_3$ may not be selected as the LD when the node apparatus $N_7$ is specified as the GD" by the reception in step S107 in FIG. 34 selects another node apparatus $N_4$ as the LD. Then, the node apparatus $N_5$ transmits the data frame in step S104*b* while specifying the node apparatus $N_4$ as the LD.

It is assumed that in the node apparatus $N_4$ at this point of time, in the weighting table corresponding to the node apparatus $N_7$ being the GD, the weighting of the node apparatus $N_3$ has a smaller value than the weighting of the node apparatus $N_7$ whose value is increased by the judgment of transmission failure in step S104 in FIG. 34. Then, the node apparatus $N_4$ selects the node apparatus $N_3$ as the LD, and transmits the data frame in step S105*b*.

Then, the node apparatus $N_3$ recognizes that the same data frame as transmitted in step S103*b* was received, and sets the weighting of the node apparatus $N_5$ to the maximum value. Then, the node apparatus $N_3$ newly selects, as the LD, the node apparatus $N_4$ that has not been selected as the LD, and transmits the data frame in step S106*b*.

Then, the node apparatus $N_4$ recognizes that the same data frame as transmitted in step S105*b* was received, and sets the weighting of the node apparatus $N3_5$ to the maximum value. As a result, the node apparatus $N_4$ determines that there is no longer any adjacent node apparatus that may be selected as the LD, and discards the data frame received in step S106*b*. The data frame thus disappears from the network 1 without arriving at the node apparatus $N_7$ being the GD.

However, for the node apparatus $N_2$, the situation is "after the transmission in step S102, no same data frame is returned from any adjacent node apparatus". Therefore, the node apparatus $N_2$ learns wrongly as "it is appropriate to select $N_3$ as the LD when transmitting a data frame that specifies the node apparatus $N_7$ as the GD".

Therefore, after that, the node apparatus $N_2$ keeps selecting the node apparatus $N_3$ as the LD when transmitting a data frame that specifies the node apparatus $N_7$ as the GD. For this reason, unless the link between the node apparatuses $N_4$ and $N_7$ recovers from the failure, the data frame disappears from the network.

As described above, even if the node apparatus performs the loop judgment, without the backtracking operation the node apparatus being the GS keeps transmitting the data frame without recognizing that the data frame is discarded and disappears from the network. As a result, the data frame that continues to be transmitted continues to be discarded somewhere in the network. Therefore, the first comparison example is not preferable.

FIG. 35 is a diagram describing the second comparison example where a pseudo backtracking operation is performed but the loop judgment is not performed.

The node apparatus in the second comparison example does not have the FID managing table 105 and does not perform the loop judgment. In addition, the node apparatus in the second comparison example performs a pseudo backtracking operation.

That is, upon receiving a data frame that specifies other than the node apparatus itself as the GD, the node apparatus in the second comparison example selects, among adjacent node apparatuses other than the LS of the data frame, the one associated with weighting that is not at the maximum value, and transmits the data frame. Then, the node apparatus in the second comparison example sequentially selects adjacent nodes that may be selected until the transmission succeeds.

As a result, in the case in which the transmission did not succeed even when attempts were made with all the adjacent node apparatuses other than the adjacent node whose weighing is the maximum value and the LS of the received data frame as the LD, the node apparatus in the second comparison example returns the data frame to the LS of the received data frame. The return is the pseudo backtracking operation in the second comparison example.

In FIG. 35, step S101-S106 are the same as in FIG. 6 in the first embodiment, and description is omitted.

The node apparatus in the second comparison does not have the FID managing table 105 and does not perform the loop judgment. Therefore, upon receiving the data frame in step S106, the node apparatus $N_3$ selects the node apparatus $N_4$ as the LD again in the same manner as in step S103, and transmits the data frame in step S107*b*.

Then, upon receiving the data frame in step S107*b*, the node apparatus $N_4$ that also does not have the FID managing table 105 selects the node apparatus $N_5$ as the LD again in the same manner as in step S105, and transmits the data frame in step S108*b*.

After that, in the same manner, in the second comparison example where the loop judgment is not performed, an infinite loop occurs where the data frame is forwarded forever in the closed path <$N_3$, $N_4$, $N_5$>. Therefore, the second example is not preferable either.

On the other hand, since the node apparatus in the first-fifth embodiments performs the loop judgment and the backtracking operation together, it is an appropriate apparatus for the ad hoc network.

Meanwhile, each embodiment described above may be combined as needed unless they contradict each other. For example, an embodiment where the third embodiment and the fifth embodiment are combined (that is, an embodiment in which in a network where wired connection and wireless connection exist in a mixed manner, the frequency adjustment of the ACK frame is performed) is possible.

In addition, the present invention is not limited to the embodiments described above, and may be modified in various ways. Several examples are described below.

The first standpoint of the modification is the data structure. While FIGS. 8-13 are presented in the format of tables, the format of various data is arbitrary according to the embodiment, any data structure such as a table, limited FIFO (First In First Out), a linear list and the like.

For example, the FID managing table 105 may be realized by limited FIFO. In this case, entries are excluded from the limited FIFO in order from the old ones. Therefore, the aging process of the FID managing table 105 illustrated in FIG. 19 is node required. Therefore, the last update time field in the FID managing table 105 is not required either.

Specifically, in step S822 in FIG. 22, step S833 in FIG. 23, step S1118 in FIG. 28, and S833*a* in FIG. 29, instead of updating the existing entry, creation of a new entry and setting of values in the created new entry may be performed.

For example, step S822 may be replaced with processes of (W1)-(W3) below.

(W1) The data frame processing unit 110 creates a new entry in the FIG managing table 105.

(W2) The data frame processing unit 110 copies the value of each field of FID, GS, OLS from an existing entry that has the values equal to the GD and FID of the received data frame t as the GS and FID to the new entry.

(W3) The data frame processing unit 110 sets the value of the LD of the transmitted data frame as the LD of the new entry.

Meanwhile, in step S806, in FIG. 21, step S831 in FIG. 23, step S1116 in FIG. 28 and step S831*a* in FIG. 29, each entry is checked sequentially in order from the newest entry to the oldest entry of the limited FIFO.

The second standpoint of the variation is the expression of weighting. The range of values to express the weighting is arbitrary depending on the embodiment. For example, instead of expressing weighting with values ranging from 0 to 1 as in the examples above, weighting may be expressed with integers ranging from 0 to 255. In addition, while the value of weighting is smaller with a higher degree of priority in each embodiment above, the value of weighting may be larger with a higher degree of priority. In that case, the operation of each step to change weighting is changed as needed.

The third standpoint of the variation is replacement of the polling process and an interruption process. For example, the time IC 203 may output an interrupt signal for timeout when no ACK frame is returned after the transmission of the data frame. That is, an embodiment is also possible in which, instead of the ACK processing unit 107 checking the value of the last update time of each entry in the buffer unit 109 by polling as in FIG. 26, the timer IC 203 issues an interrupt signal when the last update time of each entry in the buffer unit 109 comes.

The fourth standpoint of the variation relates to the management of adjacent node apparatuses. When the interval at which other node apparatuses transmit the HELLO frame is known, the link managing unit 108 may predict the time at which the HELLO frame is next received from a node apparatus currently recognized as an adjacent node apparatus. For example, the transmission interval $\Delta T_{hello}$ is equal in all the node apparatuses in the network, the interval at which other node apparatuses transmit the HELLO frame is known.

In addition, instead of the HELLO frame 311 in FIG. 7, a HELLO frame in another format that further has a field indicating the transmission interval of the HELLO frame. In that case, the link managing unit 108 may predict the time at which the HELLO frame is next received from an adjacent node apparatus, from a received HELLO frame.

As described above, when the interval at which other node apparatuses transmit the HELLO frame is known, for example, in the adjacent node managing table 103 (see FIG. 9), the last update time field may be omitted, and a field as described below may be added.

(X1) A successive failure number field for recording the number of times of successive failure in receiving the HELLO frame (X2) A predicted time field for recording the time at which the HELLO frame is predicted to be received next Then, instead of setting the current time as the last update time in steps S302 and S304 in FIG. 15, the link managing unit 108 may clear the value of the successive failure number to 0, and may set the time in which the known transmission interval of the HELLO frame is added to the current time as the predicted time. In addition, instead of step S502 in FIG. 17, a process as described above may be performed.

That is, if the value of the predicted time field of the focused entry indicates a time earlier than the current time, the link managing unit 108 increments the value of the successive failure number of the focused entry, and shifts the value of the predicted time field back by the amount of the known transmission interval of the HELLO frame. Then, if the value of the successive transmission failure number of the focused entry is equal to or larger than a predetermined number of times (for example, three times), the process moves to step S503, and if the value of the successive transmission failure time is smaller than the predetermined value, the process moves to step S505.

In addition, from the fourth standpoint above of the management of adjacent node apparatuses, each embodiment described above may be modified as follows.

That is, when receiving the data frame, based on the value of the LS of the received data frame, in the same manner as in the HELLO frame reception process, the link managing unit 108 may also update the adjacent node managing table 103 and the weighting table 104 as needed. In the same manner, when receiving the ACK frame, based on the value of the LS of the received ACK frame, in the same manner as in the HELLO frame reception process, the link managing unit 108 may also update the adjacent node managing table 103 and the weighting table 104 as needed.

The fifth standpoint of the variation is the criteria in selecting the LD. That is, in each embodiment above, while the LD is selected based on weighting at the time of transmission of the data frame, but in selecting the LD, the link quality may further be considered. For example, the node apparatus 100 may measure the link quality of the wireless link based on the signal reception intensity and the like. Then, the data frame processing unit 110 may select the LD base on the evaluation value expressed as the function of the weighting and the link quality.

The six stand point of the variation relates to the process when no ACK frame is received.

For example, in step S829 in FIG. 22, the adjacent node apparatus determined as "transmission failure" once in step S826 is excluded from the candidate of the LD. However, an embodiment is also possible where an adjacent node apparatus determined as "transmission failure" once in step S826 is not excluded from the candidate and may be selected in step S829.

In that case, step S818 is modified as follows. That is, the data frame processing unit 110 determines whether or not the weighting corresponding to the obtained value of the LD is maximum value. Then, when the weighting is the maximum value, the process moves to step S830, and when the weighting is smaller than the maximum value, the process moves to step S819.

In the same manner, step S1125 in FIG. 28 may be modified so as not to exclude an adjacent node apparatus determined as "transmission failure" once in step S1122 from the candidate. Then, step S1111 is modified so that the data frame processing unit 110 determines whether or not the weighting corresponding to the obtained value of the LD is maximum value.

With steps S819 and S819 being modified as described above, for example, when the node apparatus $N_{111}$ in FIG. 2 receives a data frame that specifies the node apparatus $N_{101}$ as the GD from the node apparatus $N_{116}$, the node apparatus $N_{111}$ operates as follows.

It is assumed that at the time of receiving the data frame, in the weighting table corresponding to the node apparatus $N_{101}$ that the node apparatus $N_{111}$ has, the weighting of the adjacent node apparatuses $N_{105}$, $N_{109}$, $N_{115}$ are 0.1, 0.6, 0.7, respectively. Then, the adjacent node apparatus $N_{105}$ is selected as the LD first.

Tentatively, assuming that no ACK frame is returned from the node apparatus $N_{105}$, the weighting of the node apparatus $N_{105}$ is updated to 0.2. Then, in the first embodiment, the node apparatus $N_{105}$ with which transmission failed is excluded from the candidate of the LD and the next node apparatus $N_{109}$ is selected as the LD next, but in this variation example, because of $0.2<0.6<0.7$, the node apparatus $N_{105}$ is selected as the LD again.

Then, assuming that no ACK is returned from the node apparatus $N_{105}$ again, the weighting of the node apparatus $N_{105}$ is updated to 0.3, and because of $0.3<0.6<0.7$, the node apparatus $N_{105}$ is selected as the LD again. Unless the state of the link between the node apparatuses N111 and $N_{105}$ improves, the node apparatus $N_{105}$ is selected repeatedly as the LD after that in the same manner, and transmission fails. Then, it is not until the weighting of the node apparatus $N_{105}$ becomes 0.6 (or 0.7) that the node apparatus $N_{109}$ associated with the weighting 0.6 is selected as the LD.

As illustrated above, it is possible not to exclude an adjacent node apparatus once determined as "transmission failure". This variation example is preferable in a case such as when "even if a failure occurs in a link temporarily, the link recovers from the failure soon". For example, when the link recovers from the failure during execution of repeated loop in step S818-S829, the node apparatus 100 may select the adjacent node apparatus that has proved to be "preferable as the LD" from the result of learning so far, without affected by an instantaneous failure.

However, recovery from failure may not always be instant. Therefore, in the first embodiment, an adjacent node apparatus determined as "transmission failure" once is excluded from the candidate of the LD, in order to shorten the time required for convergence of the path. That is, by excluding an adjacent node apparatus once determined as "transmission failure" from the candidate of the LD, the time required for the node apparatus 100 to determine the LD eventually for a certain data frame is shortened. As a result, as the network as a whole, the latency from the transmission of the data frame from the GS to the arrival to the GD is shortened.

Meanwhile, as a variation example from the sixth standpoint a variation example in which the data frame processing unit 110 performs update of weighting using expression (8) below instead of the expression (7) in step S828 in FIG. 22.

$$W_{revised}=W_{max} \tag{8}$$

Updating of weighting by the expression (8) means that a node apparatus adjacent to the node apparatus 100 via a link in which a failure is occurring continues to be excluded from the candidate for the LD until the entry whose weighting is updated is deleted by the aging process.

Furthermore, from the sixth standpoint, the following variation is also possible.

That is, in the first embodiment, as illustrated in FIG. 26, if an attempt for transmission of a data frame is once made and no ACK frame is received within the predetermined ACK frame waiting time $T_{wait}$, it is regarded as transmission failure. However, an embodiment is also possible in which it is not until an attempt for transmission of a data frame is made and no ACK frame is received a predetermined number of times (for example, three times) that it is regarded as "transmission failure".

For example, the transmitting unit 102 may have a transmission buffer that stores a transmitted data frame while associating it with the number of transmission. When requested for transmission of a data frame from the data frame processing unit 110 for the first time, the transmitting unit 102 sets 1 as the number of transmission, and stores the data frame output from the data frame processing unit 110 in the transmission buffer. Then, the ACK processing unit 107 may operate as follows instead of performing the process in step S1003 in FIG. 26.

That is, the ACK processing unit 107 identifies the transmitted data frame in the transmission buffer corresponding to the data frame store in the focused entry in the buffer unit 109 based on the values of the GS field and the FID field.

Then, if the value of the number of transmission associated with the transmitted data frame identified by the ACK processing unit 107 has reached a predetermined number, the ACK processing unit 107 performs the process in step S1003, and the process moves to step S1004 next.

On the other hand, if the value of the number of transmission associated with the transmitted data frame identified by the ACK processing unit 107 is smaller than a predetermined number, the process in step S1003 is not performed, and the ACK processing unit 107 increments the value of the number of transmission instead. Then, the process moves to step S1004.

Meanwhile, various embodiments and their variation examples are summarized as follows.

The node apparatus has, as receiving means to receive a frame from any one of a plurality of adjacent node apparatuses, for example, the receiving unit 101 in FIG. 3, the wireless module 206 in FIG. 4, the ports 211*a*-1 through 211*a*-4 and the PHY chips connected thereto in FIG. 21.

Meanwhile, the FID managing table 105 in FIG. 3 is realized as the DRAM 20 network 4 and the flash memory 205 in FIG. 4 and the like, and stores information such as in FIG. 12 and FIG. 13. The FID managing table 105 is an example of storage means to associate and store each pieces of information (Y1)-(Y3) below.

(Y1) Frame identifying information to identify the transmission target frame (Y2) Transmission adjacent destination node identifying information to identify the transmission adjacent destination node being the destination of the transmission target frame among a plurality of adjacent node apparatuses (Y3) Original node identifying information to identify the adjacent node apparatus that first transmitted the transmission target frame (Y4) Meanwhile, an example of the transmission target frame in (Y1) above is the data frame transmitted in step S819 in FIG. 22, step S830 in FIG. 23, step S1114 in FIG. 28, and step S830*b* in FIG. 29 etc. Then, an example of the frame identifying information is the combination of the value of the GS field and the value of the FID field.

In addition, a specific example of the transmission adjacent destination node apparatus identifying information in (Y2) above is the node ID of the adjacent node apparatus stored in the LD field of the FID managing table 105.

Then, a specific example of the original node identifying information is the node ID stored in the OLS field of the FID managing table 105.

As described above, when the node apparatus 100 relays a data frame, the value of the LS field of the data frame at the time when the node apparatus 100 first received the data frame is stored in the OLS field of the FID managing table 105. That is, the node ID of the adjacent node apparatus that first transmitted the transmission target frame is stored in the OLS field.

Meanwhile, according to the expanded definition of the OLS, when the node apparatus 100 itself becomes the GS, the own node ID is stored in the OLS field of the FID managing table 105. That is, when the node apparatus 100 itself generated the transmission target frame, the own node ID being identifying information of the node apparatus 100 itself is stored in the OLS field. In other words, the node ID stored in the OLS field is the node ID of the node apparatus that the node apparatus 100 recognizes as the origin of the transmission target frame, within the range of the number of hop being equal to or smaller than 1 with the node apparatus 100 itself being the center.

Meanwhile, the weighting table 104 in FIG. 3 is realized by the DRAM 204 and the flash memory 205 and the like in FIG. 4, and stores information such as in FIG. 10 and FIG. 11. The weighting table 104 is an example of storage means to store transmission feasibility information representing feasibility of transmission to each of a plurality of adjacent node apparatuses while associating it with the GD being the final destination of the data frame.

Meanwhile, in the embodiments above, the transmission feasibility information is represented as one or a plurality of entries that each includes a combination of the node ID of the LD field and the value of weighting. Then, the feasibility of transmission is expressed for example as "transmission is infeasible if the value of weighting is 1, and transmission is feasible if the value of weighting is smaller than 1".

Meanwhile, the data frame processing unit 110 in FIG. 3 is realized by the MPU 201 and DRAM 204 in FIG. 4 for example, and is an example of updating means to update the transmission feasibility information. When received-frame identifying information to identify a received frame received by receiving means such as the receiving unit 101 is stored in storage means such as the FID managing table 105 as the frame identifying information in (Y1), the data frame processing unit 110 as updating means updates the transmission feasibility information.

Specifically, the transmission feasibility information updated in this case is the transmission feasibility information stored in the storage means such as the weighting table 104 while being associated with the received frame destination being the final destination specified for the received frame. The transmission feasibility information is updated so that the feasibility of transmission to the first adjacent node apparatus identified by the transmission destination node identifying information in (Y2) stored in the storage means such as the FID managing table 105 while being associated with the received-frame identifying information indicates "transmission infeasible".

Specifically, for example, the operation "to set the weighting to 1 in the entry in the weighting table 104-*i* having the same value as the LD field of the FID managing table 105 in the LD field" is performed by the data frame processing unit 110 as the updating means.

Meanwhile, the data frame processing unit 110 and the transmitting unit 102 cooperates to select the second adjacent node apparatus to which transmission is feasible among a plurality of adjacent node apparatuses, and functions as transmitting means to transmit the received frame to the second adjacent node apparatus. The data frame processing unit 110 being a part of the transmitting means selects the second adjacent node based on the transmission feasibility information stored in the storage means such as the weighting table 104 while being associated with the received frame destination.

Here, it is assumed that in the storage means such as the FID managing table 105, the third adjacent node apparatus is stored as the original node identifying information in (Y3) associated with the received-frame identifying information.

Then, when the received-frame identifying information is stored as the frame identifying information in (Y1) in the storage means such as the FID managing table 105, the data frame processing unit 110 as the transmitting means recognizes that transmission is infeasible with the third adjacent node apparatus regardless of the transmission feasibility information.

That is, the data frame processing unit 110 recognizes that "transmission to the adjacent node apparatus being the OLS is infeasible regardless of the value of weighting", and excludes the adjacent node apparatus being the OLS from the candidate of the LD. Then, the data frame processing unit 110 as the transmitting means selects the second adjacent node apparatus that is different from the third adjacent node apparatus and to which transmission is feasible.

In addition, the data frame processing unit 110 and the transmitting unit 102 also cooperates to function as backtracking means. The data frame processing unit 110 and the transmitting unit 103 transmits the received frame to the third adjacent node apparatus, when, in the transmission feasibility information in the storage means such as the weighting table 104, there is no one to which transmission is feasible among the plurality of adjacent node apparatuses, and the received-frame identifying information is stored in the frame identifying information in (Y1) in the storage means such as the FID managing table 105.

Meanwhile, here, "there is no one to which transmission is feasible among the plurality of adjacent node apparatuses" means that "there is only an adjacent node apparatus for which transmission is indicated as infeasible by the transmission feasibility information, or the third adjacent node apparatus for which transmission is regarded as infeasible regardless of the transmission feasibility information as described above, for the reason such as that the weighting is 1". That is, the data frame processing unit 110 and the transmitting unit 102 as the backtracking means transmits the received frame to the third adjacent node apparatus when there is no one to which transmission is feasible among (zero, one of a plurality of) adjacent node apparatuses other than the third adjacent node apparatus.

Meanwhile, the node apparatus may have generating means to generate a new frame. Several examples of the generating means are (Z1)-(Z4) below.

(Z1) The higher layer processing unit 111

(Z2) The MAC chip and MPU not illustrated in the drawing that the node apparatus 100*e* connected to the sensor 504 via the general purpose LAN port 212*e* in FIG. 31 has (Z3) The MAC chip and MPU not illustrated in the drawing that the node apparatus 100*g* connected to the PC 505 via the general purpose LAN port 212*g* in FIG. 31 has (Z4) The MAC chip and MPU not illustrated in the drawing that the node apparatus 100*a* connected to the L2SW 502 via the general purpose port 212*a* in FIG. 31 has Meanwhile, according to the various embodiments and their variation examples described above, path generation is performed dynamically in the data transmission phase, without any separate path generation phase in advance independent from the data transmission phase. Its advantage is described below.

Generally, in a communication protocol that has a path generation phase in advance that is independent from the data transmission phase, the path is generated using a short PDU for control. However, as the communication quality of a wireless link, a medium level such as "sufficient for communication of a short PDU for communication, but insufficient for communication of a long PDU for data transmission" is possible. One of the reasons is that, depending on the length of the PDU, the distance with which communication is possible is different.

For this reason, a path that seemed to be valid in the path generation phase may prove as practically unavailable only in the data transmission phase. In addition, the signal condition may change at any time, and even in a wired network, addition or removal of node apparatuses, or connection change of the cable may take place at any time.

However, according to the various embodiments and their variation examples described above, the path through which transmission of the data frame is possible is generated dynamically while transmitting the data frame. Therefore, there is chance for waste such as "a path that is unavailable for practical transmission of the data frame is generated in the path generation phase that is independent from the data transmission phase".

In addition, according to the various embodiments and their variation examples described above, the path is selected while reacting dynamically to dynamic change in the network environment in the data transmission phase. Then, as is apparent from the description above, an appropriate path is found as a result of autonomously-distributed coordination of each node apparatus, without manual setting.

Furthermore, as is apparent from the example in FIG. 6, according to the various embodiments and their variation examples described above, even if backtracking takes place, the influence does not necessarily reach the GS. That is, according to change occurring locally, the path is corrected within only a limited local area. Therefore, no situation such as "local change is fed back positively to the entire network, and the entire network falls into an overloaded state as a result" arises.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A node apparatus comprising:

a receiver which receives a frame from arbitrary one of a plurality of adjacent node apparatuses;

a first storage which stores in association with each other:

frame identifying information that identifies a transmission target frame;

adjacent destination node identifying information that identifies an adjacent destination node apparatus being a destination of the transmission target frame from among the plurality of adjacent node apparatuses; and original node identifying information that identifies an adjacent node apparatus that has first transmitted the transmission target frame;

a second storage which stores transmission feasibility information that indicates feasibility of transmission to each of the plurality of adjacent node apparatuses in association with a final destination of a frame;

an updating unit which updates the transmission feasibility information that is stored in the second storage in association with a received-frame destination that is a final destination specified in a received frame received by the receiver, when received-frame identifying information that identifies the received frame is stored in the first storage as the frame identifying information, so that the feasibility of transmission to a first adjacent node apparatus identified by the adjacent destination node identifying information stored in the first storage in association with the received-frame identifying information indicates that the transmission is infeasible;

a transmitter which selects a second adjacent node apparatus to which transmission is feasible from among the plurality of adjacent node apparatuses according to the transmission feasibility information stored in the second storage in association with the received-frame destination, and which transmits the received frame to the second adjacent node apparatus; and a backtracking unit which transmits the received frame to a third adjacent node apparatus that is memorized by the original node identifying information stored in the first storage in association with the received-frame identifying information when the transmission feasibility information in the second storage indicates that there is no adjacent node apparatus to which transmission is feasible among the plurality of adjacent node apparatuses and when the received-frame identifying information is stored in the first storage as the frame identifying information.

2. The node apparatus according to claim 1, further comprising a buffer which stores the received frame when the receiver receives the received frame, wherein the transmitter and the backtracking unit delete the received frame from the buffer upon recognizing success of transmission of the received frame.

3. The node apparatus according to claim 1, wherein when the received-frame identifying information is stored as the frame identifying information in the first storage, the transmitter regards that transmission to the third adjacent node apparatus is infeasible regardless of the transmission feasibility information and selects the second adjacent node to which transmission is feasible, and the backtracking unit transmits the received frame to the third adjacent node apparatus when there is no adjacent node apparatus to which transmission is feasible among the plurality of node apparatuses other than the third adjacent node apparatus.

4. The node apparatus according to claim 1, wherein when the received-frame identifying information is stored as the frame identifying information in the first storage, the transmitter makes the first storage store in association with each other:

the received-frame identifying information as frame identifying information;

identifying information of an adjacent node apparatus being a transmission destination to which the transmitter transmitted the received frame as adjacent destination node identifying information; and the original node identifying information corresponding to the frame identifying information stored already in the first storage as original node identifying information, and when the received-frame identifying information is not stored in the first storage, the transmitter makes the first storage store in association with each other:

the received-frame identifying information as frame identifying information;

identifying information of an adjacent node apparatus being a transmission destination to which the transmitter transmitted the received frame as adjacent destination node identifying information; and identifying information of an adjacent node apparatus being a transmission source of the received frame as original node identifying information.

5. The node apparatus according to claim 1, further comprising a generator which generates a new frame, wherein the transmitter further selects an adjacent node apparatus to which transmission is feasible, among the plurality of adjacent node apparatuses, based on the transmission feasibility information stored in the second storage in association with a final destination of the new frame and transmits the new frame to the selected adjacent node apparatus, and further makes the first storage store in association with each other:

new frame identifying information that identifies the new frame as frame identifying information;

identifying information of the selected adjacent node apparatus as adjacent destination node identifying information; and own node identifying information that identifying the node apparatus itself that generated the new frame as original node identifying information.

6. The node apparatus according to claim 5, wherein the backtracking unit discards the received frame when there is no adjacent apparatus to which transmission is feasible among the plurality of adjacent node apparatuses, and the frame identifying information stored in the first storage is equal to the received-frame identifying information, and the original frame identifying information is the own node identifying information.

7. A non-transitory storage medium storing a transmission program to make a computer provided in a node apparatus transmit a frame to any one of a plurality of adjacent node apparatuses, the transmission program comprising:

extracting, from a received frame that the node apparatus received from any one of a plurality of adjacent node apparatuses, received-frame identifying information that identifies the received frame;

determining whether or not the extracted received-frame identifying information is stored as frame identifying information in a first storage that stores in association with each other:

frame identifying information that identifies a transmission target frame;

adjacent destination node identifying information that identifies an adjacent destination node apparatus being a destination of the transmission target frame from among the plurality of adjacent node apparatuses; and original node identifying information that identifies an adjacent node apparatus that has first transmitted the transmission target frame;

updating, when it is determined that the received-frame identifying information is stored as the frame identifying information, in a second storage storing transmission feasibility information that indicates feasibility of transmission to each of the plurality of adjacent node apparatuses in association with a final destination of a frame, the transmission feasibility information that is stored in the second storage in association with a received-frame destination that is a final destination specified in a received frame so that the feasibility of transmission to a first adjacent node apparatus identified by the adjacent destination node identifying information stored in the first storage in association with the received-frame identifying information indicates that the transmission is infeasible;

selecting a second adjacent node apparatus to which transmission is feasible from among the plurality of adjacent node apparatuses according to the transmission feasibility information stored in the second storage in association with the received-frame destination, and transmitting the received frame to the second adjacent node apparatus; and transmitting the received frame, when the transmission feasibility information in the second storage indicates that there is no adjacent node apparatus to which transmission is feasible among the plurality of adjacent node apparatuses, and when the received-frame identifying information is stored in the first storage as the frame identifying information, to a third adjacent node apparatus that is memorized by the original node identifying information stored in the first storage in association with the received-frame identifying information.

8. A frame transmission method with which a node apparatus transmits a frame to any one of a plurality of adjacent node apparatuses, comprising:

extracting, from a received frame that the node apparatus received from any one of a plurality of adjacent node apparatuses, received-frame identifying information that identifies the received frame;

determining whether or not the extracted received-frame identifying information is stored as the frame identifying information in a first storage that stores in association with each other:

frame identifying information that identifies a transmission target frame;

adjacent destination node identifying information that identifies an adjacent destination node apparatus being a destination of the transmission target frame from among the plurality of adjacent node apparatuses; and original node identifying information that identifies an adjacent node apparatus that has first transmitted the transmission target frame;

updating, when it is determined that the received-frame identifying information is stored as the frame identifying information, in a second storage storing transmission feasibility information that indicates feasibility of transmission to each of the plurality of adjacent node apparatuses in association with a final destination of a frame, the transmission feasibility information that is stored in the second storage in association with a received-frame destination that is a final destination specified in a received frame so that the feasibility of transmission to a first adjacent node apparatus identified by the adjacent destination node identifying information stored in the first storage in association with the received-frame identifying information indicates that the transmission is infeasible;

selecting a second adjacent node apparatus to which transmission is feasible from among the plurality of adjacent node apparatuses according to the transmission feasibility information stored in the second storage in association with the received-frame destination, and transmitting the received frame to the second adjacent node apparatus; and transmitting the received frame, when the transmission feasibility information in the second storage indicates that there is no adjacent node apparatus to which transmission is feasible among the plurality of adjacent node apparatuses, and when the received-frame identifying information is stored in the first storage as the frame identifying information, to a third adjacent node apparatus that is memorized by the original node identifying information stored in the first storage in association with the received-frame identifying information.

* * * * *